US011848916B2

(12) United States Patent
May

(10) Patent No.: US 11,848,916 B2
(45) Date of Patent: *Dec. 19, 2023

(54) SECURE ELECTRONIC MESSAGING SYSTEM

(71) Applicant: Insight Sciences Corporation, Henderson, NV (US)

(72) Inventor: Timothy Owen May, Henderson, NV (US)

(73) Assignee: Insight Sciences Corporation, Henderson, NV (US)

( * ) Notice: Subject to any disclaimer, the term of this patent is extended or adjusted under 35 U.S.C. 154(b) by 218 days.

This patent is subject to a terminal disclaimer.

(21) Appl. No.: 17/135,812

(22) Filed: Dec. 28, 2020

(65) Prior Publication Data

US 2021/0119977 A1    Apr. 22, 2021

Related U.S. Application Data

(63) Continuation of application No. 16/522,049, filed on Jul. 25, 2019, now Pat. No. 10,880,273.

(Continued)

(51) Int. Cl.
*H04L 9/40* (2022.01)
*H04W 12/02* (2009.01)
(Continued)

(52) U.S. Cl.
CPC ...... *H04L 63/0421* (2013.01); *G06F 21/6245* (2013.01); *H04L 51/046* (2013.01);
(Continued)

(58) Field of Classification Search
CPC .............. H04L 63/0421; H04L 51/046; H04L 63/0407; H04L 63/0428; G06F 21/6245; H04W 12/02
See application file for complete search history.

(56) References Cited

U.S. PATENT DOCUMENTS 7,302,569 B2 ‡ 11/2007 Betz ..................... G06F 21/6245
                                                                     713/16
7,360,251 B2 ‡ 4/2008 Spalink ............... G06F 21/6254
                                                                      705/74
(Continued)

OTHER PUBLICATIONS

PCT US/RO ISR (ISA-210) and Written Opinion (ISA-237) dated Oct. 17, 2019 in co-pending, co-owned related application PCT/US19/-043457.‡

(Continued)

*Primary Examiner* — Jason Chiang
(74) *Attorney, Agent, or Firm* — BUCHALTER; Cecily Anne O'Regan

(57) ABSTRACT

A secure electronic messaging system includes processors coupled to a network, and constituent applications, services, and processes configured to securely exchange messages between participants such as hosts and recipients, and to protect personally identifying information (PII). The system and processor(s) are configured to generate a deanonymization probability (DP) for an anonymized dataset (ADS) responsive to a query received from the network, and to generate the ADS with pseudoidentities of recipients, when the DP does not exceed a predetermined DP threshold (DPT). The system thereby reduces the probability that the ADS and or pseudoidentities can be deanonymized, and thereby enables secure message exchanges between the participants, while protecting and without sharing the PII of participant identities. When DPs exceed the DPT, the system generates error messages, and or alternative queries that generate ADSs with DPs that do not exceed the DPT.

20 Claims, 16 Drawing Sheets

Related U.S. Application Data

(60) Provisional application No. 62/703,776, filed on Jul. 26, 2018.

(51) Int. Cl.
*G06F 21/62* (2013.01)
*H04L 51/046* (2022.01)

(52) U.S. Cl.
CPC ...... *H04L 63/0407* (2013.01); *H04L 63/0428* (2013.01); *H04W 12/02* (2013.01)

(56) References Cited

U.S. PATENT DOCUMENTS

| | | | | |
|---|---|---|---|---|
| 7,593,548 | B2 ‡ | 9/2009 | Dharmarajan | H04L 9/0866 380/20 |
| 7,617,393 | B2 ‡ | 11/2009 | Betz | G06F 21/6245 713/16 |
| 7,716,242 | B2 ‡ | 5/2010 | Pae | G06F 21/6227 707/78 |
| 7,725,944 | B2 ‡ | 5/2010 | Spalink | G06Q 20/383 726/26 |
| 8,037,512 | B2 ‡ | 10/2011 | Wright | G06F 21/6254 726/4 |
| 8,042,193 | B1 ‡ | 10/2011 | Piliouras | H04L 9/3236 726/28 |
| 8,140,502 | B2 ‡ | 3/2012 | Francis | G06F 16/00 707/70 |
| 8,321,952 | B2 ‡ | 11/2012 | Spalink | G06F 21/6254 726/26 |
| 8,407,807 | B2 ‡ | 3/2013 | Becker | G06F 21/6218 726/30 |
| 8,601,591 | B2 ‡ | 12/2013 | Krishnamurthy | G06F 21/6254 726/26 |
| 8,688,717 | B2 ‡ | 4/2014 | Yildiz | G06F 16/9024 707/74 |
| 8,893,963 | B2 ‡ | 11/2014 | Walsh | G07F 17/0014 235/38 |
| 8,949,155 | B2 ‡ | 2/2015 | Ramberg | H04L 63/062 705/52 |
| 9,021,599 | B2 ‡ | 4/2015 | Krieger | H04L 63/04 726/26 |
| 9,118,632 | B1 * | 8/2015 | Chuang | H04L 63/0823 |
| 9,317,715 | B2 ‡ | 4/2016 | Schuette | G06F 21/6254 |
| 9,443,092 | B2 ‡ | 9/2016 | Nawaz | G06F 21/602 |
| 9,460,310 | B2 ‡ | 10/2016 | Butler | G06F 21/6245 |
| 9,582,802 | B2 ‡ | 2/2017 | Bachenheimer | G06Q 10/107 |
| 9,665,883 | B2 ‡ | 5/2017 | Roullier | G06Q 30/0251 |
| 9,754,129 | B2 * | 9/2017 | Yamaoka | G06F 21/6245 |
| 9,773,124 | B2 * | 9/2017 | El Emam | G06F 21/6227 |
| 9,798,895 | B2 ‡ | 10/2017 | Nayshtur | H04W 12/02 |
| 9,818,131 | B2 ‡ | 11/2017 | Yonebayashi | G06Q 30/0255 |
| 9,847,982 | B2 ‡ | 12/2017 | Kaariainen | H04L 63/126 |
| 9,852,309 | B2 ‡ | 12/2017 | Luria | G06F 21/6245 |
| 9,917,691 | B2 ‡ | 3/2018 | Roullier | G06Q 30/0248 |
| 9,977,920 | B2 ‡ | 5/2018 | Danielson | G06F 16/9535 |
| 10,242,213 | B2 * | 3/2019 | Scaiano | G06F 21/6218 |
| 10,366,250 | B1 * | 7/2019 | Chen | G06F 21/6245 |
| 10,380,381 | B2 * | 8/2019 | Scaiano | G06F 21/6254 |
| 10,395,059 | B2 * | 8/2019 | Scaiano | G06N 7/005 |
| 10,430,609 | B2 * | 10/2019 | Kamijoh | G06F 16/2457 |
| 10,880,273 | B2 * | 12/2020 | May | H04L 51/48 |
| 2007/0156458 | A1 * | 7/2007 | Benja-Athon | G16H 70/20 705/2 |
| 2007/0219865 | A1 * | 9/2007 | Leining | G06Q 30/02 705/14 |
| 2008/0005264 | A1 * | 1/2008 | Brunell | H04L 63/0407 709/217 |
| 2008/0122580 | A1 * | 5/2008 | Karjoth | G06F 21/85 340/10.1 |
| 2009/0287562 | A1 ‡ | 11/2009 | Bosch | G07F 19/207 705/14 |
| 2010/0077006 | A1 * | 3/2010 | El Emam | G06F 16/284 707/E17.032 |
| 2010/0153285 | A1 * | 6/2010 | Anderson | G06F 16/951 707/708 |
| 2010/0161747 | A1 * | 6/2010 | Rayan | H04L 51/48 709/206 |
| 2012/0084349 | A1 ‡ | 4/2012 | Lee | G06Q 30/0251 709/20 |
| 2013/0138569 | A1 ‡ | 5/2013 | Yan | G06Q 30/0261 705/50 |
| 2014/0180816 | A1 * | 6/2014 | Mith | G06Q 30/0251 705/14.55 |
| 2014/0181995 | A1 * | 6/2014 | Smith | G06Q 30/00 726/28 |
| 2014/0214895 | A1 * | 7/2014 | Higgins | G06F 16/9535 707/770 |
| 2014/0244351 | A1 ‡ | 8/2014 | Symons | G06F 16/13 705/7 |
| 2014/0288998 | A1 ‡ | 9/2014 | Paray | G06Q 40/10 705/7 |
| 2014/0304061 | A1 ‡ | 10/2014 | Bruich | G06Q 30/0242 705/14 |
| 2014/0359782 | A1 * | 12/2014 | Golic | H04L 63/0407 726/26 |
| 2014/0379599 | A1 ‡ | 12/2014 | Feininger | H04L 63/0421 705/32 |
| 2015/0007249 | A1 * | 1/2015 | Bezzi | G06F 21/6227 726/1 |
| 2015/0081423 | A1 ‡ | 3/2015 | Palan | G06Q 30/0277 705/14 |
| 2015/0081436 | A1 ‡ | 3/2015 | Robbins | G06Q 30/0255 705/14 |
| 2015/0081562 | A1 ‡ | 3/2015 | Roullier | G06Q 30/0615 705/50 |
| 2015/0082050 | A1 ‡ | 3/2015 | Roullier | G06F 21/60 713/18 |
| 2015/0128287 | A1 * | 5/2015 | LaFever | G06F 21/6254 726/27 |
| 2015/0339496 | A1 * | 11/2015 | El Emam | G06F 21/6227 726/26 |
| 2015/0347624 | A1 ‡ | 12/2015 | Villars | G06Q 30/0204 705/7 |
| 2015/0356317 | A1 * | 12/2015 | Ukil | G06F 21/6245 726/28 |
| 2016/0127289 | A1 ‡ | 5/2016 | Papa | H04L 51/12 709/20 |
| 2016/0132697 | A1 * | 5/2016 | Simske | G06F 21/6254 726/26 |
| 2016/0142379 | A1 ‡ | 5/2016 | Tawakol | H04L 63/0421 726/1 |
| 2016/0234245 | A1 * | 8/2016 | Chapman | G06F 21/6245 |
| 2016/0292455 | A1 * | 10/2016 | Jebara | G06F 16/9535 |
| 2017/0083719 | A1 * | 3/2017 | Scaiano | H04L 63/0421 |
| 2017/0097996 | A1 ‡ | 4/2017 | Gullett | G06Q 10/063 |
| 2017/0169252 | A1 * | 6/2017 | Ukena-Bonfig | G06F 21/6254 |
| 2017/0187748 | A1 ‡ | 6/2017 | Durand | H04L 63/04 |
| 2017/0243162 | A1 ‡ | 8/2017 | Gavrielides | G06F 16/273 |
| 2017/0249659 | A1 ‡ | 8/2017 | Shroff | G06Q 30/0255 |
| 2017/0279786 | A1 ‡ | 9/2017 | Peterson | G06F 16/9535 |
| 2017/0286717 | A1 ‡ | 10/2017 | Khi | G06F 21/6245 |
| 2017/0323346 | A1 * | 11/2017 | Sheppard | G06Q 30/0269 |
| 2018/0082082 | A1 ‡ | 3/2018 | Lowenberg | G06Q 20/10 |
| 2018/0307859 | A1 * | 10/2018 | LaFever | H04L 63/20 |
| 2018/0343560 | A1 * | 11/2018 | Stein | H04W 4/02 |
| 2019/0018983 | A1 * | 1/2019 | Anderson | G06F 21/6245 |
| 2019/0347443 | A1 * | 11/2019 | Mandal | G06F 16/221 |
| 2020/0036687 | A1 * | 1/2020 | May | H04W 12/02 |

OTHER PUBLICATIONS

PCT US/RO ISR (ISA-210) and Written Opinion (ISA-237) dated Oct. 17, 2019, issued in co-pending, co-owned related application PCT/US19/-043457.‡

\* cited by examiner
‡ imported from a related application

SECURE ELECTRONIC MESSAGING SYSTEM

CROSS-REFERENCE TO RELATED APPLICATIONS

This application is a non-provisional application that claims the benefit of and priority to U.S. provisional patent application Ser. No. 62/703,776 filed Jul. 26, 2018, and U.S. Pat. No. 10,880,273 granted Dec. 29, 2020, which are incorporated by reference in their entirety as thought fully set forth herein.

FIELD OF TECHNOLOGY

The disclosure is directed to secure electronic messaging systems configured to exchange electronic messages while protecting, securing, and preventing disclosure of personally identifiable information.

BACKGROUND

Personally identifiable or identifying information ("PII") and similar phrases are used by information security and privacy technologists, regulations, and laws to refer to information that can be used on its own or in combination with other information to identify and interact with an individual. PII may be obtained from individuals with their consent, and may also be derived without consent by combining disparate information from publicly available sources. Some technologists refer to the process of discerning PII without consent, from combinations of publicly available information, as "identifying an individual in context." PII created to identify an individual in context is often also called "Derivative PII" or "Derived PII," among other descriptions.

Consumers often consent to limited uses of their PII when interacting with various organizations and businesses (herein collectively referred to as "entities"). Entities such as government agencies, financial institutions, and health care organizations have historically been required by law to obtain informed consent to collect and use PII, and are subject requirements for protecting PII. In contrast, many other types of entities have not been subject to similar PII protection and robust consent requirements. As a result, such businesses have developed business models directed to the monetized dissemination of consumer PII, which has resulted in misuse of PII, and in consumers being overwhelmed with unwanted communications and solicitations from a wide range of entities, extending far beyond the original consent and interaction the consumer may have had with a single entity.

The barrage of such unwanted communications has given rise to increased exploitation and misuse of consumer PII, and governments and administrative agencies have responded with new laws and regulations that extend more robust informed consent and protection requirements to all entities collecting and using PII. Many of these new laws and regulations impose strict liability and pecuniary penalties for violations of these requirements. Consequently, nearly all entities that capture, store, use, and share PII are now exposed to greater financial, operational, reputational, and regulatory risks associated with the capture and use of consumer PII. Compliance with the new PII protection laws, regulations, and industry-best-practices has increased both the costs of delivering goods and services, and the risks of violations of the ever-changing and enhanced legal requirements.

These ongoing costs and risks represent barriers-to-entry for new businesses and organizations, and barriers-to-growth for existing entities. Larger entities may be more able than smaller entities to absorb and mitigate the increased costs and risks. Further, consumers may prefer to engage with entities that fully comply with the most stringent PII regulations and best practices, and may avoid engaging with non-compliant, smaller businesses and organizations.

This disclosure is directed to new arrangements and implementations of a central intermediary and secure message exchange technology, which enables large or small entities to securely exchange of messages with consumers, with greatly reduced costs and risks of improper use of PII. Entities utilizing the technology of the disclosure may be able to achieve reduced expenses and lower risks because they may communicate and interact with consumers without the need to directly use PII.

Additionally, the system of the disclosure enables consumers to independently manage and control access to and accuracy of their PII through the innovative system acting as a central intermediary, which can serve as a single point of contact for all entities that interact with the consumer. This capability enables consumers to correct and manage PII and related information, which avoids missed communications, failed deliveries, billing errors, and other problems. This single point of contact to manage PII and communications with many different entities ensure that are all subject to a single set of terms and conditions requiring informed consent and PII protections. The new system of the disclosure thereby enables increased consumer convenience and confidence, and may overcome a possible reluctance by potential and existing consumers to provide PII to businesses and organizations, when such entities can now demonstrate enhanced PII protections.

SUMMARY

The innovative technology and capabilities of the new system disclosed herein address the long-felt need to enable central management, protection, and control of individual and consumer PII, and to establish a secure electronic messaging system that enables users to exchange messages while protecting against misuse of PII. Such secure electronic messages can include electronic mail messages, voice messages, multimedia messages, as well as conventional postal service direct mail messages generated by the system of the disclosure, and related messaging and communication. The system described and shown herein can prevent the disclosure of PII during such exchanges of electronic messages and protects the PII of message exchange participants, including for example, hosts, recipients, recipient audiences, reviewers, and other types of participants who may use the system and methods of the disclosure.

A secure messaging system according to the disclosure includes, among other components, one or more processors coupled to a network, which are configured with various applications, services, and processes, to generate a deanonymization probability ("DP") for a dataset returned in response to a query received from the network, and to respond to the query with an anonymized dataset ("ADS"), when the DP does not exceed a predetermined or preferred or selected DP threshold ("DPT"). The DP for the responsive dataset may also be referred to as the DP for the query. The ADS contains pseudoidentities that anonymize real identities of users and participants, and such pseudoidentities are used to enable communications there between to protect PII.

As explained in further examples that follow and elsewhere herein, the DP is generated assuming a pessimistic probability that an external party will seek to associate an anonymized identity to a known real identity, to enable use of PII and to extend the external party's ability to monitor and know a consumer's activities. Establishing a minimum acceptable DPT enables the system to generate ADSs to have DPs below the DPT as a way to lower the probability that the external party may succeed, while enabling communications between participants P.

In variations, responsive to the query, the processor(s) are also configured to generate the DP for at least one of the query and or the ADS to include one or more counts of data segments of the pseudoidentities without including additional, associated non-PII identity content attributes and information. The ADS is generated from the dataset responsive to the query, and the DP is associated to both the ADS and underlying dataset. Excluding certain non-PII identity content attributes and other related data from such responsive datasets and ADSs, in certain circumstances, can reduce consumption of and can conserve system resources.

Each such count of data segments is responsive to at least one portion of the query, and the DP is generated for each of the one or more counts of pseudoidentities. In this way, the disclosed system enables improved efficiency and performance, since the DP and counts can be generated while conserving utilization of system resources that may otherwise be required to generate and communicate the ADS to include all available responsive data. The DP is generated for the ADS and in variations of the system may be generated and may also be returned without the ADS, such that the DP is effectively generated for and responsive to the query.

In alternative arrangements, if the DP exceeds the DPT, the processor(s) may also be configured to generate one or more alternative queries that generate datasets that have DPs that do not exceed the DPT. Alternatively, the processor(s) may also be configured to generate an error message explaining that an ADS responsive to such query or queries that generate datasets having a DP or respective DPs that exceed the DPT. When the query or queries result in a dataset with a DP that does not exceed the DPT, i.e. the generated or calculated DP is less than or equal to the DPT, then the processor(s), in further variations, respond to the query(ies) by generating and returning the responsive ADS(s) containing the pseudoidentities, and possibly also the associated non-PII identity content attributes.

In still other arrangements, in response to the query(ies), the processor(s) are configured to generate the DP(s) for at least one of the query(ies) and the ADS(s), or both, independently of, in addition to, and or in combination with the other described variations. Further, when the DP does not exceed the DPT, the processor(s) also are configured to generate and communicate the ADS(s) responsive to the query(ies).

The disclosure is also directed to adaptations of the system, applications, services, and or processors being configured to generate the one or more alternative queries to include one or more attribute function business values, which can be utilized to prioritize one or more of queries, ADSs, non-PII identity content attributes, and attribute functions. Such attributes and functions are associated with each of the one or more alternative queries and or portions of such queries. In other configurations of the disclosure, the one or more processors are alternatively configured to generate the ADS to include anonymized identities as the pseudoidentities that are each represented and or identified by one or more pseudo global unique identifiers associated with real identities and the pseudoidentities.

The disclosure also contemplates the system further modified to generate, when the DP does not exceed the DPT, a confab that includes the pseudoidentities as and identifying recipients and participants in the confab, In this arrangement, the system also then securely communicates messages between a host and the recipients, according to messaging rules, and without sharing PII of recipients with the host and or between communicating participants.

Similarly, the system also is configured to receive the message content scrubbing ruleset and to remove PII detected in the messages, according to the message content scrubbing ruleset, before communicating the messages from the host to the recipients and or between participants. Other alternatives of the system are modified to receive a message personalization ruleset that is configured to detect replacement targets in each of the messages, and to personalize the messages before communication, by replacing the replacement targets with personally identifiable identity data for each message, according to the personalization ruleset.

The various configurations of the disclosure also contemplate the system adapted to receive a reply message, and to receive and or utilize a message content scrubbing ruleset, which is configured to detect and remove PII detected in the reply message, according to the message content scrubbing ruleset, before communicating the reply message to the host and or between participants.

This summary of the implementations and configurations of the systems of the disclosure, and described subsystems, elements, components, and alternatives, modifications, and variations thereof, introduces exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the disclosure and claimed technology, and it is not intended to be used as an aid in determining the scope of the claimed subject matter. The features, functions, capabilities, and advantages discussed here may be achieved independently in various example implementations or may be combined in yet other example implementations, as otherwise contemplated and further described elsewhere herein, and which may also be understood by those skilled and knowledgeable in the relevant fields of technology, with reference to the following description and drawings.

DRAWINGS

Figure 10:
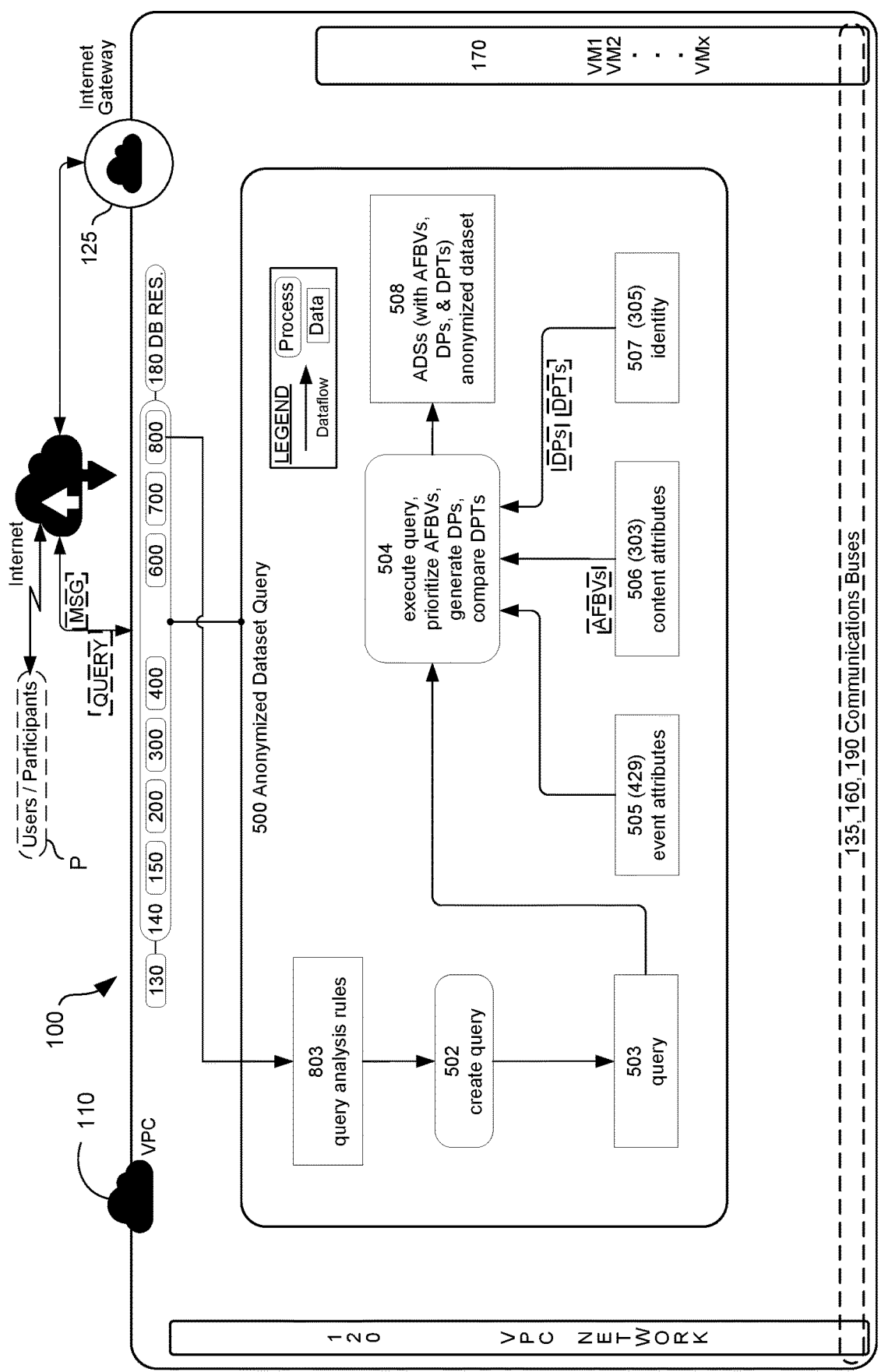
Figure 11:
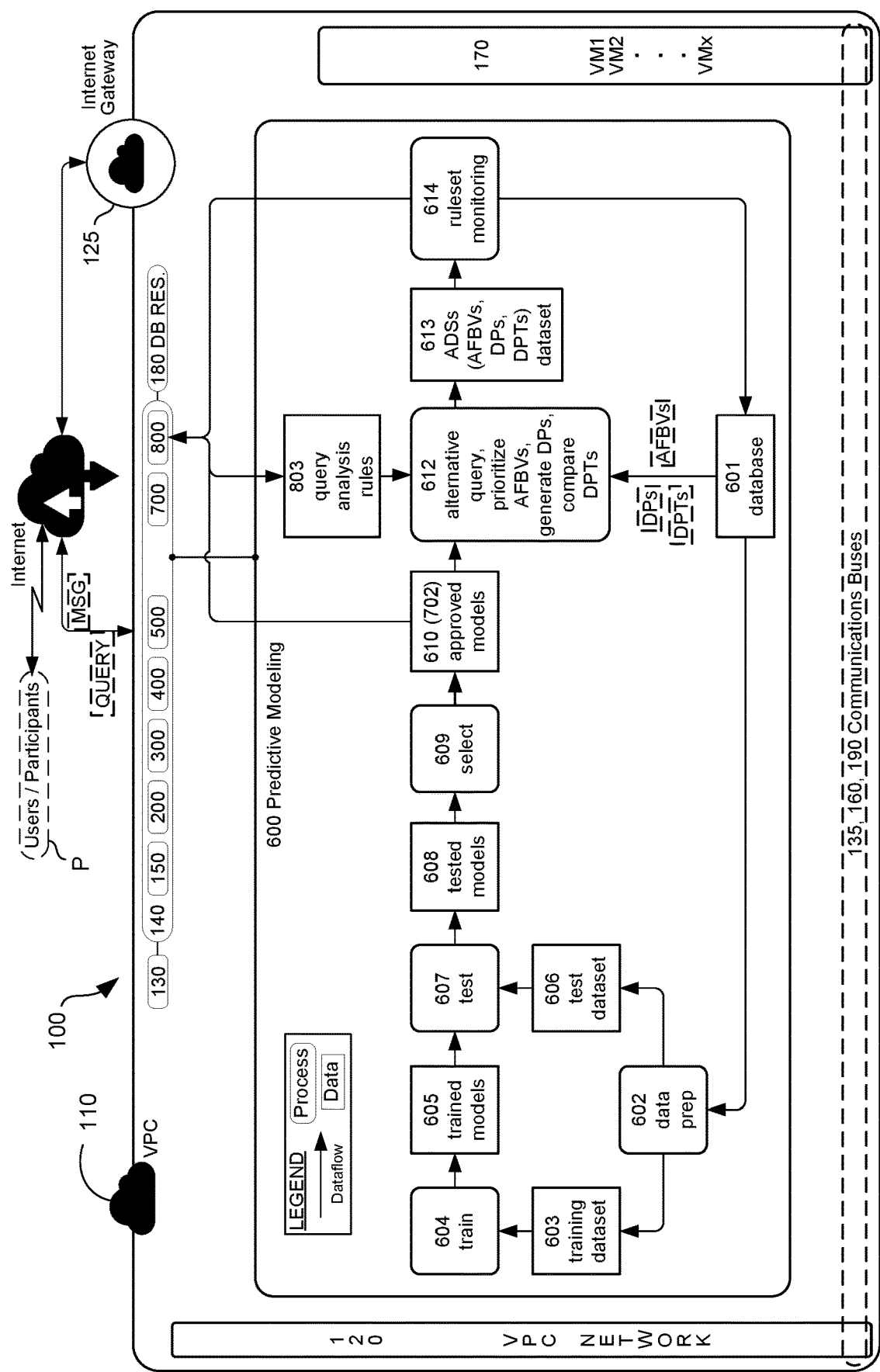
Figure 12:
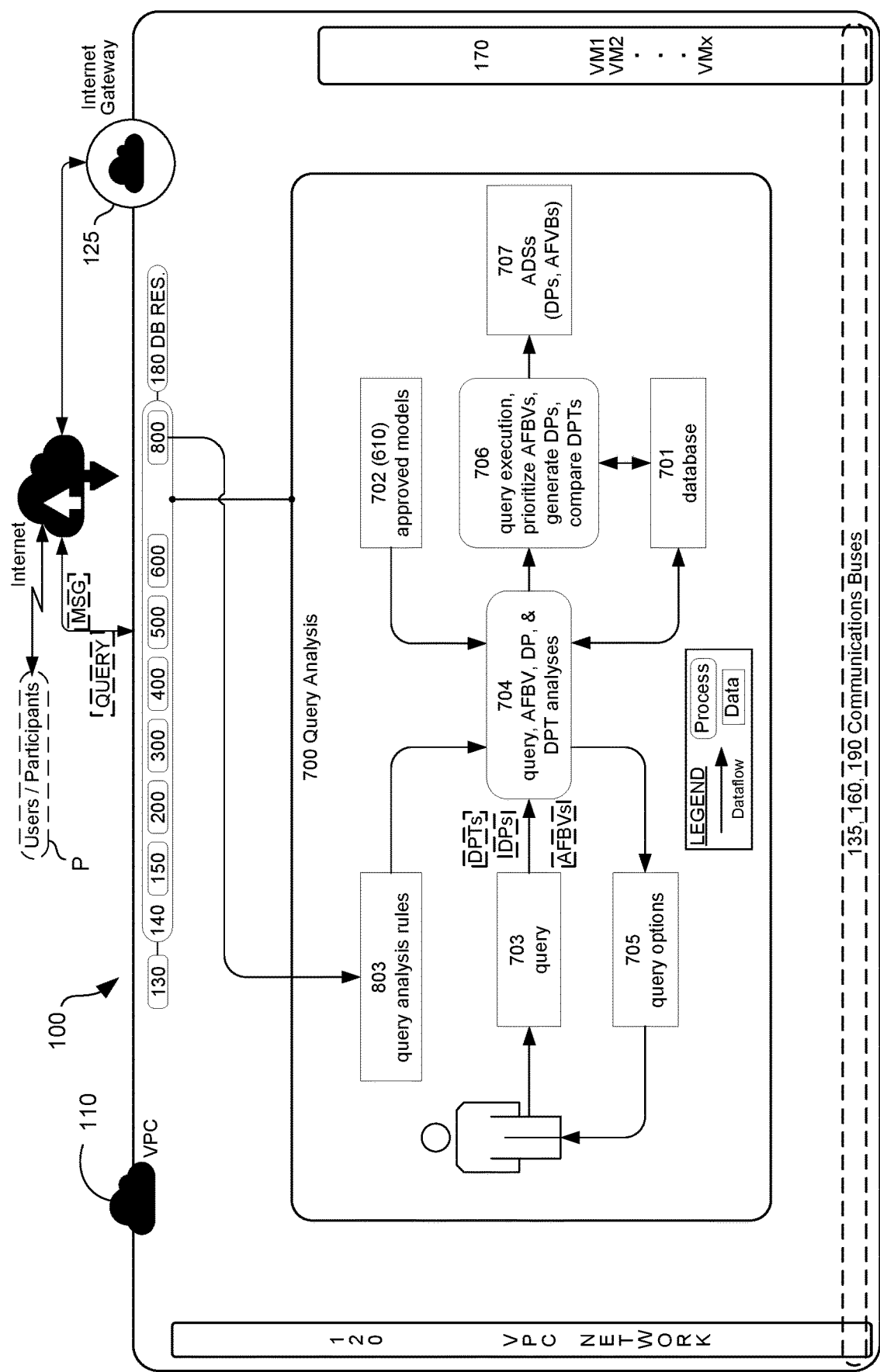
Figure 13:
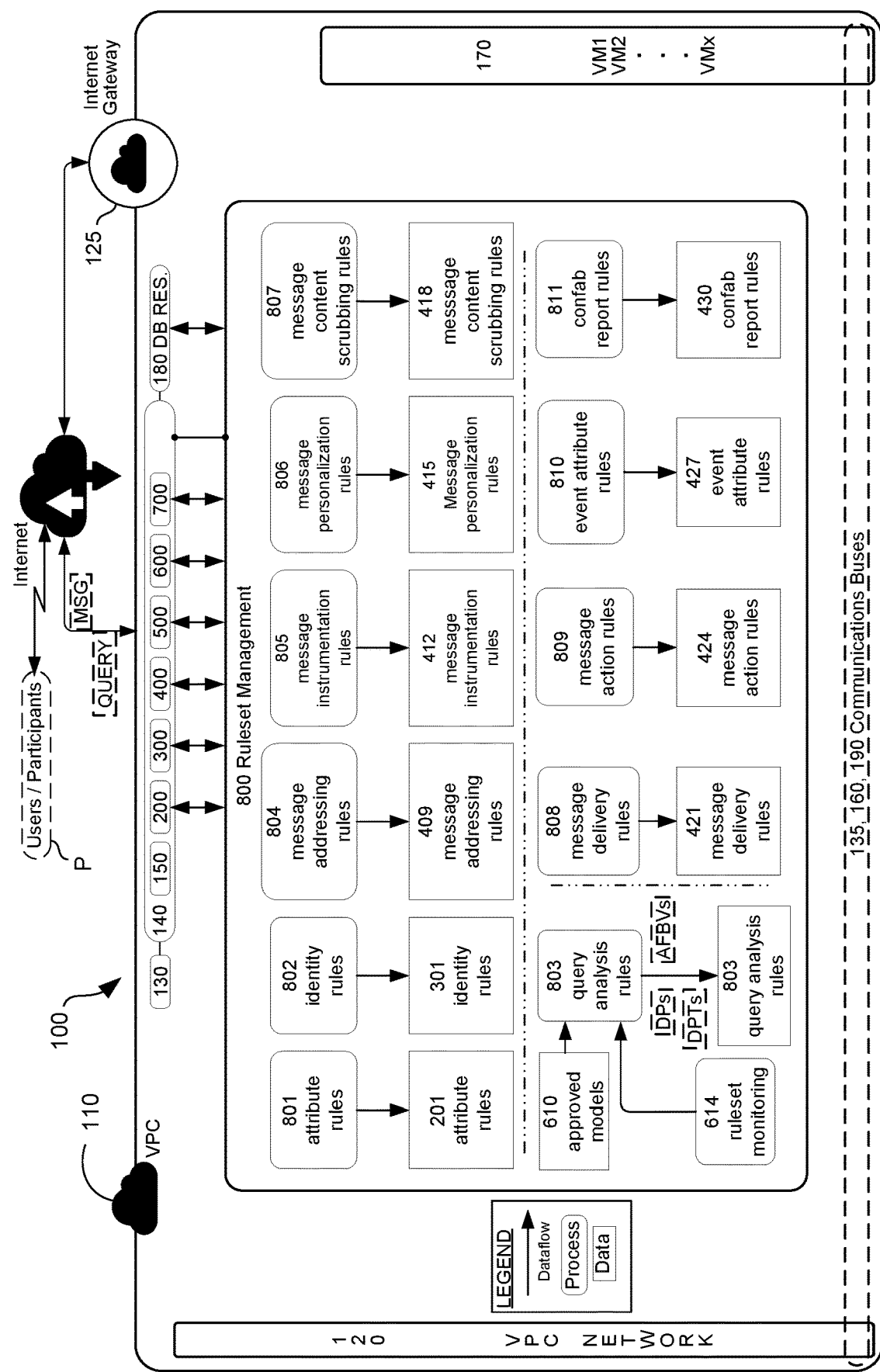
Figure 14:
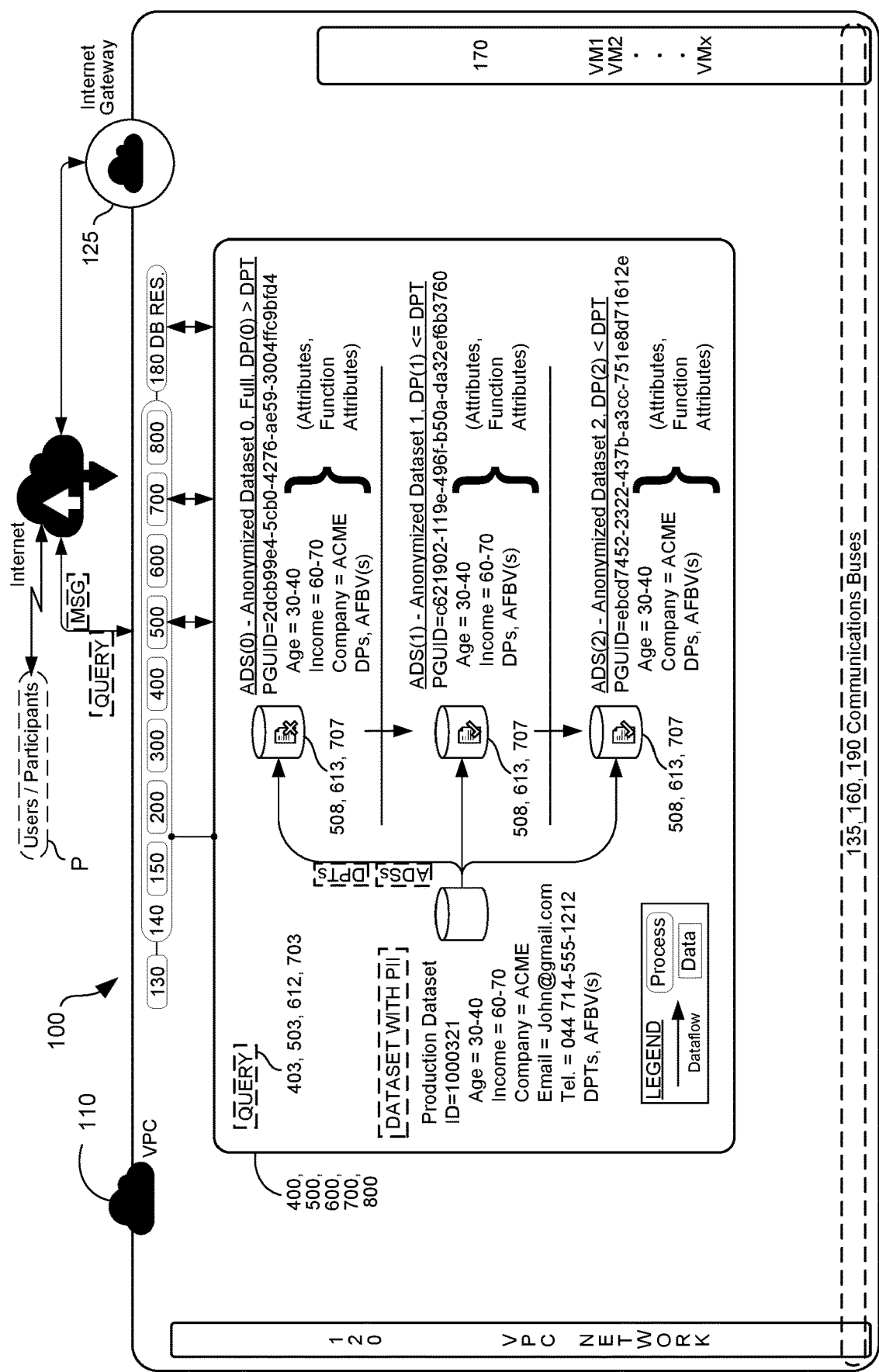
Figure 15:
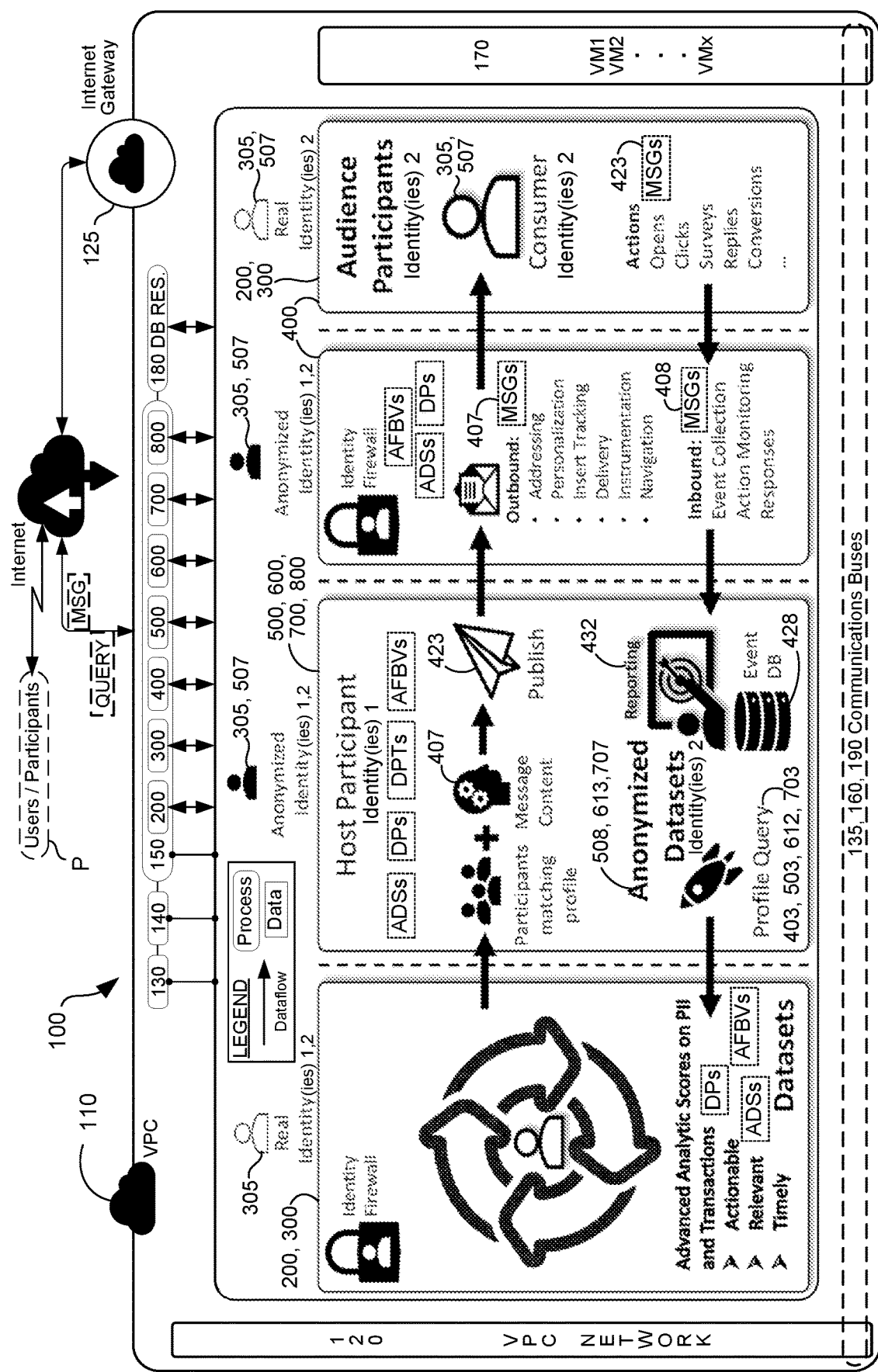
Figure 16:
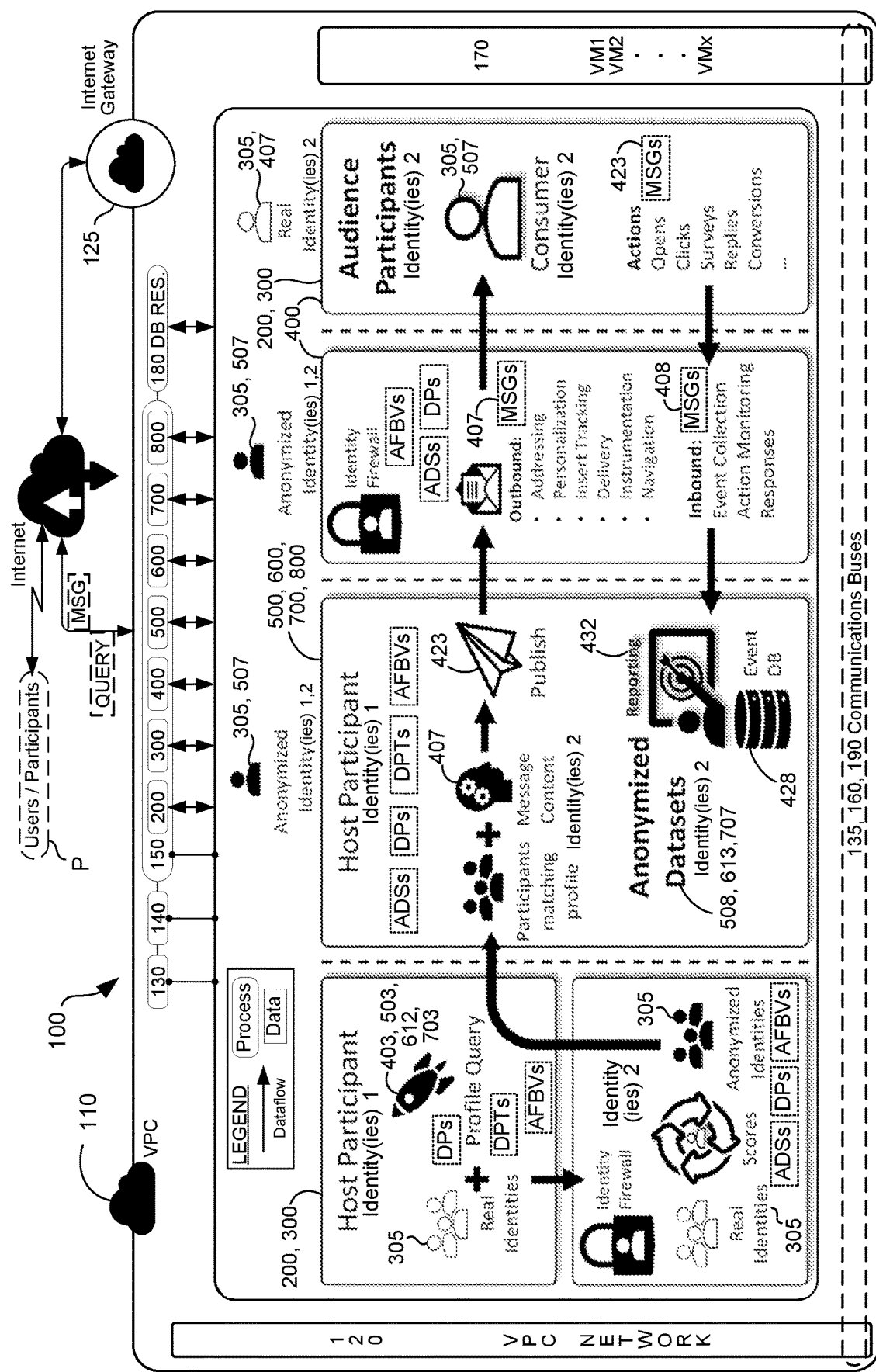

FIG. 10 includes the messaging system of the preceding figures with additional capabilities and features depicted for the previously described identity, content, event, query, and anonymized data set processes, services, subsystems, and elements;

FIG. 11 illustrates the messaging system of the preceding figures, and incorporates added examples of capabilities of certain of the previously depicted query, predictive query, models, training models, rules, anonymized data sets, deanonymization probabilities, and related aspects of the various subsystems and elements;

FIG. 12 shows the messaging system of the preceding figures, and for purposes of describing further examples, includes depictions of additional features and capabilities for certain query, query analysis, models, deanonymization probabilities, and anonymized data set applications, services, processes, subsystems, and elements;

FIG. 13 depicts the messaging system of the preceding figures, and includes additionally exemplary arrangements of capabilities and features of certain of the previously illustrated query, message, event, confab, and models rules services, applications, subsystems, processes, and elements;

FIG. 14 also describes the system of the preceding figures, and here includes further illustrations of the features and capabilities of specific exemplary applications, elements, processes, and subsystems of the disclosure;

FIG. 15 illustrates the system of the preceding figures and includes various subsystems and components rearranged for purposes of further illustration and to depict the system and methods of the disclosure in various operational and application configurations and implementations; and FIG. 16 shows the systems and methods of operation of FIG. 15 and the preceding figures, with additional illustrations of the features and capabilities of various operational and application elements and subsystems of the disclosure.

DESCRIPTION

The following detailed description illustrates by way of example, but not for purposes of limitation, aspects and principles of the systems and methods of the disclosure. This description enables one having ordinary skill and knowledge in the relevant art and technology to make and use the disclosure, and describes and contemplates several embodiments, adaptations, variations, alternatives, and uses of the disclosure, including what is presently believed to be the best mode of carrying out the disclosure. It should be understood that the drawings are diagrammatic and schematic representations of exemplary embodiments of the disclosure, and are not intended to be limiting nor are they necessarily drawn to scale.

The following detailed description is exemplary and is not intended to limit the disclosure, the claims, or the demonstrative implementations and uses of the present disclosure. Descriptions of specific devices, techniques, and applications for use and operation are provided only as examples for purposes of enabling the skilled person to comprehend the disclosure. Modifications to the examples described herein should be readily apparent to those of ordinary skill in the art, and the general aspects and principles depicted herein may be applied to other configurations, variations, and arrangements without departing from the spirit and scope of the disclosure. Furthermore, there is no intention to be bound by any expressed or implied theory presented or perceived, in the preceding descriptions of the field of technology, background, summary, or the following detailed description. The present disclosure should be accorded scope consistent with the claims, and not be limited only to the examples described and shown herein.

Example and representative configurations, adaptations, and implementations of the present disclosure may be described herein in terms of specific hardware and software, architectures, and by way of physical, functional, and or logical systems, subsystems, components, elements, and various processing steps, sequences, and methods of operation. It should be appreciated that such representative and schematic methods, figures, and diagrams may be rearranged, resequenced, and realized by any number of hardware, software, and or firmware components configured to enable, implement, and perform the specified capabilities and functions.

For the sake of brevity, conventional techniques and components related to use during operation, and other functional aspects of the systems (and the individual operating components of the systems), may be described here only with enough technical detail so as to enable those with ordinary knowledge, skill, and ability in the art and relevant technical fields to practice the implementations. In addition, those skilled in the art will appreciate that example implementations of the present disclosure may be practiced in conjunction with a variety of hardware, software, networked, world-wide-web-based, internet-based, and cloud-based configurations of the described secure electronic messaging system, which may further incorporate various combinations of such implementations.

As should be understandable to those with ordinary skill in the art, after reading this description, the following are examples and example implementations of the present disclosure, and are not limited to operating only in accordance with these examples. Other implementations may be realized and utilized, and changes in configurations and sequences of operation may be made without departing from the contemplated scope of the example implementations presented herein.

Figure 1:
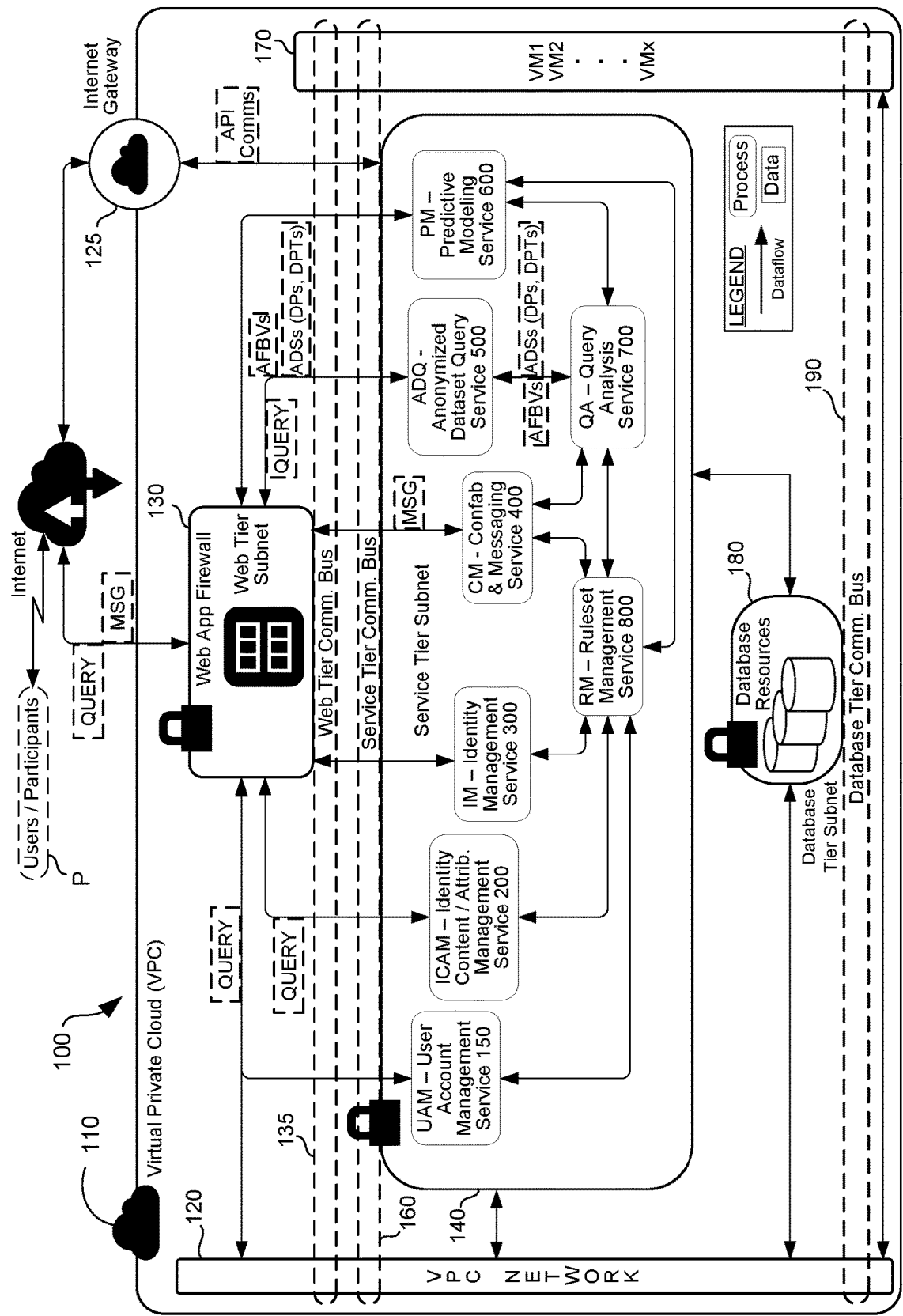
FIG. 1 illustrates an exemplary secure messaging system according to embodiments of the disclosure.

With reference now to the various figures and illustrations and specifically to FIG. 1, systems and methods for enabling an exemplary secure electronic messaging system 100 include any number of technically suitable arrangements, and may include for purposes of example but not limitation, a virtual private network and or cloud ("VPN" or "VPC") configuration 110 that incorporates a network 120, such as a VPN or VPC network 120, and an internet gateway 125, among other communications systems and subsystems.

As part of the VPC configuration 110 and or in communication therewith, and coupled to the preceding systems, subsystems, and components, is a world-wide-web, WWW, or web application ("app") firewall and web tier subnet 130 and associated web tier communications bus 135, an application service tier subnet 140 and service tier communications bus 160, a virtual machine and or virtual machines ("VMs") tier and subnet, and a database resources tier subnet of databases and database resources 180 and database tier communications subnet 190, among other systems and subsystems.

For purposes of further exemplary illustration without limitation, the VPC or VPC configuration 110 may be arranged to utilize collocated and or physically/geographically separated systems and subsystems to enable system 100 in a variety of possibly desirable arrangements of virtual, physical, hardware, and or combination software systems/components/and features "as-a-service" ("aaS") that include for example Infrastructure ("IaaS"), Platform ("PaaS"), Hardware ("HaaS"), Software ("SaaS"), Application(s) ("AaaS"), and other similar aaS configurations.

The contemplated implementations of the secure electronic messaging system 100 are, for example, configured as an optimized infrastructure and system architecture that enables consistent, persistent, on-demand performance, and information durability. For further example, the preferred configuration and architecture for system 100 includes a hybridized cloud-based infrastructure VPC 110, wherein the various components and subsystems of the system 100 are individually configured to self-optimize utilization of VMs 170 as demands increase and decrease for processing power, storage, retrieval, data replication, communications, and backup.

As application capacity grows and shrinks to accommodate rising and dissipating demand, the hosting cloud infrastructure of system 100 is preferably also configured to automatically spawn new clusters, and de-spawn, de-cluster, and terminate unneeded storage capacity, VM images, and RAM profiles on-demand to accommodate the needed resource loads and to dissociate unneeded resources to improve efficiency and minimize costs.

The contemplated hybridized cloud-based infrastructure and architecture of system 100 may be achieved using any of a number of commercially available data centers and or cloud service providers ("CSPs"). Such CSPs enable various types of cloud-based infrastructures that range between individualized and networked servers and VMs 170, to larger, scalable, enterprise VPCs 110, databases and storage systems and resources 180, and network communication systems and buses 120, 135, 160, 190. Each such arrangement can be configured with dedicated, on-demand, and combination configurations of processors, storage, communications bandwidth, and related systems, having guaranteed minimum response times, and data durability and persistence.

For purposes of the disclosure and system 100, such capabilities may be configured as service oriented architectures ("SoAs") with IaaS networks, communications, storage, PaaS, and or HaaS processors, and virtual machines running preselected operating systems as pre-configured platforms, integration PaaSs that are custom integrated with various IaaS, SaaS, and HaaS subsystems, and sometimes utilizing on-demand SaaS licensing options. The presently most well-known CSPs and products include Microsoft's Azure, Amazon's Web Service ("AWS"), Google Cloud, Rackspace Cloud, and Hewlett-Packard ("HP") Helion (formerly Cloud Compute and Public Cloud), among others. In optionally preferred arrangements, various elements of system 100 such as VPC 110, VMs 170, and others without limitation, may be configured in part and or in whole as such third party, commercial, cloud-based SoA data centers and or virtual machines.

System 100 can be implemented with various existing technologies for deployment as a SaaS model, and the following example architecture manifest is one example of the technologies used to implement and deploy the system stack on AWS:

| Architecture Element | Description |
| --- | --- |
| AWS Cognito | Consumer Identification and Access Management |
| AWS IAM | Corporate Identification and Access Management |
| AWS Secrets Manager | Secure storage for external system credentials |
| AWS API Gateway | Publish, Maintain, Monitor and Secure Application Programming Interfaces ("APIs") |
| AWS Lambda | Serverless Function Execution |
| AWS Redgate | Serverless Function Execution in Containers |
| AWS Cloud Formation | Stack definition and deployment |
| AWS S3 | Object Storage |
| AWS RDS | Database Services - MySQL, DynamoDB |
| AWS WAF | Web Application Firewall |
| AWS CloudWatch | Transaction and Event Logging |
| AWS VPC | Virtual private Cloud |
| AWS Simple Notifications Service | — |
| AWS Simple Mail Service | — |
| AWS SageMaker | Machine Learning Orchestration |
| AWS Simple Queue Service | — |
| AWS Elasticsearch Service | Description Analytics and Reporting |
| AWS S3 Glacier | Backup storage |

System software for system 100 can also be implemented, for example, in Microsoft's C# environment, and may utilize Microsoft's ASP.NET core frameworks, libraries, and development environments, among other possibilities. Many other viable implementation options exist and are compatible for use with the various aspects of the disclosure.

In addition to such exemplary arrangements of the contemplated hybrid cloud network communications infrastructure, system 100 is also preferably configured with the SoA server components having well-formed MVVM or model, view, view model, and or MVC or model, view, control underlying architectures that employ robust server-side Active Server Page and or legacy PHP: hypertext frameworks or similarly capable functional, physical, and logical technical configurations. More specifically, the SoA aspect of the architecture ensures that the systems, subsystems, and components of system 100 are a collection of services communicating with one another to enable rapid load balancing wherein high demand for services can be met essentially within an instant or very short span of time, with duplicate service images being spawned across the SOA VPC 110 of system 100, typically within a small number of seconds and depending upon system configuration, resources already in use and needed, and other aspects of the system.

In contrast, as demand wanes, unneeded duplicate services and or applications can be quickly terminated and the resources abandoned so as to preserve efficiency and minimize costs. Here, system 100 uses the classical definitions of SoA services wherein each service, whether it be an operating server or monitor, or a constituent subsystem or service thereof, is well-defined, self-contained, and does not depend upon the context or state of other services, whether they be duplicate, complementary, cooperative, or a service that sources, consumes, or modifies information from others.

The Web app firewall 130 can be configured to serve as a secure electronic communication entry point for internet users and or participants ("P"), with such VPC 110 arrangements, and to enable the other systems, subsystems, and components of system 100 to respond to and exchange data with such internet users/participants P, which can include for example message exchange participants, message originators such as hosts, message recipients, recipient audiences, reviewers, and other types of participants. Web tier communications bus 135 is coupled and or incorporated with web app firewall 130 as an integral or separate primary communications channel or pathway. It may also be configured as a channel or pathway of another of the various contemplated networks, services, and buses described herein.

Web app firewall and tier subnet 130 and other subsystems of system 100 are enabled according to the disclosure in various exemplary configurations, including for example utilizing a number of internet and web application frameworks. For purposes of additional illustration without limitation, some such well-known proprietary and open source frameworks that embrace, incorporate, and or enable the disclosure include development and architecture frameworks such as AWS API Gateway, Microsoft's TLA$^+$, and implementation frameworks such as C#, C++, Java, JavaScript, PHP, and Ruby, among many others. For example, the Phalcon, Laravel, Codelgniter, Yii, and Symfony and Symfony 2 PHP frameworks can be utilized to enable further aspects the contemplated system 100 and subsystem configurations, including web app firewall 130 and others.

Such technologies used for purposes of implementing system 100 and or web app firewall 130, include utilization of Symfony, AJAX (asynchronous JavaScript and XML [extensible mark-up language]), HTML and CSS (hypertext mark-up language and cascaded style sheets), MVC (model view controller), MVVM (model-view-viewmodel), JSON (JavaScript object notation), and DOM (document object model) classes, which can enable a variety of improved capabilities for both implementation of web app firewall 130 and related interfaces to users and participants P to other components of system 100.

Here, components and subsystems of system 100 also are configured to further improve speed and reliability in preferred configurations that specifically employ the MVVM sub-framework to incorporate the DRY ("don't repeat yourself") coding philosophy, which when combined with the independence of each contemplated SoA service, ensures a reliable, fault-tolerant system 100 wherein primary, secondary, tertiary, and other duplicate spawned services can fail safely and be terminated without any effect on other services; which other services operate and function independently. In this way, if a service is operating as a supplier or a consumer of data and resources from another service that fails, the supplier or consumer services can simply renew their request(s), which can then be met by another newly instantiated and allocated operating services and processes without perceivable or significant delay.

Service tier subnet 140 and communications bus 160 may be similarly configured as other components and is also integrated, coupled, and or independently configured to cooperate with and enable instantiation and allocation of virtual machines VM 170, to the various services and applications enabled by service tier subnet 140. VMs 170 are also similarly coupled to and or integrated with web app firewall subnet 130 to instantiate and allocate VM 170 resources thereto.

The disclosure also contemplates that database/storage resource tier subnet 180 and communication bus 190 are also configured in analogous way to enable data storage systems and subsystems, and communications of data to be stored thereon and retrieved therefrom. Here too, such VMs 170 are incorporated, integrated, and or coupled with the database/storage resources 180 and are also enabled in some adaptations with one or more database resource systems 180. Such databases and database resources are preferably configured to enable continuously changing, stored, and retrieved data and the requirement to rapidly communicate the data in real-time with the lowest possible latency, while preventing data loss (optimized reliability) and while enabling data protection (maintaining data durability). Many such data management and storage technologies exist that could be incorporated to enable database resources and database tier subnet 180 and communications bus 190.

Skilled and knowledgeable persons working in the field of data storage technologies may have come to understand that the choice and implementation of different database technologies is influenced by many business and technology requirements. Some common database technology requirements can for example include development productivity, data-storage capacity, concurrent connection scalability, data schema management, data maintenance features, ACID features (Atomicity, Consistency, Isolation, Durability) and CRUDL (Create, Read, Update, List) performance. Commonly used database technologies further include relational, hierarchical, NoSQL, and many others.

Such skilled persons may also consider that legacy proprietary and open source database technologies such as hierarchical and relational databases offer benefits and experience short-comings when used in applications with high data volatility, where data is changing continuously, and where data must be communicated rapidly and on-demand. These skilled artisans may also understand that best practices advocate for development of an entity relationship ("ER") reference model of the data that is to be used in an application. The ER model directly translates into various database schemas, including a Structured Query Language ("SQL") schema (wherein schema refers to a table for each entity) in $3^{rd}$ normal form, against which SQL statements in turn enable "projections" of related data to be generated.

Such an ER reference model can be easily translated into relational database schema in a near one-to-one correspondence. Some ER models can also be translated into a hierarchical database schema. In other examples, the ER reference models can be translated into a NoSQL database schema, which requires advance and a near perfect understanding of all queries required by the application before the application can developed to build an efficient NoSQL database.

Data modelling for such contemplated database architectures, including for example SQL and NoSQL is defined by and enabled with the ER reference model. SQL databases enable compact storage of data but can require complex processing to perform queries that reference the various tables, to generate the projections of responsive data. In general, SQL databases are extremely resilient to changing query requirements and can enable new queries to be defined as needed for any combination of data in the database.

For purposes of further illustration of aspects of system 100, the database schema herein may be referred to and described as an ER model, and data access examples may include representative SQL queries to depict various contemplated aspects and capabilities of the disclosure. In variations, an implementation of a NoSQL key-value pair DynamoDB database is contemplated for creating a highly scalable platform according to the disclosure. DynamoDB is offered as an exemplar of a representative, fully managed, scalable, distributed AWS Service. As such an exemplar, DynamoDB offers both in-memory (DAX) and persistent storage options.

Relational databases are also contemplated as examples, and store data in tables related by foreign key relationships and use a query language, typically SQL, to create views of data by joining related data across many tables. Data storage in a relational database system is very efficient when the tables used in the database (the Schema) are designed to avoid duplication of data. Data queries in a relational database are very flexible when the tables used in the database have foreign key relationships supporting most, if not all, possible views of the data. For instance, new queries can be created anytime as needed to support new application requirements. Although modern relational databases use very sophisticated query optimization engines to prosecute the retrieval and joining of data from tables, the query process is very disk and CPU intensive. Modern relational databases fully support ACID database transactions.

Examples of hierarchical databases herein and typically store data in tables related by direct links forming a tree-like directed graph. Relationships among items in different tables is fixed and modelling many-to-many relationships is difficult. Hierarchical databases are highly scalable and efficient and most commonly used when the underlying data has intrinsically tree-like relationships and these relationships are unlikely to change over time. Modern hierarchical databases fully support ACID database transactions.

While many such databases and tables are often used to define such links and relationships, a query and or message request takes a fixed amount of time to process, as the engine traverses the various tables, links, and relationships, to generate a response. Even though some attempts have been made to improve response times in view of the fixed amount of time, such as by implementing SQL schemas or paradigms, such attempts have been implemented without any single standard approach, which has created challenges to utilizing such technologies. The exponential rise of requirements for more real-time capable database systems have created the need for improved response times.

In some cases, this is because every resultant SQL-compliant database implementation has adopted its own interpretation of a generic SQL schema, and thus has its own set of peculiarities, response times, and benefits and shortcomings, which in combination may not achieve an optimized high-rate data change and communication capability. Such shortcomings have given rise to a new paradigm of non-relational databases, which are often referred to in one example as NoSQL databases (known as both No SQL and Not Only SQL). The NoSQL databases are a class of databases that are categorized into key-value pair stores and document stores.

NoSQL databases share a common design pattern of trading increased data storage for reduced data retrieval time. In this design pattern, data that is closely related is stored together in such a way that a single database access can retrieve that related data efficiently. As a consequence, where the same data is associated with many different entities, the data is stored more than once. NoSQL databases require more disk storage than SQL databases but require far less storage and CPU processing to retrieve data for database queries the schema has been optimized for. This duplication of data also creates challenges for effecting ACID database transactions.

Specifically, the NoSQL design makes it difficult to guarantee consistency of the data retrieved without visiting each location it is stored. In general, use of a NoSQL database requires the use of an "eventually consistent" data application design pattern to fully leverage the retrieval speeds of the database. In addition, NoSQL database schema design requires extensive pre-implementation understanding of all query requirements of the application. This is because application query requirements determine the schema of the database, which schema cannot be easily changed once the database is in production.

For purposes of example with respect to the instant disclosure, many types of open-source, distributed, NoSQL technologies are adaptable for use in the real-time, high-demand, system 100. Four primary types of such NoSQL systems are contemplated herein and include what are often referred to as document, column, key-value, and graph technologies. What has been found to be effective for purposes of system 100 are the "key-value" class of NoSQL databases, which include a number of well-known proprietary and open source systems such as Aerospike, FoundationDB, MemcacheDB, DynamoDB, Redis, Teradata, Cassandra, and Riak, among many others that may further incorporate aspects of blockchain-compatible, indexed sequential access methods ("ISAM"), and other similar technologies.

The disclosure also contemplates use of aspects of memory caching, message brokering, and other enterprise bus elements in the variations described herein. For purposes of further example and to technically describe the system 100, the open source DynamoDB database is also expressly contemplated here to illustrate one alternative implementation, as it has developed a large support community, and many application programming interfaces ("APIs") that enable use with a variety of complementary technologies, such as the AWS web application frameworks described elsewhere herein.

In combination with these various types of NoSQL key-value systems, performance of secure electronic messaging system 100 is found to be improved when its various components are configured to incorporate such document oriented databases to capture and retain various types of electronic messages in improved, binary encoded formats. The contemplated database structures and formats are configured and optimized for use with high-speed storage and retrieval, and optimize resiliency, scalability (by sharding and other methods), and related performance capabilities described elsewhere herein.

For further illustration, document oriented database systems such as MongoDB with its binary JavaScript object notation or BJSON or BSON document oriented database is of particular value, as are similarly capable systems that include for purposes of example, Couchbase, Apache CouchDB, RavenDB, and Apache Jackrabbit, among others. Further examples of systems that are suitable for certain implementations of the disclosure include what are known to those working in the field as associative memory, associative array, associative storage, or content addressable memory storage systems, which enable addressing records and data as a function of and with reference directly to such changing and stored data and content, and without use of keys and indices.

Additionally, the secure electronic messaging system 100 of the disclosure is further improved with the incorporation of at least one optimized search engine technology that enables various subsystems and components of system 100 and database resources of database/storage tier subnet 180 to be configured to search for data content in the noted NoSQL database systems. More specifically, system 100 and database resources 180 may include such dedicated search applications to enable full text search, faceted searching, and distributed searching for scalability, among other capabilities. Among various possible subsystems, and database/storage resources, tier subnet 180 may incorporate at least one of such dedicated search engines, including for example but not limitation, Elasticsearch, Solr, Splunk, and or Marklogic, among others.

In other variations of the disclosure, database resources and database/storage tier subnet 180 includes random access memory and disk storage resources that can be accommodated in response to scalable demand in the cloud-based environment of VPC 110 and system 100, with manageable master-slave, slave-master RAM and disk arrangements and configurations. With the contemplated NoSQL, RAM-resident, disk-storage backed configurations, it is also preferred that the database/storage resources and system 180 enable and be readily compatible with an integral key hashing technology that enables very high-speed collision-free key generation. For purposes of further illustration in connection with the various figures and schematic diagrams, database system 180 is also referred to by one of more of its contemplated constituent components, which also herein may use reference numeral 180 when appropriate.

To implement these configurations of system 100 and database resources 180 and other subsystems, and to enable the management, communication, storage according to the secure electronic messaging system 100, database resources 180 may be configured utilizing the DynamoDB database system as an example. While meeting most of the requirements of the disclosure of system 100, such DynamoDB databases are highly customizable to accommodate the system 100, and be configured for and to enable RAM-resident, disk-resident, and hybrid combination databases to meet system optimization objectives. Consequently, the disclosure also contemplates the above-noted cloud systems being utilized in combination with a DynamoDB database service or similarly capable NoSQL database in a VM 170 clustered configuration, such that the RAM of each VM 170 can be similarly clustered to enable the various DynamoDB databases to be rebalanced in both the RAM resident and disk stored configurations. In this variation, many auto balancing options are integrally available or easily coded to enable improved performance for database volatility load and persistence requirements to drive the re-partitioning/data sharding across master-slave persistent and semi-persistent, and or snap-shotting implementations.

In these configurations of the system 100 and database resources 180, in combination with the NoSQL data management capability, and on-demand up-and-down scalability of the cloud-based iPaaS, PaaS, IaaS architecture, the system 100 can replicate VMs 170 and expand RAM upon demand (and terminate and release resources), and the Redis-database-based monitors and servers of system 100 can adjust, growing and shrinking, in unlimited ways, so long as the CSPs can maintain its advertised on-demand availability and scalability.

In further exemplary configurations of system 100, internet gateway 125 can be configured as a separate, secure, and independent communication pathway or channel that enables various services and components of system 100 and VPC 110 to communicate via APIs and similar services, applications, and constructs with such third-party IaaS, PaaS, HaaS, SaaS, and AaaS services, VM, databases, and similar resources.

The methods and systems 100 of the disclosure utilize these exemplary modifications and arrangements to enable mutually interested parties to (a) securely exchange electronic information, media, and or messages (collectively also sometimes referred to as "MSG", and or by message reference numerals 407, 408, 411, 414, 417, 420, and or 423), while protecting and without divulging PII, and (b) enable individuals to centrally manage their PII, among other capabilities. While many types of so-called secure messaging are known to those skilled in the relevant fields of technology, here the disclosure refers to an improved secure messaging system 100 that incorporates many of such well-known technologies, but is also further improved to securely protect PII from disclosure in such communicated messages by removing PII and anonymizing such messages according to the many examples described and contemplated by the disclosure. Parties exchanging messages are referred to herein generally as participants P of systems and methods 100.

The systems and methods 100 are configured to enable such secure communication and message exchange, and to receive such messages and or queries for potential recipients of messages. Responsive to such messages and queries, system 100 also generates anonymized datasets ("ADSs") of participant P information. Such ADSs include identity information that enables secure communication between and uniquely identifies one or more participants P listed or contained or identified in the ADSs, but which excludes PII for those identified participants P, as is described in more detail in examples that follow. The ADSs are configured and generated to prevent deanonymization and protect PII from misuse and unauthorized disclosure, and can include, for example, Participant P attributes, and messaging related information and actions, and other relevant and or responsive information.

Figure 2:
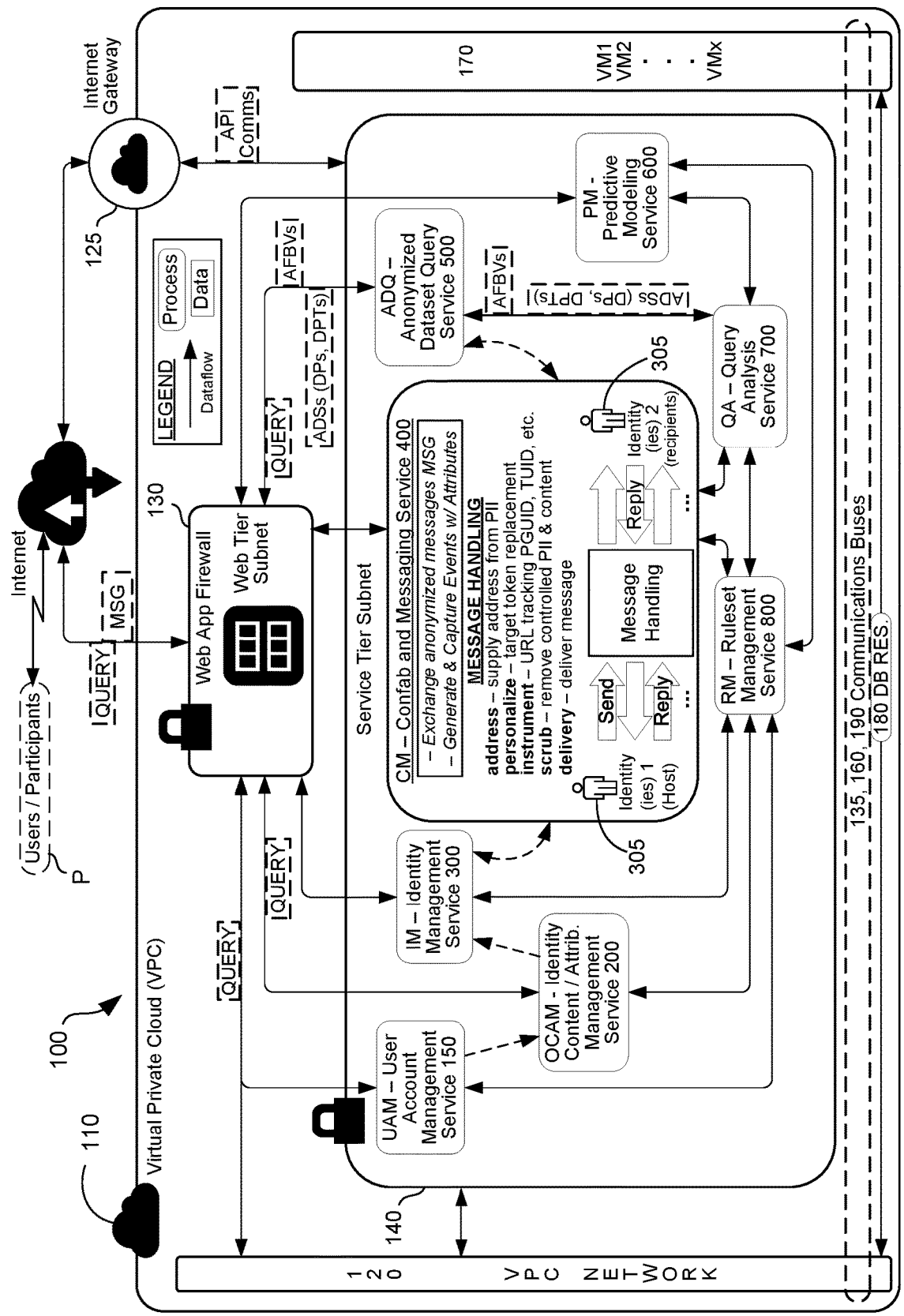
FIG. 2 depicts the system of FIG. 1 with various elements and subsystems modified and rearranged for purposes of further illustration.

With continuing reference to FIG. 1, and now also to FIGS. 2, 3, 4, 5, and 6, the disclosure illustrates additional features, capabilities, and components of system 100 and its constituent subsystems, which enable system 100 to function as a central intermediary to protect PII and enable secure messaging between participants P. For example, FIGS. 1 and 2 depict aspects of user account management ("UAM") service 150 that enable users to instantiate other services such as identity content and attribute management ("ICAM") service 200, to create accounts and submit data to (see, e.g., dashed-line arrows depicting communications). Such services also further instantiate and utilize identity management ("IM") service 300 to enable creation, verification and management of unique identities, based on and created with identity content received from users.

As may be understood from FIGS. 1, 2, and the remaining figures, services 150, 200, and 300 also further support and enable improved message and event handling by confab and messaging ("CM") service 400, which is configured to enable secure communications between message exchange participants P. These include, for example, hosts that generate and send messages, recipients that may send reply messages, recipient audiences, message and reply reviewers, and other types of participants P. CM service 400 is also configured to operate in cooperation with various other services and processes, including for example, query service 500, predictive modelling ("PM") service 600, query analysis ("QA") service 700, and ruleset management ("RM") service 800. As used herein, "confab" is generally intended herein to mean an informal conversation, which here refers to interactions between participants P. Such interactions can include for example without limitation, messaging and advertising campaigns and other engagements with and between hosts and recipients and other participants P, which are also referred to herein as users, individuals, businesses, organizations, customers, entities, and by other similar nomenclature.

FIGS. 3, 4, 5, and 6 illustrate variations of the disclosure that include system 100 and its subsystems and components, and which illustrate an exemplary data storage and management infrastructure and architecture, and relationships between data elements of system 100. These include for example functional and logical data relationship configurations that enable system 100 to capture, store, retrieve, and communicate various data. Each of FIGS. 3, 4, 5, and 6 include legends that schematically depict exemplary processes and data flows and data relationships between such data elements, including for example zero-to-one, zero-to-many, one-to-one, one-to-many, and many-to-many logical and functional relationships, as depicted in the figures.

Figure 3:
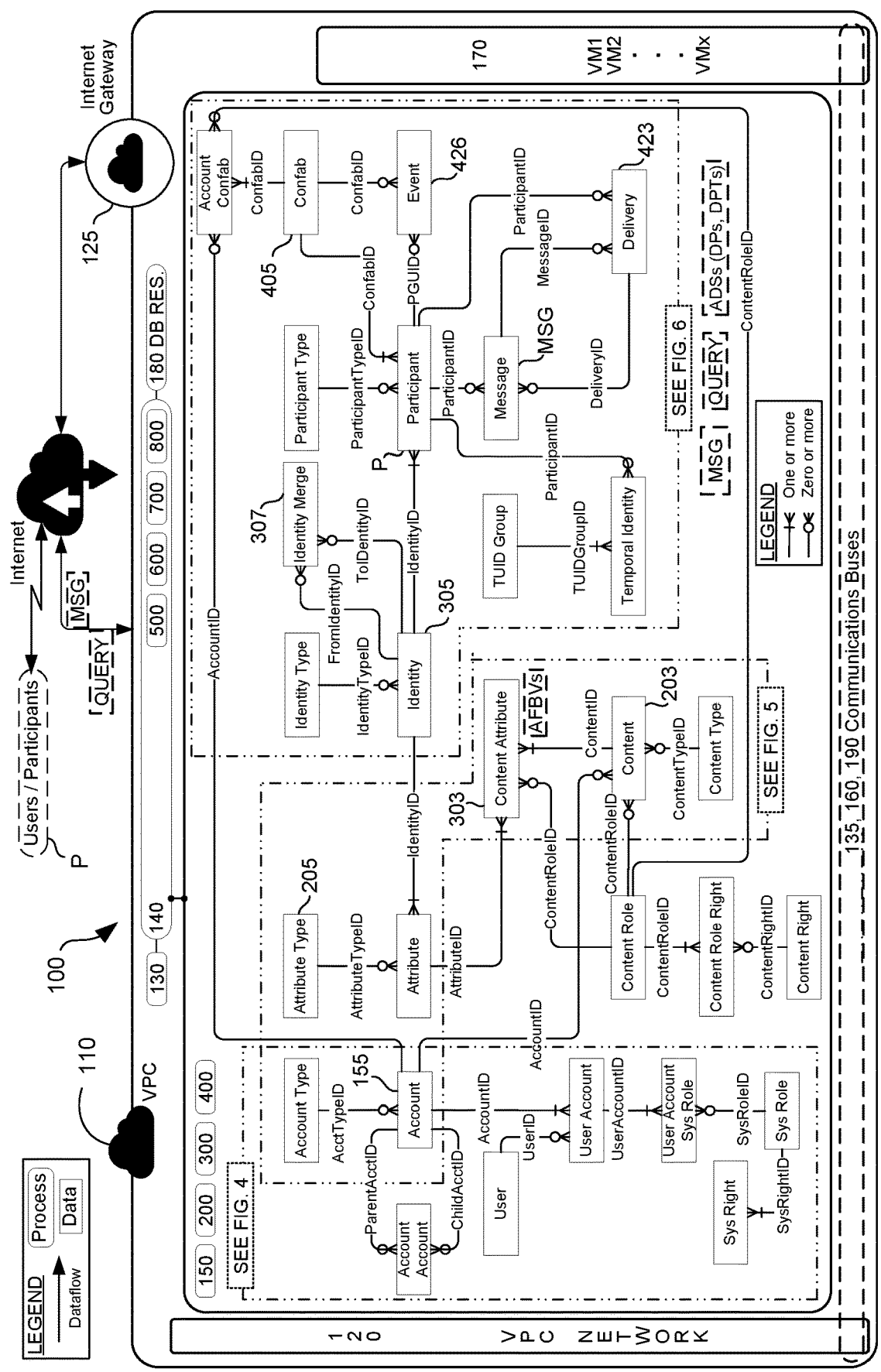
FIG. 3 shows the messaging system of the preceding figures with additional features and example data items and elements, relationships therebetween, illustrated for certain processes, subsystems, and elements.

For further example, FIG. 3 describes an example implementation of system 100 wherein underlying and foundational data item and data item entity relation schema are defined for and to enable each of the services and processes, including UAM service 150, ICAM service 200, IM service 300, CM service 400, query service 500, PM service 600, QA service 700, RM service 800, and databases 180, 601, 701, etc., among other services, processes, data, databases, elements, and subsystems. Such underlying data items and their data item entity relations or relationships include, for example without limitation, those for account 155, participant P, identity 305, confab 405, message 407, 408, 411, 414, 417, 420, 423, ("MSG"), event 426, and other data items, which data items are managed for update, storage, retrieval, and communication by the exemplary services and processes of system 100.

Figure 4:
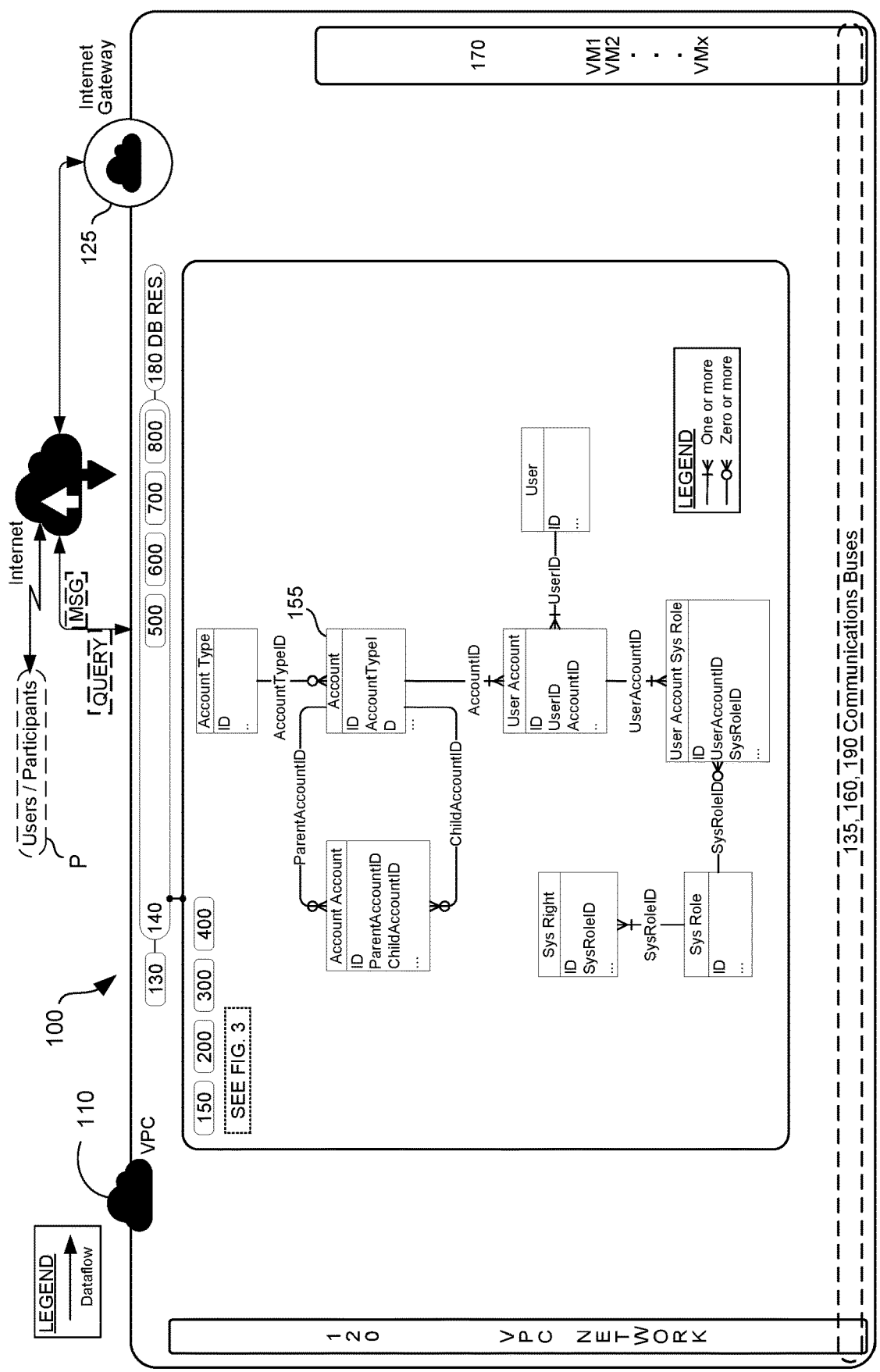
FIG. 4 illustrates the messaging system of the preceding figures with additional system account and user data items and elements depicted in more detail for exemplary subsystems and processes.
Figure 5:
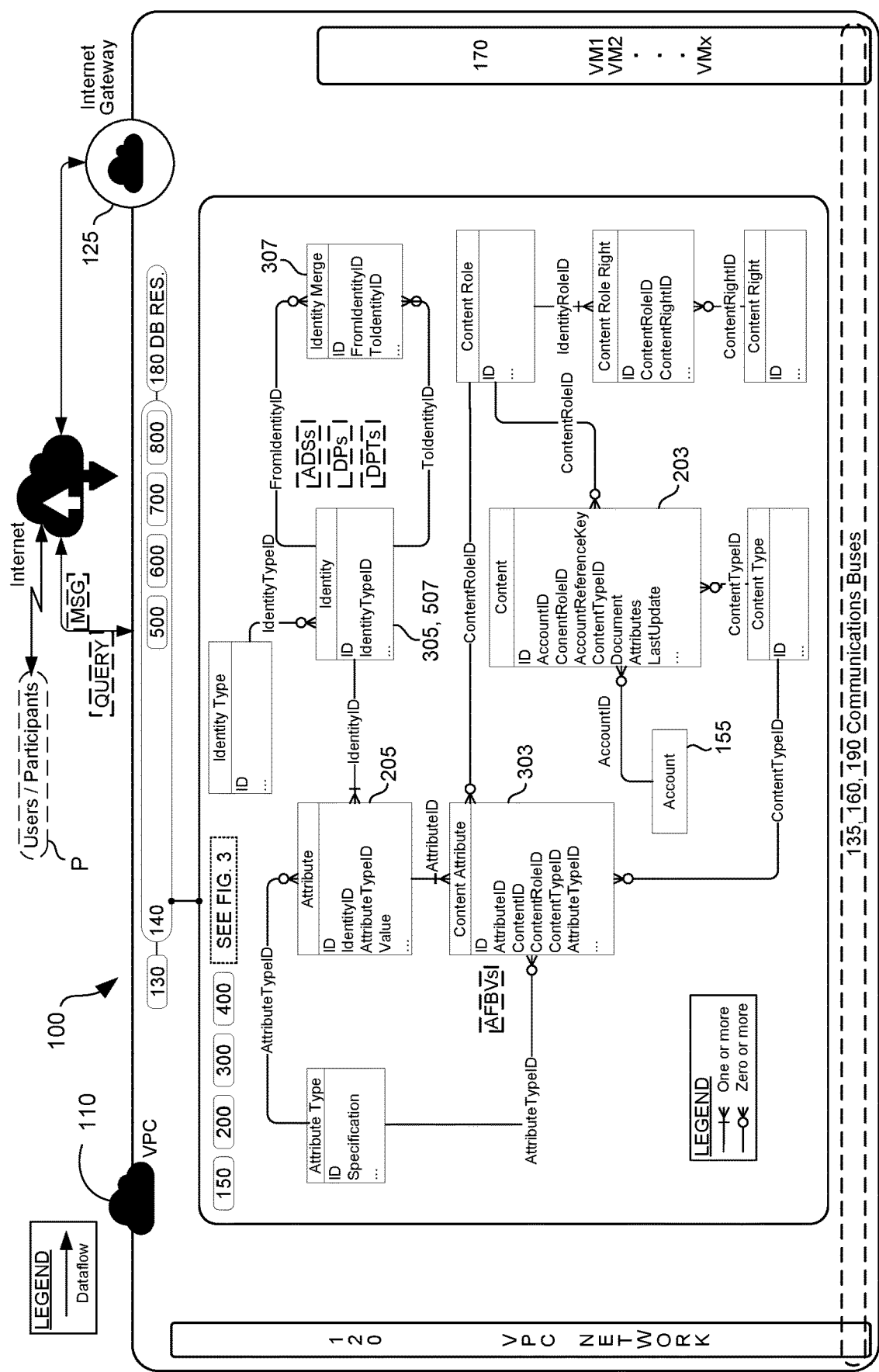
FIG. 5 shows the messaging system of the preceding figures with still further examples of data items and elements and relationships illustrated for exemplary identity management subsystems, data, processes, and elements.
Figure 6:
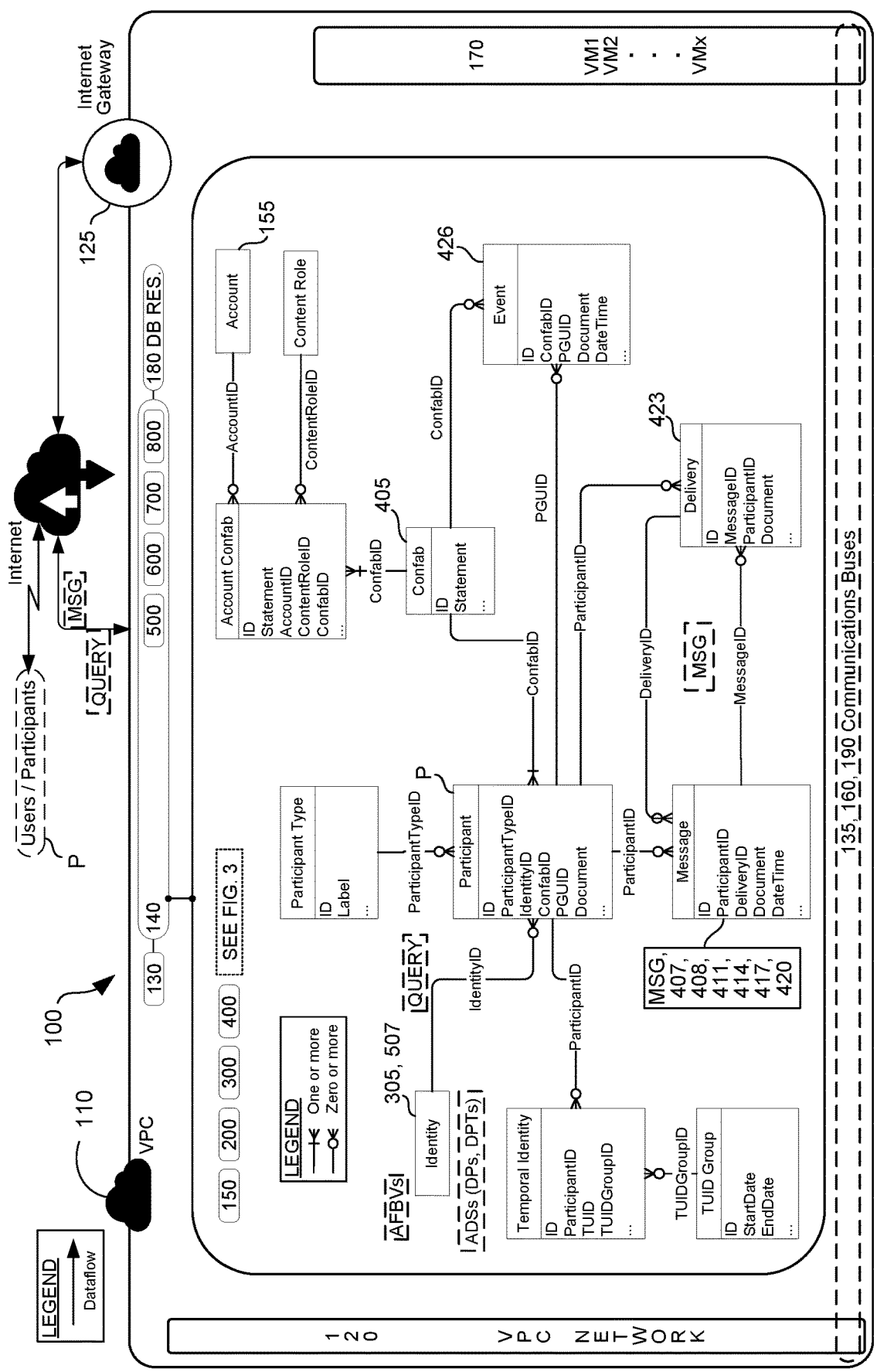
FIG. 6 depicts the messaging system of the preceding figures and also shows further details of certain subsystems and elements, including exemplary data element relationships for example confab, event, participant, and messaging data and subsystems.

FIG. 3 includes references to FIGS. 4, 5, and 6. For example, FIG. 4 describes additional examples of architectural and data relationship details of FIG. 3, as denoted in part by the circumscribing dashed lines of FIG. 3 that reference FIG. 4. Similarly, FIG. 5 is directed to aspects of FIG. 3, which includes circumscribing and dashed lines that reference FIG. 5. FIG. 6 is also referenced by dashed, circumscribing lines of FIG. 3.

Figure 7:
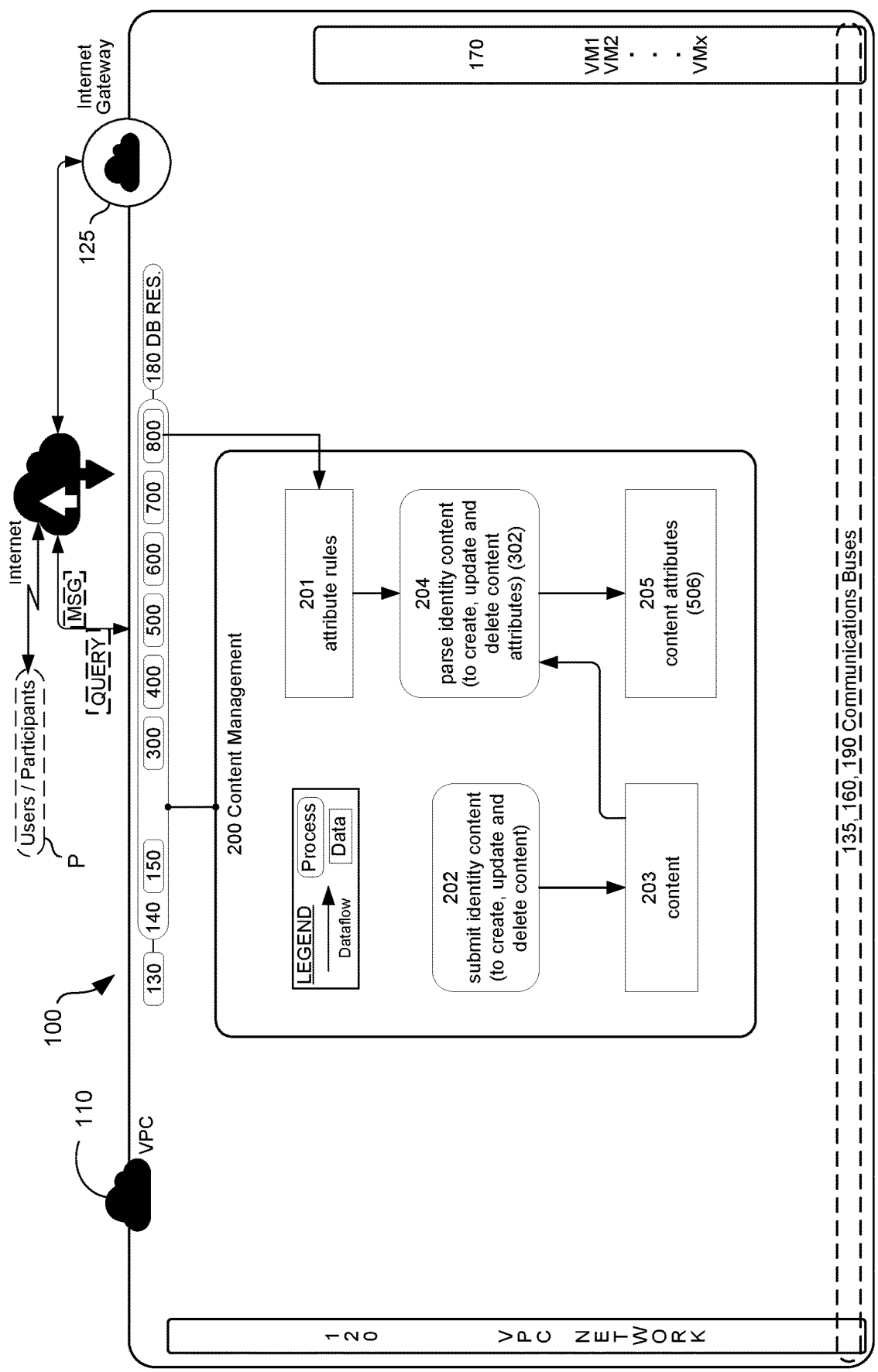
FIG. 7 illustrates the messaging system of the preceding figures, and includes for purposes of further example, depiction of additional identity, user, and content features for certain subsystems, processes, and elements.
Figure 8:
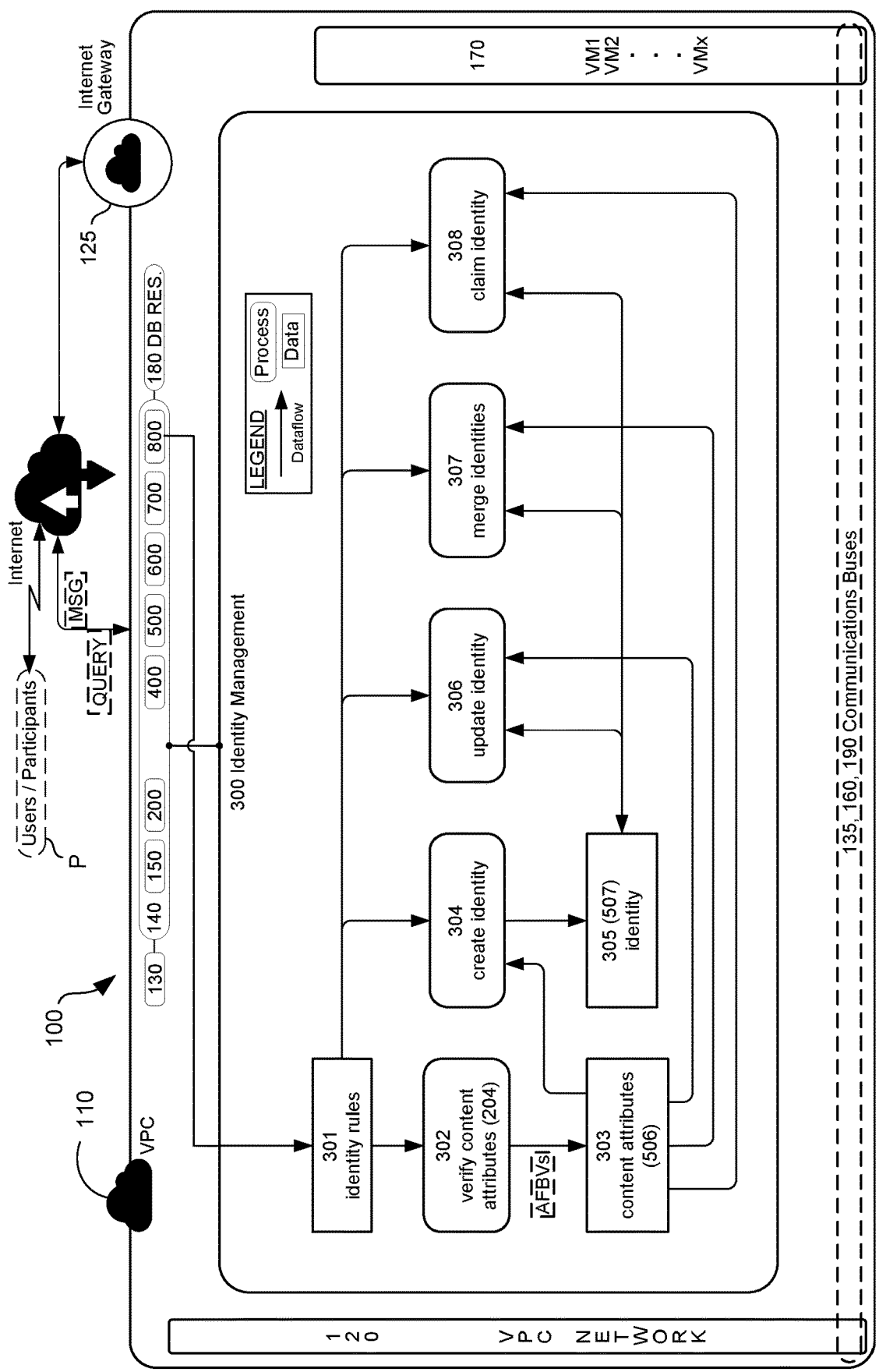
FIG. 8 shows the messaging system of the preceding figures with additional capabilities and features illustrated for certain additional user, identity, and content processes, subsystems, and elements.

With continued reference to the preceding figures, and now also to FIGS. 7 and 8, system 100 also contemplates various types of accounts 155 that are created and managed by UAM service 150, ICAM service 200, IM service 300. For example, person and non-person accounts 155 may be created and used to identify users, individuals, and entities that are assigned identities 305. Accounts 155 can be created and utilized by process 202, to receive submitted identity content 203, which can be analyzed and parsed by process 204. In various implementations of the disclosure, identity content creation by processes 202, 304, verification by processes 204, 302, and management by processes 306, 307, 308, can be accomplished without identity 305 being required to initially identify a specific participant P. Further, identity 305 may be created by a user independent of and without the user being associated with the created identity 305.

Identity content 203 is analyzed and parsed by process 204 of ICAM service 200, to create unverified identity attributes 205, as prescribed by and according to attribute rules and or ruleset(s) 201. Identity content 203 and unverified identity attributes 205 may contain PII information.

Attribute rules or ruleset(s) 201 are stored and retrieved from ruleset management RM service 800. ICAM service 200 and IM service 300 are also configured to receive and analyze unverified identity attributes 205 by process 302, according to identity rules and or ruleset 301. This enables users to authenticate their PII such that IM service 300 and its constituent processes can create verified identity content attributes 303.

Such verified identity content attributes 303 are thereafter further utilized by IM service 300 and process 304 to create new identities 305. Identities 305 can be updated via process 306, and can be analyzed for duplication and merged with other identities 305 by process 307, which enables detection and merger of duplicate identities 305. Process 308 is configured to enable users to claim identities 305, which may have been created by others, and which thereby enables users to establish ownership of and to control permissions enabling use of and changes to their respective PII.

Identity content attributes 203 may be submitted and received by process 202 by person and non-person accounts 155. Person accounts 155 may claim by process 308 the created identities 305, and may then manage the verified PII attributes 303 associated with that identity 305. Person accounts 155 can by process 306, update verified PII identity content attributes 303 and can update permissions to enable sharing such updates with other person and non-person accounts 155, according to roles and rights managed by the person account and other accounts 155, and or according to rules 201, 301, and others. When multiple identities 305 are created, and then found to be redundant and or duplicative by IM service 300 and process 307, identities 305 can be automatically merged by process 307, which can also enable a person account 155 to centrally manage the PII attributes 205, 303, 506 according to updates received by process 306 from individuals or participants P.

The disclosure introduces new innovations and capabilities that are utilized to protect PII and minimize the likelihood PII can be exploited and or ascertained, by deanonymization of information generated by system 100. Such innovations and capabilities also include, for example, generation and or calculation of a deanonymization probability ("DP") and comparison to a DP threshold ("DPT"), which are generated and compared in ways that enable a high-performance, high-speed, high-throughput performance of system 100. As described herein, the disclosure enables system 100 to receive, analyze, and execute queries to search databases 180 for potential message recipients and participants P in confabs 405, and to quickly generate responsive query results of ADSs containing such potential recipients and participants P.

As described elsewhere herein in more detail, the disclosure further enables rapid generation and or calculation of DPs for one or more or all of the queries and ADSs, so that queries and or responsive ADSs that have DPs exceeding the DPT are rejected and or not used. When the DPs exceed the DPT, then system 100 prevents return of the ADSs, and can instead generate an error message, and or alternative queries that generate ADSs having DPs that do not exceed the DPT, which protects and or prevents disclosure of protected PII by reducing the likelihood that responsive ADSs can be deanonymized. As described in more detail elsewhere herein, this capability improves the protection of PII and reduces the possibility that PII can be exploited and misused. System 100 may also generate and or calculate the DPs for either the queries or the ADS, or both, such that quick comparisons on the associated DPs can be quickly ascertained without the need to fully generate a responsive ADS containing substantially more data, which conserves system resources and improves performance. Thereafter, new alternative queries are developed and generated, for which DPs will not exceed the DPT.

As also described herein, system 100 of the disclosure also contemplates additional identity anonymization capabilities that can include, for example, generating new pseudoidentifiers or pseudo globally unique identifiers ("PGUIDs") for each identity, in response to a query or queries. Among other innovations, this also enables system 100 to manage secure message communications while protecting and without revealing PII to system users and participants that are exchanging messages. These new capabilities augment and enable query processes 402, 502, 504, 704, 706, and other services and processes to ensure anonymized datasets 508, 613, 707, have a reduced probability of being deanonymized to derive or obtain otherwise protected PII.

With continued reference to the various figures, including again FIGS. 3, 4, 5, and 6, for purposes of additional illustrations of alternative variations but not for limitation, the depicted ER models illustrate exemplary data and relationships of aspects of system 100, which are also referred to in some contexts as tables. Tables and rows in such datasets may also be referred to as records. For example, table columns in each row of a dataset may be also be referred to as fields. For each such table or dataset therein, a single column is identified to be the primary unique identifier for each row; this column is usually referred to herein and in the accompanying figures as "ID." Although this simplified framework is used for illustration purposes, it does not limit the disclosure, which contemplates utilization of the many other architectures and data storage and retrieval technologies described and contemplated elsewhere herein. The use herein of words and phrases such as tables, rows, columns, records, and fields is intended to be representative and informative but not limiting, and should be understood by those skilled in the relevant fields of technology to translatable to the many other data storage and management technologies described herein.

Relations are created in a number of ways, and can include for example without limitation, databases 180 of mailing lists, marketing lists, customer lists, vendor lists, third-party subscription marketing databases, consumer data analytics databases, and many other types of databases that contain PII of potential message senders and recipients. Each of the contemplated databases 180 may have various architectures, which can include a simple and illustrative collection of tables that each have rows of such recipients, wherein each recipient row has columns of PII related to each recipient, such as for example, name, address, telephone number, email addresses, and related information. While such table, row, and column architecture examples are described here, this paradigm should be understood by those skilled in the art to be translatable to the many other suitable data management architectures described and contemplated by the disclosure.

In further examples, the illustrative table, row, column exemplary descriptions may also include a table row that contains a content attribute, such as for example an identity content attribute 205, 303, 506, which references a primary unique identifier of another table row. By convention herein and for example without limitation, these references are depicted herein to have names of the form [tablename]Id, as depicted in for example in FIG. 3, wherein "Sys Right.SysRoleId" references a row in the "Sys Role" table. Also by convention herein, when the disclosure refers to a table name by itself, it generally also may refer to a row in the table. This convention is intended to improve readability of the various figures by those knowledgeable in the relevant technology, including for example FIGS. 3, 4, 5, and 6, and others, as described and referenced by the disclosure.

Specified columns and figures therein may contain a structured document, and by further convention, these columns may be referred to as a document, rule, ruleset, or statement. As used herein, a structured document is one that follows a convention to self-describe its contents or uses some external document type specification that can be used to interpret the contents of the document. With the exception of structured document storage, the ER model is presented herein by what some persons skilled in the relevant technology often refer to as "third normal form."

The disclosure also contemplates utilizing a suitable database platform 180 and then translating the disclosure's ER model into a schema optimized for the target database platform(s), architecture, and technology. For example, if a purely relational database model is desired, the structured document content could be projected into new tables and relations sufficient to store that content. Translation of the ER model for a selected database platform 180 may involve de-normalizing the model shown herein, for example into a star schema, or in other examples, introducing higher order normalizations. The addition of other elements like memory caching, message brokers and brokering, and enterprise bus services would also influence the data model, transport, and other implementation considerations, sometimes with dramatic performance trade-offs, but none of these are believed to substantially change the core systems and processes and methods of operation of system 100.

The various figures, including for example FIGS. 3, 4, 5, and 6, schematically depict an exemplary, high-level overview of the primary specification, architecture, components, and tables contemplated by system 100 of the disclosure. Such are then more fully explained in the detailed description of the disclosure and the services, applications, and processes that use them, as illustrated elsewhere herein.

UAM Service 150

In a further example UAM service 150 is configured to enable users of system 100 to create accounts 155, utilizing system 100, and its constituent capabilities, services, and processes, as a central intermediary to submit, manage, control PII and related non-PII data, and to accord permissions and prohibitions controlling use by others, among other capabilities. Accounts 155 have an account type (FIGS. 3 & 4) that can be added during creation. Some account types include for illustration purposes:

Person or user account—the account is for an individual,
Business account—the account is for a business,
Non-Profit account—the account is for a non-profit organization,
Government account—the account is for a governmental organization, and
Account types other than a person account can be referred to as Non-Person accounts.

In general, a person account 155 will have only one associated user. Non-person accounts generally may have multiple associated users which can be defined as person accounts 155. Except for initial signup in system 100, which enables user logins, most actions performed in the system 100 are best described as being performed by a user signed into an account 155. Users and or participants P may be associated with one or more accounts 155, and an account 155 may be associated with one or more users and participants P. User account records are created to establish these relationships. For further example, UAM service 150 is configured to enable people or systems to create user logins. These users create or are associated with one or more accounts 155. These user logins allow persons and entities to interact as participants P with system 100 of the disclosure, according to roles and rights assigned to each such user account association.

User account access to services of system 100 are managed by an assigned user account Sys Role (see, e.g., FIG. 4). A user or participant P is assigned one or more Sys Roles by creating user account Sys Role records. Each Sys Role has one or more Sys Rights. System actions available in system 100 have one or more Sys Rights. The contents of Sys Roles, Sys Rights, and system actions are system configurations. Application code that performs a system action, for which a system action records exists, checks to see if the user account requesting the system action has the necessary rights to perform the action.

Accounts 155 may be associated in a hierarchical fashion. This is accomplished by creating "Account" records (see, e.g., FIG. 3) that identify one account record as being a child or parent of another account record. Once accounts 155 are arranged in a hierarchical manner, inheritance of user account roles and rights, and the inheritance of data owned by the accounts 155 can be expressed. UAM service 150 is also configured to manage such accounts 155 in connection with identities 305, 507, by way of enabling accounts 155 to perform identity content management actions that include, for further example, instantiating other processes and services described elsewhere herein.

ICAM Service 200

UAM 150 or another service or process of system 100 may also instantiate and cooperate with ICAM service 200, which enables account 155 to receive and utilize identity content via process 202 to create, update, and delete identity content stored as content 203, and to parse such content by process 204, to then generate unverified identity content attributes 205, as prescribed by attribute rules 201. ICAM service 200 is also enabled to submit identity content data by process 202 to create the content 203. This identity content data 203 is parsed via process 204, upon receipt from submit identity content process 202, and is used to create the unverified identity content attributes or data 205. Content attribute data 205 is in turn utilized to create verified identity content attributes or data 303, 506 and identities 305, 507.

ICAM service 200 may submit the same identity content 203 by process 202 one or more times, thereby creating a many-to-many relationship among attributes 205 and content 203 (see, e.g., FIGS. 3, 5 & 7). These relationship(s) are identified and captured by unverified identity content attributes 205. Such identity content 203 and attributes 205, submitted by an account 155 via process 202, may further include:

Permitted or specified actions—e.g., create or update, delete, among others;
Account identifier data—stored in the Content.AccountId field, 150;
Content type—stored in the Content.ContentTypeId field (See, FIGS. 3, 4, & 5):
Private PII—private PII content 203 managed by one account 155;
Shared PII—shared PII content managed by one or more accounts 155, possibly managed by one account 155 and shared with other accounts 155;
Private non-PII—document contains non-PII ("non-PII private content") managed by one account;
Shared non-PII—document contains non-PII ("non-PII shared content") managed by one or more accounts 155, possibly managed by one account 155 and shared with other accounts 155;
Private payment card industry ("PCI") data—payment methods data ("PCI private content") managed by one account 155;
Shared PCI—payment methods data ("PCI shared content") managed by one or more accounts 155, possible managed by one account 155 and shared with other accounts 155;
AccountReferenceKey—the Content.AccountReferenceKey field may be utilized as a unique cross-reference for identity 305 in an external system account belonging to account 155, which improves the capability of system 100 to interact with such external systems;
Identity data 205—a structured document stored in the Content.Document field; and
Submissions of content 203 for identity 305 is processed (204) according to attribute rules 201 and a content role is assigned to the Content.ContentRoleId field. A content role defines a collection of roles and rights relating to the creation and management of unverified and verified identity content attributes 205, 303, 506, and identities 305, 507. Content roles can include for example, authorized user, owner, reviewer, and other data.

The Content.Document value is parsed by process 204 as prescribed by attribute rules 201, to create an attributes document and or record 205 that is stored in the Content.Attributes field. The attributes or attributes document and or record 205 contains content attributes defined by, created, updated, and deleted as prescribed by attribute rules 201.

Each such content attribute 205, has descriptive attributes, defined by attribute rules 201. For example without limitation, some descriptive attributes include:

Attribute type—as defined in an attribute type table (FIGS. 3 & 5). For purposes of example, some PII attributes 205, include:
Email
Phone Number
First Name
Last Name
Address
Value
Content Role
Last update date
Verified Status
IM Service 300

System 100 of the disclosure contemplates that the content table composite key of accountID, accountReferenceKey, and ContentTypeId is unique (see, e.g., FIGS. 3 & 5). UAM service 150 may also instantiate IM service 300 to enable account 155 to submit similar identity content attributes 303 for identities 305, of the same content type, under different accountReferenceKeys, and may also submit identity content attributes 303 of different content type under the same accountReferenceKey.

IM service 300 also communicates with and enables accounts 155 to perform management actions for identities 305, 507, (see, e.g., FIGS. 7 & 8), as prescribed by identity rules 301, which are created, managed, and stored by IM service 300 and or RM service 800. Content attributes 205 are analyzed and verified by process 302, which creates and updates verified identity content attributes 303, according to rules and or ruleset(s) 301. As already noted, also included are create identity process 304, update identity process 306, merge identities process 307, and claim identity process 308, among others. Verify content attributes process 302 is also configured to apply identity rules 301 to establish if and how content attributes 205 are verified by process 302. For instance, an identity rule 301 can specify that a person account 155, submitting content attributes 205 that contain a personal email address, must respond to an email verification sent to a respective email address to verify, according to rules and or ruleset 301, one or more specified content attribute(s) 205 that of verified enable creation of verified identity content attributes 303, which in turn then by process 304 enables the creation of identity 305.

Content attribute verification process 302 and or rules/ruleset(s) 301 can be configured to enable simplified and complex verification actions. For instance, verification can configured by a rule and or ruleset 301 that requires integration, such as by APIs or other means, with an external, more complex, multi-step, third-party identity verification service. In another simplified example, the rule or rulesets 301 and other processes and services can enable and be configured to enable more common practices wherein a non-person business account 155 submits verified identity content attributes 303 for identities 305, 507, which have been previously verified in some other internal or external system. Identity rules/ruleset(s) 301 prescribe all verification processes available in the system 100 of the disclosure.

With continuing reference to FIGS. 3-8, in other modifications of system 100, IM service 300 also incorporates create identity process 304 configured to utilize identity rules 301 to specify what collection of verified content attributes 303 are to be utilized to create identity 305, 507, and to specify what content attributes 205 are needed, permitted, and or used to create verified identity content attributes and or records 303. As noted, identities 305, 507 are described by a collection of verified attributes 303, and an identity 305, 507 is created along with the one or more verified identity content attribute records 303. A content attribute record 303 is also created and utilized to track which unverified identity content attribute(s) and or record(s) 205 contributed to and or were utilized for the creation of a corresponding content attribute value of a verified identity content attribute or record 303. To further enable protections for PII, content role for a creating and or owning account 155, may also be assigned to the content attributes or record 303, which establishes the roles and rights of the associated account 155 for the respective identity content attribute 303 and identity 305, and the constituent PII that may be contained therein.

IM service 300 is also configured to enable accounts 155 to submit additional and or identical content attribute values for an attribute type. For example, two different business accounts 155 could submit the same email address for the same identity record and or identity 305, 507. In this example, only a single attribute value for the email address is created, and only a single identity and or identity record 305, 507 is created. However, two different identity content attribute records 303 may be created: one associating the first content record 203 to the attribute 303, and another associating the second content record 203 to the same verified attribute 303.

IM service 300 is further configured to enable one or more accounts 155 to submit multiple values for an attribute type of attributes 303. For example, a person account 155 submits identity content 203 containing two email addresses. Once parsed and verified, a single identity 305, 507 is created. Two attribute records 205 are created, and after verification, two verified content attribute records 303 are created. Unverified identity content attributes 205 are used to create additional verified identity content attributes 303 for identities 305, 507 according to and as prescribed by identity rules/rulesets 301. Unverified content attributes 205 are not identified as and or associated with PII contained in verified attributes or records 303 until verified. Thereafter, verified identity content attributes 303 are then associated with PII for a respective identity 305, 507. A create identity process 304 action is followed by a merge identities process 308 action, to detect duplicate data and to enable merger of multiple, identical identities 305, 507. A create identity process 304 action by a person account 155 can be followed by the merge identities process 307 action, and an account 155 can thereafter, by claim identity process 308, claim an identity 305, 307 not previously or already associated to the account 155.

IM service 300 further includes update identity process 306, which is also configured in other variations to utilize identity rules 301 to establish how identity content attributes 303 are updated and associated with an existing identity 305, 507. Update identity process 306 actions are followed by the merge identities process 307 actions to ensure such contemplated updates do not create duplicate data, and that duplicate data is merged. The update identity process 306 action is typically performed automatically and or by a person account 155. The merge action may be preceded or followed by the claim identity process 308 action, to protect PII updates and permissions for use, by affirmation of association of identities 305, 507 by users of respective accounts 155. Merge identity process 307 of IM service 300 also employs identity rules 301 to prescribe how identity content attributes 303 are merged into identities 305, 507. Identity merging by process 307 is accomplished when two or more existing identity records 305, 507 are determined thereby to represent the same identity.

For example, two business accounts 155 submit identity content by process 202 with different email addresses and two identity records 305 are created. Subsequently, a person account 155 submits identity content by process 202 containing both email addresses matching those previously submitted by the business accounts 155. The database content is updated to reflect that one of the existing identity records 305 is selected for association with the person account 155; the other existing identity record 305 can be marked inactive, deleted, or associated with a different account 155. When marked inactive, the associated verified identity content attribute record 303 is copied and associated with the remaining identity record 305, which results in two new identity content attributes records 303 associated with the remaining active identity record 305.

IM service 300 also includes claim identity process 308, which also uses identity rules 301 to define how accounts 155 are enabled to claim identity 305, and what actions an account 155 may take on attributes having a content type of shared PII, shared non-PII, and shared PCI, which are associated with a claimed identity 305, 507. The intent of claimed identities 305 is to enable accounts 155 to create shared attributes, and eventually have the actual owner of the identity 305 claim the correct identity, and thus it's shared attributes, to in turn enable management of associated identity content attributes 303. A claimed identity 305, 507 is one where an account 155 has a content role of owner for one or more shared PII attributes 303 associated with the identity 305. Two accounts 155 may not have content role owner for attributes 303 belonging to the same identity 305. Identity rules 301 also may prescribe identity dispute and remediation processes. Identity rules 301 can also prescribe that shared non-PII attributes 303 may be owned by accounts 155 including accounts that do not yet claim the identity at issue.

During operation, IM service 300 and cooperating services can be instantiated to enable person account 155 to create a shared identity 305, 507 in the following example.

1. John Q. Public creates a person account "John Q. Public" and or "John" 155 by UAM service 150 (FIGS. 1-7).
2. By instantiating ICAM service 200, person account John 155 submits by process 202 shared PII identity content:
   a. including an email address john.q.public@email.com;
   b. new identity content record 203 is created by process 202, which assigns a content role of owner; and
   c. A generated default value, equal to the accountId is assigned to the accountReferenceKey value.
3. Identity content 203 is parsed by process 204, and identity content attribute record 205 is created for the email content attribute.
4. Content attribute 205 is verified by process 302:
   a. an email is sent by process 302 according to rule(s)/ruleset(s) 301, containing a verification link, to john.q.public@email.com;
   b. John receives the verification email and clicks on the verification link; and
   c. Content attribute 303 is verified and created by process 302.
5. Process 304 uses verified identity content attribute 303 to create an identity 305, 507:
   a. Process 304 checks to ascertain if identity record 305 exists, which has an email attribute record with a value of john.q.public@email.com;
   b. If no match is found, a new identity 305 is created including an unverified identity attribute record 205, and verified identity content attribute record 303; and
   c. Identity content attribute record 303 is assigned a content role of owner.

In another exemplary operation, UAM, ICAM, and IM services 150, 200, 300 are instantiated, and a business account 155 creates a shared identity and person account 155 that will subsequently claim identity 305:

1. A business, ACME, collects consent for and subsequently captures and stores PII for John Q. Public in their external system. The PII consists of John's email address john.q.public@email.com. ACME has independently verified John's email address. ACME has assigned a unique identifier for John in their system.
2. UAM service 150 enables ACME to create business account "ACME" 155.
3. ACME business account 155 then submits shared PII identity content by process 202:
   a. Submitted data includes an accountReferenceKey value (the unique identifier of John in the ACME system) and an email address john.q.public@email.com;
   b. Process 202 creates new content record 203; and
   c. Content record 203 is assigned a content Role of Authorized User.
4. Identity content 203 is parsed by process 204, and content attribute 205 is created for the email content attribute.
5. Content attribute 205 is verified by process 302:
   a. ACME business account 155 attests to verification of the email address; and
   b. Email content attribute 303 is verified and created by process 302.
6. Verified content attribute 303 uses create identity process 304 to create identity 305, 507:
   a. One or more of the processes of IM service 300 check if an identity record 305 exists having an email attribute with a value of john.q.public@email.com;
   b. If not found, a new identity 305 is created comprising an identity, attribute, and content attribute records 303; and
   c. Content attribute record 303 is assigned a content Role of authorized user.

In this example, ACME business account 155 submitted PII email address john.q.public@email.com, and created shared identity 305 and a verified PII content record 303 associated with the ACME business account 155. When the existing PII email is detected, John claimed the identity 305 associated with that PII. Assigning a content role of owner enabled the operation of claiming account 155.

In other variations of the preceding arrangements, a shared identity merge operation is described. Here, multiple accounts 155 submit PII relating to the same identity 305 and such PII cannot be matched with existing PII identities 305 or content attributes 303, so multiple identities 305 are created. Subsequent PII submissions are processed by ICAM and IM services 200, 300, which enable searches and matching, such that PII content is merged by process 307 under a single identified and matching identity 305. The following use case assumes business ACME and business BCME have each acquired consent of the PII owner, and then captured PII for John Q. Public on their respective systems. Their customer John provided each business with different valid email addresses.

1. ACME utilizes system 100 to create business account "ACME" 150.
2. Business account ACME submits shared PII identity content by process 202:
   a. Including an accountReferenceKey value (the unique identifier of John in the ACME system) and an email address john.q.public@email.com;
   b. New content record 203 is created by process 202; and
   c. Content record 203 is assigned a content Role of Authorized User; and
3. Identity content 203 is parsed by process 204, and content attribute 205 is created for the email content attribute.
4. Identity content attribute 203 is verified by process 302:
   a. Business account ACME attests that they have verified the email address; and
   b. Email identity content attribute 203 is verified by process 302.
5. Verified identity content attribute 303 is used by process 304 to create an identity 305;
   a. Process 304 checks if an identity record 305 exists that has an email attribute record with a value of john. q. public@email.com;
   b. If no match is found, new identity 305 is created; including an identity, attribute, and content attribute records; and
   c. Content attribute record 303 is assigned a content Role of Authorized User.

In this preceding operation, UAM, ICAM, and IM services 150, 200, 300, enabled ACME to submit the PII john.q.public@email.com, and to create an identity 305. Next BCME utilizes system 100 as previously described, and as follows:

6. BCME creates business account "BCME" 155.
7. BCME business account 155 submits shared PII identity content by process 202:
   a. Including an accountReferenceKey value (the unique identifier of John in the BCME system) and an email address john@differentemail.com;
   b. New content record 203 is created by process 202; and
   c. Content record 203 is assigned a content role of authorized user.
8. Identity content 203 is parsed by process 204, and content attribute 205 is created for the email content attribute.
9. Content attribute 203 is verified by process 302:
   a. BCME business account 155 attests they have verified the email address; and
   b. Email attribute is verified by process 302.
10. Verified content attribute 303 is used by process 304 to create an identity 305:
    a. Process 304 also checks if an identity record 305 exists that has an email attribute record with a value of john@differentemail.com;
    b. If no match is found, new identity 305 is created comprising an identity, record, and content attribute records; and
    c. Content attribute record 303 is assigned a content role of authorized user.

In this preceding operation, BCME submits the PII john@differentemail.com, and creates an identity 305, which is followed by subsequent actions as follows:

11. John Q. Public creates a person account "John" 155.
12. Person account John 155 submits by process 202 shared PII identity content 203:
    a. Including two email address john.q.public@email.com and john@differentemail.com;
    b. New content record 203 is created by process 202;
    c. Content record 203 is assigned a content role of owner; and
    d. A default value equal to the accountId is assigned to the accountReferenceKey value.
13. Identity content 203 is parsed by process 204:
    a. Content attribute 205 is created for each email content attribute provided.
14. Each attribute is verified by process 302:
    a. an email is sent, containing a verification link, to john.q.public@email.com;
    b. John receives the email and clicks the verification link, to verify content attribute 303;
    c. an email is sent, containing a verification link, to john@differentemail.com; and
    d. John clicks the verification link to verify the content attribute 303.
15. Verified content attribute with the value john.q.public@email.com is used to update identity 305 by process 306:
    a. Process 306 checks if an identity record 305 exists having an email attribute record with a value of john. q. public@email.com;
    b. If a match is found, identity 305 is updated to incorporate content attribute record 303; and
    c. Content attribute record 303 is assigned a content role of owner.
16. Verified content attribute 303 with the value john@differentemail.com is used to update identity 305 by process 306:
    a. Process 306 checks if an identity record 305 exists having an email attribute record 303 with a value of John.q.public@email.com;
    b. If a match is found, identity 305 is updated to include the content attribute record 303 with the new email address; and
    c. Content attribute 303 record is assigned a content role of owner.

In this prior example operation, John submitted the PII john.q.public@email.com and john@differentemail.com, and claimed both identities 305 associated with these email addresses. In a continuing example operation, further processing occurs as follows:

17. UAM, ICAM, and or IM services 150, 200, 300 instantiate merge identities process 307:
    a. Process 307 checks if shared PII content attribute records associated with person account John 155 are associated with more than one identity 305;
    b. If two identities 305 are found, as an example, the first found identity record 305 is selected too keep, and the second identity record 305 is marked inactive, or deleted;
    c. Process 307 then selects content attributes 303 associated with both first and second identities 305, content attribute records 303 associated with the second identity record 305, are copied and associated with the first identity's attribute 303; and
    d. Content attributes 303 associated with first identity 305, but not with second identity 305, are copied, along with their content attribute records 303, and associated with the first identity record 305.

In this example operation, two identities 305 associated with John are reduced to one identity 305 by marking one identity 305 inactive and making copies of attribute and content attribute records 303 of each identity 305 and associating such with the first selected identity.

In another operational example, UAM, ICAM, and IM services 150, 200, 300 are instantiated to enable a business to synchronize and manage their local customer PII on system 100. The services enable accounts 155 to submit private PII content to create, update, and merge identities 305 by processes 304, 306, and 307. Submission of private PII cannot be used to create or update an identity 305 by process 308. Content attributes 303 created from private PII content submission are not shared with other accounts 155 and are managed only by the account 155 that originally submitted the data for such content attributes 303. The most common use of private PII identity content is for a business account 155 to upload and manage a customer list where the business account 155 always manages and retains ownership of the customer list.

Even if a person account 155 claims the identity, associated with the private PII content, only the business account 155 that uploaded that content is enabled to update that private PII content attributes 303. Private PII content attributes 303 submitted have a content role of owner associated with the account 155 that uploaded such data. Still other variations of the preceding examples contemplate services 150, 200, 300 configured to enable management of non-PII content attributes 303, wherein accounts 155 submit non-PII identity content associated with an identity 305, 507. Submitting account 155 owns and manages the non-PII identity content attributes 303.

System 100 and method of operation also contemplate operational uses that enable individuals to create a person account 155, and to create and manage their identity 305, 507, in an operational example as follows:

1. The individual creates a person account 155 by UAM service 150.
2. Person account 155 submits by process 202 shared PII identity content 203 and process 204 generates content attributes 205.
3. Process 302 verifies content attributes 205, which are then used to create identity 305, which is represented by, includes, and or is associated with:
   a. Identity record 305, 507;
   b. Unverifried identity content attributes and or record(s) 205; and
   c. Verified identity content attributes and or records(s) 303, 506.

With continuing reference to the preceding figures, and now also to FIGS. 9, 10, 11, 12, and 13, accounts 155 that are enabled and managed by UAM service 150, are further configured to be utilized to instantiate and or cooperate with other system services and processes to enable hosts to create and communicate messages secured to protect and or prevent unwanted disclosure of PII, and to create queries to search for potential and desired message recipients. This is accomplished for example by instantiating one or more of CM service 400, query service 500, PM service 600, QA service 700, RM service 800, and other services and processes.

CM Service 400

Figure 9:
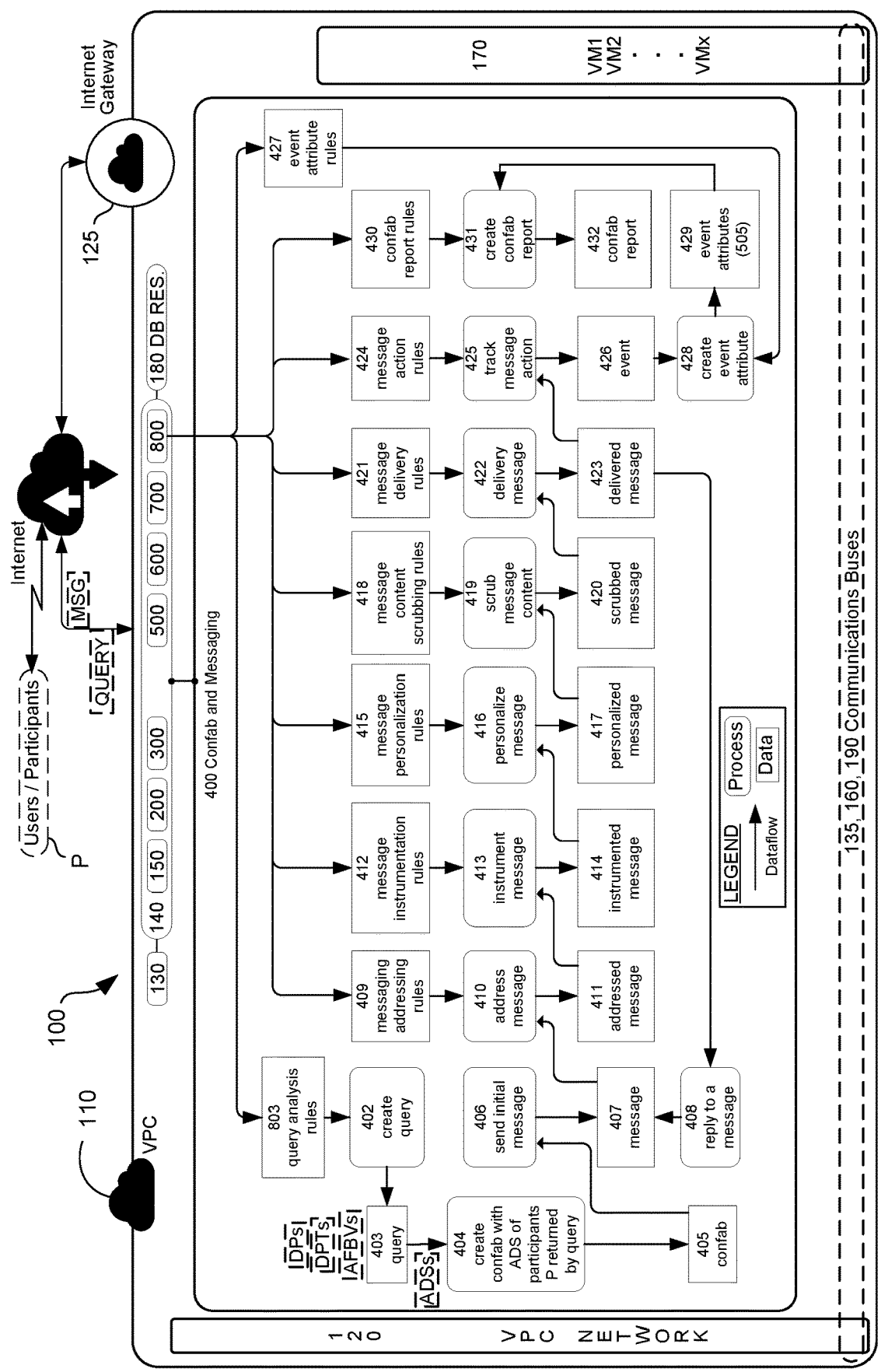
FIG. 9 depicts shows the messaging system of the preceding figures, and includes further examples of features and arrangements of various confab, event, query, and message services, processes, subsystems, and elements.

Accounts enabled and managed by UAM service 150, ICAM service 200, and IM service 300, can instantiate and for further example cooperate with and or utilize CM service 400 of FIG. 9 and other services and processes, to create, generate, execute, and use queries 403 to search for and find identities 305 that identify potential messaging recipients and participants P, for confabs 405. These can include audience, reviewer, host, and other participants P. See, e.g., FIG. 2, CM service 400, "identity 2", which contemplates one or many such audience participants P, FIG. 3.

Such potential recipients and participants P are those with which a host or marketer using an account 155 will send and exchange messages 407 (also referred to as "MSGs"). In one example, an identity 305 owned by account 155 or that is permitted to use the account 155, acts as the host participant P. See, e.g., FIG. 2, CM service 400, "identity 1," which generates and executes query 403. This host participant P can utilize the query 403, to generate the ADS, and to thereafter create and send messages 407 (MSGs) by process 406, and to receive replies 408 thereto, after further message processing by the other constituent processes of CM service 400, and other services and processes.

CM service 400 generates and or utilizes queries 403 or other queries to search for and retrieve ADSs 508, 613, 707 containing anonymized identities or pseudoidentities of potential recipients of messages MSGs, and to create by process 404, a confab 405. CM service 400 may also instantiate and utilize other processes and services, such as query service 500, PM service 600, and or QA service 700, which can be utilized to generate and calculate DPs for comparison to the DPT, and to thereby ensure only those ADSs 508, 613, 707 are generated and returned or communicated, which have an acceptably minimized likelihood of being deanonymized. In other words, before a responsive ADS is generated and or returned, the various services and processes can be configured to generate and or calculate the DPs and ensure such DPs do not exceed a predetermined, selected, default, and or preferred DPT.

If the DP exceeds the DPT, CM service 400 and other services and processes may instantiate other services and processes, such as for example, QA service 700 of FIG. 12, to generate alternative query 612 and retrieve alternative ADS 613, which will have a DP that does not exceed the DPT. The DPT can be selected and predetermined as a preference and or default wherein, for example, it may be deemed that ADSs 508, 613, 707 are acceptable to host or participants P, users, and or others, if such ADSs have respective DPs equal to such a preferred, predetermined, and or default DPT value. Such exemplary DPs, may for example but not limitation be about 10% or less of a likelihood of deanonymization (e.g. about 9% to about 11%), or some other suitable value.

Additionally, identity content attributes 205, 303, 506 contained therein may include one or more attribute function business values ("AFBVs"), which are described elsewhere herein and are configured to enable assessment, analysis, and prioritization of such ADSs with respect to a level of importance that users may attach to particular identity content attributes 303. As described and depicted herein, ADSs 508, 613, 707 are generally described to refer to a single ADS and or multiple ADSs that may be generated by one or more respective queries 503, 612, 703.

As also described herein, ADSs are identified by a reference numeral that generally corresponds with the service utilizing the ADS only for illustrative purposes, but not for limitation. For example, when discussing query service 500, the disclosure and figures may refer to query 503 and ADS 508; and when describing features of PM service 600, the disclosure and figures may refer to query 612 and ADS 613, etc. Such references may in some examples be considered to be interchangeable and referencing the same or different queries, ADSs, and other similarly reference features and elements.

Participants P exchange messages by instantiating system 100 and utilizing CM service 400, among other services and processes, via web app firewall and tier subnet 130, and or by other applications, processes, and services. Various message management processes are described herein and in FIG. 9 in various sequences of operation only for purposes of illustration, but not for purposes of limitation. The disclosure contemplates that such exemplary operations can also be accomplished in various different sequences and all such processes may not necessarily be utilized for every message, at all times, but may be performed only upon demand and or in certain, desired circumstances.

Further exemplary variations include messages 407 (MSGs) and actions taken on and in response are tracked by CM service 400 and other components, and are used by CM service 400 to create events 426 for each interaction between a host or participant P sending a message 407, and a recipient participant P receiving and acting on and or communicating a reply message 408. See, e.g., FIGS. 2, 15, 16, wherein the host and or marketer acting on behalf of the host can be referred to as Identity(ies) 1, and the recipient as Identity(ies) 2.

Events 426 are utilized to create additional event attributes 429, 505 to track and store a record of actions, which can also be associated with the identities 305, 507 of the participants P. This data may then be also used in and to form additional queries 403, 503, 612, 703 for data analytics and analysis of responses to messages, event data, and other related data. Such additional queries 403, 503, 612, 703 can also be used to search for identities 305, 507 that may be participants P in a particular confab 405 or event 426, such as a marketing campaign or other event or interaction. Generated events 426 can refer to a specific sent or processed message or reply, as well as to a marketing campaign, and any other contemplated interaction between participants P.

In further variations, CM service 400 includes create confab process 404 further configured to enable an account 155 to create query 403 and a confab 405 with and between hosts and participants P for each identity 305, 507 returned from query 403. Identities 305, 507 for participants P are also associated to each confab 405 and or each event 426, for each identity 305 returned from the query 403. Each participant record is assigned a new pseudoidentity, pseudoidentifier, or PGUID. Such PGUID values may be and or are 128-bit globally unique identifiers or GUIDs (globally unique identifiers).

Participant records are associated with and related to a participant type (FIG. 3), which include, for example:
  Host—the participant P that sends a first message 407, 423 in a confab or message thread (See, e.g., FIGS. 2, 15, 16, Identity(ies) 1)
  Audience—the participant receiving the first message 423 in a confab or message thread (See, e.g., FIGS. 2, 15, 16, Identity(ies) 2)
  Reviewer—the participant receiving the first message 407 in a test message confab or thread (this feature is used in marketing applications and configurations of system 100 where messages 407 are sent for review by test or reviewer participants P or the host P prior to actual messages 407 being processed and sent to the full audience of participants P) (See, e.g., FIGS. 2, 15, 16, Identity(ies) 1 or Identity(ies) 2)

As may be understood with continuing reference to the figures and FIG. 9, the create confab process 404 enables account 155 to create participant records of type "audience." Participant records of type host and reviewer are also created by account 155, generally for identities 305 owned by account 155. Host participants P create a message MSG and create confab 405, and send initial message(s) 407. For Participants of type audience, a document field of the participant record includes a structured document with verified identity attribute content 303, 506 returned from the query 403. To protect against disclosure of PII, a limited number of fields may be returned. These can include for example, a ConfabID (FIG. 3), a PGUID, and the structured document fields, which are returned in ADSs 508, 613, 707 in response to query 403, 503, 612, 703.

Two or more accounts 155 may play a role in creating and executing confab 405. For example, a retailer or business may have hired the services of a marketing firm. The retailer's or business' account 155 may utilize process 402 to create query 403 and confab 405, which in turn generates an ADS or ADSs in response to the query 403. Then the marketing firm's account will be enabled or given permission to utilized the retailer/business account 155 to create, review, and send an initial message(s) 407 by process 406, which initially may also include a contemplated test message 407, that can be approved by the business/retailer before being sent to the anonymized recipients identified by query 403 and the responsive ADS(s).

In other examples of the disclosure, during operation of CM service 400, send initial message process 406 is configured to enable an account identity 305, termed here the "Host", to create an initial message by process 406, through the system 100, to one or more participants P of type audience, to send message(s) 407. Message replies 408 create a message thread identified by track message action process 425 and captured by event 426 and or event attribute(s) 429. Any or all of the host and audience identities 305 of participants P may be anonymous in the message thread. PGUID values are assigned to each participant record regardless of the required PII protections and or anonymization of the associated identity 305. Sending message process 406, creates initial message 407, which is associated to the host and or sending party's participant identity record. A message 407 may be addressed by process 410 to one or more recipient, an audience type, a message reviewer, and other types of participants P and recipients. Delivery record or delivered message 423 is created for each recipient participant P, which is also associated to the host's and recipient's participant records.

Message recipient participants P may reply 408 to a message 423 which action may be captured by event attribute(s) 429. This creates a new message record 407 with a deliveryID value (FIG. 3) identifying the delivery record for the message 423 to which the recipient P replies. With continuing reference to FIGS. 3, 4, 5, and 6, it can be understood that this messaging ER design is optimized for a one-to-many (broadcast) messages. Additional ERs may be used that optimize for one-to-one (conversation), many-to-many (chat) or many-to-one (voting) messaging or all these types of confab 405 scenarios. These additional ER optimizations would not affect the core message processing features necessary for the disclosure to protect PII and preserve anonymity of identities 305. The one-to-many ER model is presented as only one possible exemplary arrangement of the disclosure and is not intended to be limiting.

Additional variations of the disclosure contemplate system 100 configured to generate TUID values (FIGS. 3, 6), wherein zero or more temporal identity records include a temporal unique identity identifier ("TUID"), which are created for each participant message thread of a confab 405. TUIDs are included in message content and weblinks to enable further types of instrumentation of instrumented message(s) 414. A TUID value is unique within a specified time frame defined by the TUID Group. TUID values can be short and easily read and typed by humans as part of URLs or computerized or manual form entry. Such TUIDs are also contemplated for use in generating queries and data analytics related to such messaging, events, and related interactions of interest.

Also contemplated is address message process 410 configured to utilize data parsed from the recipient identity 305 PII to address messages 407 to become addressed messages 411, as prescribed by message addressing rules 409. Instrument message process 413 embeds and or utilizes elements inserted into message 414 so recipient replies 408 and navigation actions will be enabled by and routed through system 100, as prescribed by message instrumentation rules 412. Such navigational elements of an instrumented message 414 may also include the TUID values.

Personalize message process 416 is also configured to replace fields or "replacement targets" in instrumented message 414 as a function of replacement rulesets prescribed by message personalization rules 415, to generate or create personalized message 417. These rulesets may reference identity attributes, TUID values, and other relevant data, and may also directly reference PII content and non-PII content. Directly referencing identity content may be useful where attribute generation or production from such identity content is not necessary. Non-PII content owned by and specific to the sending or host identity 305 may also be referenced.

To protect PII, replacement targets may be replaced in the messages with PII, or other personalizing predetermined replacement data specified by the ruleset(s), before communication such that PII is not shared directly between participants, such that a sender may transmit a message to a recipient that is personalized with the recipient's PII. Similarly, in a further example, a sender's PII may be removed and replaced with other predetermined personalizing replacement data in a way that personalizes sender data with predetermined personalization data specified in the ruleset(s), which is shared in the message to the recipient, but which does not reveal actual personal identity data of the sender.

Scrub message content process 419 is configured to clean or scrub message content by removing certain and or all identifying PII and or other data from instrumented message 414, personalized message 417, or other processed messages, as prescribed by message content scrubbing rules 418, to create or generate cleaned or scrubbed message 420. Deliver message process 422 enables system 100 to deliver scrubbed message 420 according to ruleset 421, and generates delivered message record 423. Track message action process 425 utilizes message action rules 424, and possibly also event attributes process 428, to create event 426 and associated event data and attributes 429 and to enable tracking of message 423, and replies 408, and navigation and other actions and interactions arising from such message, replies, and actions.

For further example, a message 423 may contain a "call to action" that the sender or host participant P requests the message audience recipient or participant P to take responsive to the message. A common call to action would be implemented by providing the recipient with a weblink or URL to which they can navigate. Such a URL or weblink might be an online survey or product page for example. Such URLs or weblinks may be replaced with redirection links in the instrument message process 413 of message. In addition, a TUID value would normally have been included in the URL or weblink in personalization process 416 during such message processing. This personalized URL or weblink enables system 100 to record the action of the message recipient P in navigating to the URL or weblink subsequent to delivery and receipt of message MSG.

In addition to tracking the URL or weblink action, a destination webpage of the weblink may receive, capture, and take additional action using the TUID. For example, a weblink to a product page on a vendor's website may track the TUID of the incoming link and then track what actions are taken on the website by that visitor. Often, this tracking is done to record replies, clicks, navigation actions, and or conversions (additional inquiries, sales, etc.) performed by the responding recipient visitor P. The system 100 of the disclosure further contemplates an API or APIs that enable one or more TUID values to be uploaded, along with conversion information, and for this TUID related data to be stored under the pseudoidentity PGUID associated with the TUID in Event records 426.

Events 426 are associated with the PGUID used to address the message 407 and processed message counterparts 411, 414, 417, 420, 423, and replies 408, as well as being associated to other data related to interactions arising from such messages. Delivered messages 423 are tracked by process 425, and associated actions and interactions are also associated to events 426, which may be accomplished by capturing and storing event attributes 429, 505. Each time an action or interaction occurs with respect to an instrumented or navigation link of an instrumented message 414, such as a click, instantiation, actuation, or other action, system 100 by process 425 creates an event 426 and event attributes 429. External third-party systems may communicate with system 100 to cause events 426 to be created, and or to supply such event data and attributes 429. Such external systems may utilize the TUID or other instrumentation data, supplied in message 423, to identify the anonymized recipient party P that navigated to the external system and web site, and to communicate actions arising therefrom. Event information supplied under a TUID can also be automatically associated to and with the PGUID by the system 100.

Event record 426 contains a document field that contains a structured document describing the event. In further adaptations, create event attribute process 428 is configured to create event attributes that in turn enable event records to be parsed and event attributes 429 to be captured, all as prescribed by event attribute rules 427. Create confab report process 431 is configured to create confab report 432 as a function of event attributes 429 and as prescribed by confab report rules 430, to capture therein and communicate the details of each confab 405. Thereafter, a confab report 432 may be created by process 431, according to confab report rules 430. Confab participants P (e.g., identities 1 and 2, FIG. 2) may specify via one or more of the contemplated messaging rules and or rulesets if, when, and how such messages may be sent, received, and or acted upon by system 100 and users thereof.

In further arrangements of the disclosure, system 100 is also configured to enable and be integrated with various messaging channels and formats, and or with one or external and or internally incorporated messaging services and capabilities that may include for purposes of additional illustration:

Email or electronic mail,
Automated and manual direct mail system,
Text messaging,
Advertising (web, mobile, point of sale, and other advertising systems),
Phone—outbound and inbound call management,
Internet and web-based chatbot technologies—both text and voice over phone, VOIP, or any other protocol, and
Mobile device applications, among other messaging channels and formats.
Query Service 500

Services including CM service 400, also instantiate and utilize query service 500 (FIG. 10), PM service 600 (FIG. 11), QA service 700 (FIG. 12), and other services, applications, and processes, to ensure that ADSs 508, 613, 707, which are returned from queries 403, 503, 703 are sufficiently anonymized to protect PII and to increase the probability that ADSs 508, 613, 707 cannot be easily deanonymized and misused. Query service 500 and or other services and processes, generate new PGUIDs (see, e.g., FIGS. 3, 14) for each identity returned in ADSs 508, 613, 707. Each identity 305, 507 in the generated ADSs 508, 613, 707 is assigned and includes new PGUIDs to ensure that separately or previously generated historical ADSs 508, 613, 707 may not be "joined" on PGUIDs generated for each current and prior ADS 508, 613, 707, and thus potentially create a subsequent or combined ADS that can be deanonymized and possibly misused.

If any of initial queries 403, 503, 703 generate ADSs 508, 613, 707 that are or may be susceptible to being deanonymized, then system 100 is configured to instantiate and utilize PM service 600 of FIG. 11 and query analysis process and rules/ruleset 803 of FIG. 13 to iteratively generate alternative query 612 until an acceptable ADS 613 is generated that protects PII. To enable and test for effective anonymization of ADSs 508, 613, 707, one or more services, such as for example query creation processes 402, 502, 612, and other processes, are further configured to generate at least one and or one or more DPs for each ADS 508, 613, 707. Such DPs are described in more detail elsewhere herein.

By definition herein and for purposes of example without limitation, DPs generated or calculated by query service 500, or other services, may also be referred to as a "DP %," and may range between zero percent ("0%") and one-hundred percent ("100%"). If the DP equals 0%, by convention and definition it is impossible to deanonymize ADSs 508, 613, 707. When DP equals 100%, such ADSs can by convention and definition, be readily deanonymized. Any and each of such processes and services of system 100 can instantiate and revert to PM service 600 whenever ADSs 508, 613, 707 are generated with DPs that are unacceptably high and exceed a selected, predetermined, default, and or preferred DPT. In such circumstances, PM service 600 of FIG. 11 is instantiated and utilizes query analysis rules, rule set, and or process 803 (FIG. 13) as described in more detail elsewhere herein to generate new alternative queries by process 612 (which alternative queries are also referred to herein by reference numeral 612), and other processes depicted in FIG. 11. Responsive to the new alternative queries, alternative ADSs are generated by process 612 (such alternative ADSs are also referred to herein by reference numeral 613), include generated or calculated DPs, which do not exceed the DPT, by design and according to rules and or ruleset(s) 803 and models.

In additional variations of the disclosure, query service 500, and each of services 200, 300, 400, 600, 700, and 800 can be implemented and instantiated to create and utilize queries 403, 503, 612, 703, using a number of architectures, frameworks, and developments environments. The disclosure illustrates a reference implementation and architecture utilizing a SQL-like, descriptive, pseudo language, and is configured to generate queries based thereon, and as a further example, to generate and enable queries to be executed against the contemplated databases 180, 601 and others, to generate the ADSs 508, 613, 707.

Query service 500 is configured to enable creation of queries by process 502, wherein accounts 155 create queries 503 to enable search of production databases 180 by execution of queries 503 by process 504 with event attributes 505 (429) and identity content attributes 506 (303), to generate lists of participants P or identities 507. Related DPs are also calculated or generated, along with prioritized AFBVs, which with the identities 507 will be contained in the generated, anonymized datasets or ADSs 508. Query service 500 may also instantiate query analysis process 704 to evaluate queries and results.

For purposes of continuing illustration, a subset of a generic, structured query language ("SQL") is employed to enable queries that use unverified and verified identity attributes 205, 303, 506, which for purposes of simplified illustration, can be accessed as columns in a "virtual" two-dimensional table of columns and rows referred to herein below as "IdentityDB," which may be based generally on data structures and schema such as those depicted in FIGS. 3, 4, 5, and 6, and other descriptions and figures herein. Also illustrated below in this example are predetermined or default DPTs, example DPs, and AFBVs for use as ADS prioritization parameters during instantiation and operation of query service 500, PM service 600, QA service 700, and other services.

Continuing with the proposed example, the contemplated IdentityDB can be accessed with such a SQL "like" specification statement, which should be understood to utilize present day nomenclature known to those skilled in the relevant fields of database technology, as follows for purposes of illustration without limitation:

```
SELECT
    [ID, | IDCOUNT,] [attri_expr [,attri_expr ...]]
    [FROM IdentityDB]
    [WHERE expr]
    [DPT real]
    [AFBV attri_function_name real[, attri_function name real ...]]
    [TARGET MODELS model name [EXECUTE]]
    [TARGET MODEL FAMILY model_family_name]
expr:
    expr OR expr
    | expr || expr
    | expr XOR expr
    | expr AND expr
    | expr && expr
    | NOT expr
    | ! expr
    | boolean_primary IS [NOT] {TRUE | FALSE | UNKNOWN}
    | boolean_primary
boolean_primary:
    boolean_primary IS [NOT] NULL
    | boolean_primary <=> predicate
    | boolean_primary comparison_operator predicate
    | predicate
comparison_operator: = | >= | > | <= | < | <> | !=
predicate:
    bit_expr [NOT] IN (expr [, expr] ...)
    | bit_expr [NOT] BETWEEN bit_expr AND predicate
    | bit_expr SOUNDS LIKE bit_expr
    | bit_expr [NOT] LIKE simple_expr [ESCAPE simple_expr]
    | bit_expr [NOT] REGEXP bit_expr
    | bit_expr
bit_expr:
    bit_expr | bit_expr
    | bit_expr & bit_expr
    | bit_expr << bit_expr
    | bit_expr >> bit_expr
    | bit_expr + bit_expr
    | bit_expr - bit_expr
    | bit_expr * bit_expr
    | bit_expr / bit_expr
    | bit_expr DIV bit_expr
    | bit_expr MOD bit_expr
    | bit_expr % bit_expr
    | bit_expr ^ bit_expr
    | bit_expr + interval_expr
    | bit_expr - interval_expr
    | simple_expr
simple_expr:
    literal
    | attr_function_name
    | function_call
    | param_marker
    | variable
    | simple_expr || simple_expr
    | + simple_expr
    | - simple_expr
    | ~ simple_expr
    | ! simple_expr
    | BINARY simple_expr
    | (expr [, expr] ...)
    | match_expr
    | case_expr
    | interval_expr
attri_function_name :
    attri_name
    | attri_name:attr_function_name
    | attri_name::attri_function_group_name
    | :::attri_function_group_name
attri_expr :
    attri_function
    | attri_function AS literal
```

Those skilled in the relevant technology should also be able to further comprehend that the preceding specification, attribute, and attribute function references are further contemplated to have the general meanings described elsewhere herein and in the following table:

| attri_function | Description |
| --- | --- |
| attr_name | Shorthand for attribute function value attri_name:value |
| attri_name:attr_function_name | Fully qualified attribute function reference |
| attri_name::attri_function_group_name | Attribute function group reference |
| ::attri_function_group_name | Global function group reference |

This exemplary illustration is merely an example of a minimalist query language specification that depicts a limited context to enable a detailed example of queries and query processing by query service 500, PM service 600, QA service 700, and other services and processes. An actual query language implementation may include more or less extensive query features, which may be further understood by persons skilled in the arts according to the following further example illustrations.

In the preceding specification statement, exemplary query commands "SELECT ID" and "SELECT IDCOUNT" are contemplated. It should be understood by those with ordinary skill in the relevant technology that the example SELECT ID query returns a table with data segments of anonymized identity values, which may include pseudoidentities as well as associated non-personally-identifiable or non-PII identity content attributes 303, 506. Such associated identity content attributes 303, 506 may include for example, income, age, birthdate, gender, and other content attributes 303, 506 and similar data.

Such data segments may grouped by one or more of the non-PII identity content attributes 303, 506 as well as by groups or functions of such non-PII identity content attributes 303, 506. Those knowledgeable in the field may comprehend that the query SELECT IDCOUNT returns a table with the count of identities 305 (507) in each data segment, which table may be generated without the accompanying non-PII identity content attributes 303, 506 so as to consume less system resources while enabling higher system through-put and performance. Queries that include and that are directed to identity content attributes 303, 506 may otherwise return PII values, but such PII values are not returned in responsive ADSs 508, 613, 707. Here too, the returned table may include the data segments grouped according to the non-PII identity content attributes 303, 506, or groups or functions thereof, even though the detailed attributes are not included.

Every attri_function_name referenced in the preceding specification statement, including use in the WHERE expr, is an implicit group by definition of the data segments. If not already present in the column list returned in the ADSs, any attribute functions used in the WHERE expr are added to the data tables of ADS(s) 508, 613, 707 returned in response to the queries 403, 503, 612, 703. SELECT IDCOUNT is an essential element that is utilized by query service 500, PM service 600 (for generation of query alternatives 612), as well as QA service 700, and other services.

SELECT IDCOUNT is an exemplary and typical SQL default query declaration that may be utilized by certain database and related technologies, such that use of SELECT without ID or IDCOUNT, will default to SELECT IDCOUNT. When SELECT IDCOUNT is used, an additional column for the generated or calculated DP is introduced for purposes of example herein, and is labelled "DP %". That additional column is added to the returned data table(s) of ADSs 508, 613, 707 to enable analysis and further processing by query service 500, PM service 600, QA service 700, and or other services and processes, to analyze and to enable analysis of data segments of the ADS and determine the likelihood of deanonymization by calculating the DP or DP % and comparing it to the applicable DPT. The value of DP in the DP % column may be generated and or calculated in a number of ways, which may include for example being calculated according to the equation "(1.0/IDCOUNT*100.0)." DP and its calculation and use are discussed in additional examples that follow, and elsewhere herein.

With the preceding considerations in mind, example queries 403, 503, 612, 703 can generated be as follows:

SELECT IDCOUNT, Birthdate:value

FROM IdentityDB

In response to the query, CM service 400, query service 500, PM service 600, and or QA service 700 of system 100 return an exemplary count of possible responsive ADS entries as shown in the following example table:

| IDCOUNT | DP % | Birthdate |
| --- | --- | --- |
| 2,392,399 | 0.0000418 | 1932 Jan. 1 |
| 3,392,981 | 0.00002947 | 1932 Jan. 2 |
| . . . | | . . . |

This exemplary query returns counts of responsive data segments of identities 305, 507 and responsive identity content attributes 303, 506 segregated here by birthdate. The number of responsive identities 305, 507, found are depicted in each data segment or row depicted in the preceding table.

In configurations of system 100 where the virtual IdentityDB table is the only table the contemplated SQL statements can access, the contemplated queries need not refer to the table, and can be created or generated as shown here:

SELECT IDCOUNT, Birthdate:value

Further, if the Birthdate:value attribute function is a default attribute function, the queries can be further simplified as follows:

SELECT IDCOUNT, Birthdate

And finally, if IDCOUNT is configured to be the default among SELECT ID . . . and SELECT IDCOUNT, the query can be simplified even further to be:

SELECT Birthdate

Attribute function and query analysis and utilization processes 504, 612, 704 (see also, "attri_function" above) are configured in the various noted services to retrieve information from an attribute table (FIGS. 3, 5), which is related to and or associated with an identity 305, 507. Such values returned from attribute functions and processes 504, 612, 704, and others, can be arbitrarily complex expressions that transform such attribute values and or use values from other attributes 303, 506 related to the same, respective identity 305, 507.

For further example, an attribute function "Birthdate:Age" is illustrated and configured as part of the various services and processes, for purposes of example without limitation, to calculate an integer value for age of an identity 305, 507 by subtraction of birthdate from a current date, and to be expressed as a number of years. The attribute function definition is included in an attribute type specification (see, e.g., FIGS. 3 and 5) for the attribute birthdate. Another exemplary query 403, 503, 612, 703 can be generated as shown:

SELECT IDCOUNT, Gender WHERE Birthdate:Age>20 and
Birthdate:Age<23

Which returns counts of responsive data segments as follows:

| IDCOUNT | DP % | Gender:value | Birthdate:Age |
|---|---|---|---|
| 921,392 | 0.00010853 | Male | 21 |
| 803,922 | 0.00012439 | Female | 21 |
| 1,392,001 | 0.00007184 | Male | 22 |
| 1,490,292 | 0.00006710 | Female | 22 |

This query uses a default Gender:value attribute function and the Birthdate:Age function to generate data segments defined by unique combinations of Gender:value and Birthdate:Age. The Birthdate:Age column was to the table output because this attribute function was referenced in the WHERE clause of the query.

In the exemplary reference implementation, the attributeType.specification may be defined by or contain a JSON document. This specification defines attribute functions and are part of the query analysis rules and or ruleset 803 used in query analysis process 704. An attribute type specification for the preceding example can take a number of forms, and can for example be a structured document such as a Javascript object notation ("JSON") document having the following example specification object form:

Name—Name of attribute type (unique across all attribute types)

Attribute Functions—Array of attribute Functions Objects

Attribute Function Name

FunctionType

Inline—the function code is a SQL expression

UDF—the function logic is compiled in a plug-in library and the function code referenced here calls that plug-in library function Attribute Function Code Scope Restricted—attribute function is not available in any query Unrestricted—attribute function is available in any query Local—attribute function may be used by other attribute functions and those functions have their own Restriction level ReturnType Integer String Real Date Boolean Restricted—attribute function may not be used in any query BusinessValue—optional default business value This exemplary specification object and structured document may further be illustrated in JSON format to be:

```
ID   Specification object
1    {
         "Attribute Specification": {
             "Name": "Birthdate",
             "AttributeFunctions": [
                 {
                     "Name": "Value",
                     "Scope" : "Restricted"
                 },
                 {
                     "Name": "Age",
                     "Scope":"Unrestricted",
                     "BusinessValue":"2.0",
                     "FunctionType":"Inline",
                     "Function": "TIMESTAMPDIFF(YEAR,Birthdate.value,CURDATE( ))",
                     "ReturnType": "INTEGER"
                 }
             ]
         }
     }
```

During instantiation and operation of CM service 400, query service 500, PM service 600, and or QA service 700, or other services or processes, analysis of queries 403, 503, 612, 703 utilizing such verified identity content attributes 303, 506 can also include analysing the queries against various of the rulesets described herein to ensure such attributes 303, 506 can permissibly be included in the query and or returned as part of ADSs 508, 613, 707, under constraints imposing protections on PII. For example, the following query seeks PII and can trigger a PII protection rule violations, and will return an error:

SELECT ID Birthdate:Value

→Error: Sorry, query references a restricted attribute function Birthdate:value

These reference implementation exemplars can be translated into application-specific SQL queries for execution in a number of ways, which can include for further example creating user defined functions ("UDFs") for each contemplated attribute function, such that the query becomes:

SELECT IDCOUNT Birthdate:Age which is parsed and, using the preceding attribute function definition for the attribute type, is expanded into an exemplary and representative query as follows:

```
SELECT
    Identity.ID AS "ID",
    TIMESTAMPDIFF(YEAR,Birthdate.value,CURDATE( ))
    AS Age
FROM Identity
LEFT JOIN attribute AS Birthdate ON
    Birthdate.IdentityID = Identity.ID
    AND Birthdate.ID = 219
``` which is a valid SQL query that can be executed against the contemplated reference implementation's relational database 180, and other databases contemplated by system 100 and the disclosure.

Those having knowledge and skill in the relevant fields of technology should be able to further appreciate that the preceding examples can be employed in a number of alternative implementations and variations, which can include:

a. use of what are sometimes referred to as a columnar database that is configured to store inherently columnar data and data structures, b. use of a SQL "WITH" function to generate an interim table with column values calculated in-line to take advantage of query optimization and caching available in advanced SQL engines like those in database systems available from Oracle and SQL Server, c. implementation and use of a purpose built database engine optimized for system 100 with a subset of SQL supported queries and functions, and d. use of the noted SQL UDFs to implement attribute functions, among other alternatives.

In another example according to the disclosure, execution of such contemplated queries may, with continuing reference to FIGS. 9, 10, 11, and 12, include:

a. User instantiates one or more of services 400, 500, 600, 700, and submits one of queries 403, 503, 612, and or 703, i. Queries are executed and analyzed by processes 504, 612, 704, and other processes, against prescribed query analysis rules 803, and further processing and analyses are accomplished of generated or calculated DP(s) in comparison to DPT(s), ii. Query responses are returned as ADSs 508, 613, 707, and or alternative queries 612 and or options 705 are generated, and presented to user, and b. Further queries 612 and or 703 are executed, and responsive ADSs 508, 613, 707 are generated and returned by one or more of processes 504, 612, and or 706.

During operation of one or more of query service 500, PM service 600, and or QA service 700, generation and or calculation of the DP can be accomplished in various useful ways. As described herein in connection with the various services and their constituent processes, the DP is utilized by convention herein to measure the potential for an external party to associate a known consumer identity 305 that includes PII, with a pseudoidentity or an anonymized identity in an anonymized dataset or ADS 508, 613, 707.

The DP measurement assumes the most pessimistic case and calculates or generates the corresponding most pessimistic probability that the external party is in an advantaged position of having all the same information about the consumer identities 305 that exist in the databases of system 100, including PII. The external party's objective is also assumed to be to associate an anonymized identity 305 to a known real identity so as to subvert the protective measures of system 100 and to extend the external party's knowledge of the consumer's activities and PII.

Herein, the probability of a deanonymization event otherwise referred to herein as DP, and now also for expanded illustration purposes, referred to as "P(A)", =(Number of favorable outcomes, "n(E)")/(Total number of possible outcomes, "n(S)"), or in shortened nomenclature, P(A)= n(E)/n(S), such that P(A)<1 or 100%. Here, P(A) or DP is defined as the probability of an event A, n(E) is defined as the number of favorable outcomes of an event (i.e., deanonymization), and n(S) is defined to be the set of all possible outcomes of an event, wherein the events of interest are deanonymization events.

The probability is expressed herein as a percentage for ease of reference, but the ratio (that is always less than one) returned in the formula above is multiplied by 100. As used herein, the phrase "favorable outcome" is successful (but undesired) deanonymization. A 100% deanonymization probability indicates a deanonymization attempt or event will succeed. Deanonymization probability is never zero, but can be a very small number, and can be less than a selected, imposed, default, or preferred DPT, as is demonstrated in the following examples.

Assume for example, the following query 403, 503, 612, 703 is created and executed, as follows:

SELECT IDCOUNT WHERE Birthdate:Age>=16 AND Birthdate:Age<=20

In response, for example, anonymized dataset 508, 613, 707 is generated and contains only the counts of the responsive anonymized identifiers, such as the assigned and or associated PGUID, and the attribute function Birthdate:Age as an integer, as follows:

| IDCOUNT | DP % | Age |
| --- | --- | --- |
| 15,000,000 | 0.00000667 | 16 |
| 20,000,000 | 0.00000500 | 17 |
| 18,000,000 | 0.00000556 | 18 |
| 22,000,000 | 0.00000455 | 19 |
| 30,000,000 | 0.00000333 | 20 |

The Birthdate:Age attribute function takes content attribute 303, Birthdate date value, and a current date and calculates the number of years between the two dates. The ADS example table below reports the number of identities 305, 507 associated with each age between 16 and 20. Each row in the table is a data segment of an identity 305, 507, and is identified by the attribute function Birthdate:Age. An external party with a list of the same 100 million identities containing the identity's age, can attempt to join its external list with the preceding table on this shared Age value. This attempt would have the respective, calculated DP or DP % shown in the preceding table, of associating a single identity in the external table with an anonymized identity 305, 507 in each data segment or example table row.

In another operational example of one or more of query service 500, PM service 600, QA service 700, and or RM service 800, the contemplated queries 403, 503, 612, 703 are configured to utilize a ruleset 803 that includes an appended column having a content attribute function "Salary:IncomeBracket1," which is configured to categorize reported salaries, as follows:

| IncomeBracket1 | Categorization Rule |
| --- | --- |
| "<20" | Salary < 20,000 |
| "20-30" | Salary >= 20,000 AND Salary < 30,000 |
| "30-40" | Salary >= 30,000 AND Salary < 40,000 |

| IncomeBracket1 | Categorization Rule |
|---|---|
| "40-50" | Salary >= 40,000 AND Salary < 50,000 |
| "50-60" | Salary >= 50,000 AND Salary < 60,000 |
| "60-70" | Salary >= 60,000 AND Salary < 70,000 |
| ">70" | Salary >= 70,000 |

An exemplary query 403, 503, 612, 703 is generated, created, and or executed, as follows:
SELECT IDCOUNT, Salary:IncomeBracket1
WHERE Birthdate:Age>=16 AND Birthdate:Age<=20
In response, the following exemplary ADS 508, 613, 707 is generated:
Each row in this ADS 508, 613, 707 is

| IDCOUNT | DP % | IncomeBracket1 | Age |
|---|---|---|---|
| 10,000,000 | 0.0000100 | "20-30" | 16 |
| 3,000,000 | 0.0000333 | "30-40" | 16 |
| 1,500,000 | 0.0000667 | "40-50" | 16 |
| 500,000 | 0.0002000 | "50-60" | 16 |
| 11,000,000 | 0.0000091 | "20-30" | 17 |
| 5,000,000 | 0.0000200 | "30-40" | 17 |
| 3,000,000 | 0.0000333 | "40-50" | 17 |
| 1,000,000 | 0.0001000 | "50-60" | 17 |
| 8,000,000 | 0.0000125 | "20-30" | 18 |
| 6,000,000 | 0.0000167 | "30-40" | 18 |
| 2,000,000 | 0.0000500 | "40-50" | 18 |
| 2,000,000 | 0.0000500 | "50-60" | 18 |
| 9,000,000 | 0.0000111 | "20-30" | 19 |
| 8,000,000 | 0.0000125 | "30-40" | 19 |
| 1,000,000 | 0.0001000 | "40-50" | 19 |
| 1,000,000 | 0.0001000 | "50-60" | 19 |
| 4,000,000 | 0.0000250 | "20-30" | 20 |
| 6,000,000 | 0.0000167 | "30-40" | 20 |
| 15,000,000 | 0.0000067 | "40-50" | 20 |
| 5,000,000 | 0.0000200 | "50-60" | 20 | and or includes a data segment of responsive identities 305, 507 that are identified by a unique combination of Age and IncomeBracket1. It can be observed that the DP % increases as fewer identities 305, 507 are included in each data segment.

In still another operational example, the following exemplary query 403, 503, 612, 703 is generated and or created, and run:
SELECT IDCOUNT, Salary:IncomeBracket1
WHERE Birthdate:Age>=16 AND Birthdate:Age<=20 AND Company="ACME"
An additional column is appended for content attribute 303 "Company," and to further constrain the responsive or returned ADS to only include identities 305, 507 where the Company attribute value="ACME", which ADS 508, 613, 707 is returned as follows:

| IDCOUNT | DP % | IncomeBracket1 | Age | Company |
|---|---|---|---|---|
| 40 | 2.500 | "20-30" | 19 | "ACME" |
| 10 | 10.00 | "30-40" | 19 | "ACME" |
| 5 | 20.00 | "40-50" | 19 | "ACME" |
| 20 | 5.000 | "50-60" | 19 | "ACME" |
| 800 | 0.125 | "20-30" | 20 | "ACME" |
| 60 | 1.667 | "30-40" | 20 | "ACME" |
| 20 | 5.000 | "40-50" | 20 | "ACME" |
| 1 | 100.0 | "50-60" | 20 | "ACME" |

It should be understood that the 100% DP of the data segment Age=20, IncomeBracket1="50-60" and Company="ACME" is unacceptably high, such that PII can be readily ascertained. Consequently, an error may be reported and or an alternate query may be generated by process 612, and a new attribute function must be introduced on either Age, Salary, or both, or another content attribute 303, 506, to ensure an acceptable DP can be achieved regarding the query and or responsive ADS 508, 613, 707, which avoids the problematic data segment and its associated, unacceptable DP that exceeds the DPT. For example, consider introduction of a new attribute function appended to the query such as for example, Salary.IncomeBracket2, and the "40-50" and "50-60" categories are merged into a "40-60" category, as follows:
SELECT IDCOUNT, Salary:IncomeBracket2
WHERE (Birthdate:Age>=16 AND Birthdate:Age<=20) AND Company="ACME"

| IncomeBracket2 | Categorization Query Ruleset (803) |
|---|---|
| "<20" | Salary < 20,000 |
| "20-30" | Salary >= 20,000 AND Salary < 30,000 |
| "30-40" | Salary >= 30,000 AND Salary < 40,000 |
| "40-60" | Salary >= 40,000 AND Salary < 60,000 |
| "60-70" | Salary >= 60,000 AND Salary < 70,000 |
| ">70" | Salary >= 70,000 |

When this new query 403, 503, 612, 703 is executed, a new ADS 508, 613, 707 is returned as follows:

| IDCOUNT | DP | IncomeBracket2 | Age | Company |
|---|---|---|---|---|
| 40 | 2.500% | "20-30" | 19 | "ACME" |
| 35 | 2.857% | "30-40" | 19 | "ACME" |
| 881 | 0.114% | "40-60" | 20 | "ACME" |

In this example, it can be observed that the DP of the ADS data segments is reduced as a result of the adjusted query. In further examples, data segments returned in the ADS can be changed to similarly adjust the DP of the resultant data segments, as can be understood with consideration of the following example table:

| IDCOUNT | DP % | IncomeBracket1 | Age | Company |
|---|---|---|---|---|
| 40 | 2.500 | "20-30" | 19 | "ACME" |
| 10 | 10.00 | "30-40" | 19 | "ACME" |
| 5 | 20.00 | "40-50" | 19 | "ACME" |
| 20 | 5.000 | "50-60" | 19 | "ACME" |
| 800 | 0.125 | "20-30" | 20 | "ACME" |
| 60 | 1.667 | "30-40" | 20 | "ACME" |
| 20 | 5.000 | "40-50" | 20 | "ACME" |
| 1 | 100.0 | "50-60" | 20 | "ACME" |

If a DPT is selected to be 6.0%, the responsive data segments of the ADS reflected by the above table can be filtered to eliminate data segments having a DP value exceeding the 6.0% DPT, as shown below:

| IDCOUNT | DP % | IncomeBracket1 | Age | Company |
|---|---|---|---|---|
| 40 | 2.500 | "20-30" | 19 | "ACME" |
| ~~10~~ | ~~10.00~~ | ~~"30-40"~~ | z,60; | ~~"ACME"~~ |
| ~~5~~ | ~~20.00~~ | ~~"40-50"~~ | z,60; | ~~"ACME"~~ |
| 20 | 5.000 | "50-60" | 19 | "ACME" |
| 800 | 0.125 | "20-30" | 20 | "ACME" |

-continued

| IDCOUNT | DP % | IncomeBracket1 | Age | Company |
|---|---|---|---|---|
| 60 | 1.667 | "30-40" | 20 | "ACME" |
| 20 | 5.000 | "40-50" | 20 | "ACME" |
| ~~1~~ | ~~100.0~~ | ~~"50-60"~~ | ~~20~~ | ~~"ACME"~~ |

In this example, three data segments were filtered out, or 16 identities were excluded out of a total number of 956 otherwise responsive identities 305, 507. This equates to 0.105% of the ADS or anonymized dataset. Rules and or ruleset 803 can be adjusted to enable decreased DP by this contemplated filter method, and such rules can also include filters that test and prioritize queries, attributes, attribute functions, AFBVs, and other features of system 100.

PM Service 600

In further examples of implementation and operation of system 100, PM service 600 is also configured to use system data resources 180 and database 601 to generate approved models 610 for use by query analysis rules 803, for various operations that can include for example, calculation of DPs for queries 403, 503, 612, 703, and to enable generation of alternative queries by process 612 and query options 705 that can illustrate DPs with live data segments of potentially responsive ADSs 508, 613, 707. PM service 600 in particular is configured to enable various operational examples as follows:

1. Data preparation process 602 is configured to select sample datasets from production dataset 601, and or databases 180, and to split the sample dataset into a mutually exclusive training dataset 603 and a testing dataset 606; production dataset 601 may include prior generated, executed, and cached queries 403, 503, 612, 703 and or related DPs and counts of identities 305, 507 responsive thereto when target datasets have not changed or have not substantially changed;
2. Train by process 604, models 605 on training dataset 603 such that models 605, 608 are generated with various machine learning and statistical techniques. For example, both classification and regression models can be generated for models 605, 608. Further, training process 604 and test process 607 may be configured to generate ranking or prioritization or other types of scores to be incorporated into models 605, 608, which can be used to create, rank, filter, prioritize, and output query(ies), DPs, ADSs, and or rule(s) or ruleset(s) or query rule logic 803, or combinations thereof. Models 605, 608 may also thereby incorporate, reference, and employ historically generated models, and a priori rules;
3. Testing by process 607 of trained models 605, can include application of trained model 605 to test dataset 606, to generate model performance statistics that can be utilized to rank the efficacy of the models 605, 608;
4. Select model process 609 is configured to enable selection and approval of models 605, 608 to generate approved models 610, wherein such selection and approval configuration requires that approved models 610 meet or exceed standards provided by automated, third party query and dataset modelling services and or by users of system 100, before such approved models 610 are made available for use in production queries 403, 503, 612, 703 by such users of system 100;
5. During testing and production use of system 100, Alternative query process 612 is configured to version each of rulesets 803 and models 610, and to log production actions that include queries and statistics of responsive ADSs. In this way, process 612 is further configured to utilize such historical data to generate alternative queries when queries 403, 503, 703 generate ADSs having data segments with DPs that exceed the DPT. Further, process 612 is configured such that rulesets 803 and models 610 are always readily available and auditable. Additional variations of process 612 are further described in more detail elsewhere herein; and
6. Ruleset monitoring process 614 is configured to utilize ruleset 803 with queries 403, 503, 612, 703 to monitor and log performance thereof, in connection with predictive approved models 610, and to enable development of new predictive models 605, 608, 610, and to update rules and rulesets of RM service 800, including ruleset 803, which may also be partially or fully informed by and or generated by use of approved models 610.

PM service 600 is further configured to generate new approved models 610 periodically during operation upon demand, and or at predefined time intervals. Approved models 610 are informed and influenced by the content of the production model dataset 601, and or models stored and retrieved from other databases 180, and must be regenerated as the production databases 601, 180 increase in size and or capture different types of information related to the contemplated predictive modelling capability of PM service 600. In addition, users of system 100 may seek to incorporate new industry best-practices, and to test different machine learning techniques to generate increasingly effective predictive, approved query and dataset management models 610 and rule(s)/ruleset(s). Data from third party, external systems can also be used, alone or in combination with the production dataset 601, and or databases 180, to develop the predictive models.

Alternative query process 612 is also configured to utilize the DPT and AFBV parameters, among others, for each attribute function used in a query, to enable and generate alternative queries 612 via PM service 600. This is accomplished when queries 403, 503, 612, and 703 are analyzed to establish responsive data segments and ADSs are generated, will be generated, and or will include at least one and or one or more data segments that have a DP or DPs exceeding the specified, selected, default, or predetermined DPT(s).

In another example, an exemplary query can be received, formed, and or generated as follows:

SELECT IDCOUNT, Birthdate:Age, Salary:IncomeBracket1
WHERE Company:Company="ACME"
DPT 6%
AFBV Birthdate:Age 2, Salary:IncomeBracket1 2, Company 4 which returns counts of responsive data segments including identities 305, without the DPT and AFBV constraints, as follows:

| IDCOUNT | DP % | IncomeBracket1 | Age | Company |
|---|---|---|---|---|
| 40 | 2.50 | "20-30" | 19 | "ACME" |
| 10 | *10.00 | "30-40" | 19 | "ACME" |
| 5 | *20.00 | "40-50" | 19 | "ACME" |
| 20 | 5.00 | "50-60" | 19 | "ACME" |
| 800 | 0.13 | "20-30" | 20 | "ACME" |

| IDCOUNT | DP % | IncomeBracket1 | Age | Company |
|---|---|---|---|---|
| 60 | 1.70 | "30-40" | 20 | "ACME" |
| 20 | 5.00 | "40-50" | 20 | "ACME" |
| 1 | *100 | "50-60" | 20 | "ACME" |

Assuming for purposes of further example, that a DPT of 6% is specified, default, selected, or predetermined, this ADS result must be rejected because at least three data segments of identities (denoted by "*") have DPs exceeding the 6% DPT. Consequently, system 100 is configured to instantiate PM service 600, and alternative query algorithms and or processes 612 to discover alternative queries that do not have DPs that exceed the specified or predetermined DPT.

In variations of this example, the AFBV values are utilized by process 612 to enable prioritization of alternative queries 612 as a function of a relative business value that is assigned to each attribute function of content attributes 303. Such AFBV values may range from a minimum of zero for the lowest priority and 1 for the highest priority (or in other terms, ranging from a 0% to 100% priority ranking). Such AFBVs can default to or be automatically assigned a maximum of 1.0 (an assumed, exemplary highest priority default value used in the absence of another predetermined value assigned by a user), if not specified by the user, or an exemplary default AFBV value of "0.5", may be automatically assigned in the attribute type specification, which can be adjusted as needed.

In further examples of the system 100, one or more of the services such as PM service 600 and or processes such as for example process 612, are configured to automatically generate alternative queries that return ADSs 508, 613, 707 having DPs that do not exceed the applicable DPT. Among other ways contemplated elsewhere herein, this is accomplished by adjusting the original query 403, 503, 703, and by utilizing one or more of the identity content attributes 205, 303, 506 and functions thereof specified in the query. Such a query(ies) and other data elements may be prioritized according to respective AFBVs, to generate the new, alternative queries 612 that return ADSs 613 with DPs that do not exceed the applicable DPT. In some circumstances, the alternative queries 612, may only return alternative ADSs 613 that have DP(s) that exceed the applicable DPT, and the various services and processes are further configured to generate and communicate an error message in such circumstances.

PM service 600 and its various constituent processes may be further configured to generate such alternative queries 612 and ADSs 613 according to the following additional exemplars. Here, each set of attribute functions of unverified and or verified identity content attributes 205, 303, 506 only may include a single occurrence of an attribute function, and the order of such attribute functions in a query will not affect any query results. Such alternative queries 612 are generated according to the following illustrative terms, functions, and recursive logic schema:

| TERM | DESCRIPTION |
|---|---|
| n | Number of attribute functions in query |
| $a_i$ | Attribute function numbered from 1 up to n |
| $av_i$ | Business value assigned to the attribute function $a_i$ |
| $\lvert A \text{ where} \binom{n}{k} \rvert$ | Set of k-combinations of attribute functions without repetition |
| $A_j$ | Combination of attribute functions such that $A_j \subset \lvert A$ |
| $Av_j$ | Business value of the set such that $Av_j = \Sigma_{i=n}^{i} av_i$ where $av_n \in A_j$ |
| $Ac_j$ | Count of attribute functions in the set |
| $q(A_j)$ | Query using the attribute functions in $A_j$ |
| $qd_i$ | Deanonymization Probability DP calculated returned from $q(A_j)$ |
| T | Deanonymization Probability Threshold, DPT |
| Solution | $S \subset A$ such that $\text{Max}(qd_n) \leq T$ selecting for maximum |
| Criteria | Av |

In view of the preceding, a further illustrative example contemplates attribute functions, $a_i$, as follows:

$a_1$ is Birthdate: Age
$a_2$ is Salary: IncomeCategory
$a_3$ is Company="ACME"

The number of k-combinations of 3 attribute functions without repetition equals $2^n$ and includes:

| j | $a_1$ | $a_2$ | $a_3$ | $A_j$ | $Av_j$ | $Ac_j$ |
|---|---|---|---|---|---|---|
| 1 | 0 | 0 | 0 | { } | 0 | 0 |
| 2 | 0 | 0 | 1 | {$a_3$} | $av_3$ | 1 |
| 3 | 0 | 1 | 0 | {$a_2$} | $av_2$ | 1 |
| 4 | 0 | 1 | 1 | {$a_2, a_3$} | $av_2 + av_3$ | 2 |
| 5 | 1 | 0 | 0 | {$a_1$} | $av_1$ | 1 |
| 6 | 1 | 0 | 1 | {$a_1, a_3$} | $av_1 + av_3$ | 2 |
| 7 | 1 | 1 | 0 | {$a_1, a_2$} | $av_1 + av_2$ | 2 |
| 8 | 1 | 1 | 1 | {$a_1, a_2, a_3$} | $av_1 + av_2 + av_3$ | 3 |

The attribute combinations $A_j$ and their associated $Av_j$ can be generated quickly with a simple exemplary recursive function that should be comprehensible by those skilled in the relevant arts. Attribute function combinations may be ordered as follows:

$Av_j$ descending, then by $Ac_j$ descending, then by i ascending.

In this exemplary query, the attribute function business values are selected to be:

$av_1=2$
$av_2=2$
$av_3=4$

During alternative query generation, attribute function combinations are eliminated that have Av=0, and one or more sorted query generation tables are generated, for example, as follows:

| J | $A_j$ | $Av_j$ | $Ac_j$ |
|---|---|---|---|
| 8 | {$a_1, a_2, a_3$) | 8 | 3 |
| 6 | {$a_1, a_3$} | 6 | 3 |
| 7 | {$a_1, a_2$) | 4 | 3 |
| 4 | {$a_2, a_3$) | 4 | 3 |
| 2 | {$a_3$} | 4 | 1 |
| 5 | {$a_1$} | 2 | 1 |
| 3 | {$a_2$} | 2 | 1 |

During query generation, processes such as process 612 can be configured to enable sorting $Av_j$ in descending order such that attribute functions with the highest business value are positioned at the top of the table. In a further example, a configuration where $Ac_j$ is sorted in descending order results in queries that have more attribute functions are deemed to have higher business value. Another variation includes i sorted in ascending order, which renders the query list order deterministic, but which does not address relative business value of the queries. In view of the preceding examples, process 612 can generate alternative queries 612, according to the following exemplars:

| J | $A_j$ | $Av_j$ | Query |
|---|---|---|---|
| 8 | $\{a_1, a_2, a_3\}$ | 8 | SELECT IDCOUNT, Birthdate:Age, Salary:IncomeBracket1 WHERE Company = "ACME" |
| 6 | $\{a_1, a_3\}$ | 6 | SELECT IDCOUNT, Birthdate:Age WHERE Company = "ACME" |
| 7 | $(a_1, a_2)$ | 4 | SELECT IDCOUNT, Birthdate:Age, Salary:IncomeBracket1 |
| 4 | $\{a_2, a_3\}$ | 4 | SELECT IDCOUNT, Salary:IncomeBracket1 WHERE Company = "ACME" |
| 2 | $\{a_3\}$ | 4 | SELECT IDCOUNT WHERE Company = "ACME" |
| 5 | $\{a_1\}$ | 2 | SELECT IDCOUNT, Birthdate:Age |
| 3 | $\{a_2\}$ | 2 | SELECT IDCOUNT, Salary:IncomeBracket1 |

Processes such as for example process 612 can execute all of these generated alternative queries in table order, top to bottom, and or can be configured to stop when the Max($qd_n$) returned in response to one of these queries does not exceed the preferred, predetermined, default, and or user specified DPT, deanonymization probability DP or threshold T. The original query 403, 503, 703 can be the first query in the exemplary table, if all attribute function values of identity content attributes 205, 303, 506 are greater than zero.

This first query will be executed and a responsive ADS or ADSs returned if the $qd_i$ or DP does not exceed the DPT, or deanonymization probability T. Described differently, if the first or original query 403, 503, 703 is executed and generates a responsive ADS(s) with data segment(s) having DPs that exceed the DPT, then each of the next alternatives queries 612 in the exemplary preceding table will be executed in order, for only those queries that generate ADS(s) having data segment(s) with DPs not exceeding the DPT.

Such alternative queries 612 may be utilized by other services and processes, such as for example QA service 700, to cooperate with PM service 600 and others, to enable generation, storage, and communication of such alternative queries, to in turn enable users to select preferred query options 705, such as by processes of FIG. 12. In additional example configurations, such previously generated query options 705 may be automatically selected and or may be viewed and selected before execution, to further enable autoselection and or to enable users to select those queries 403, 503, 612, 703 most of interest in view of preferred content attributes 205, 303, 506 or functions thereof that are associated with such queries.

In other variations, such suggested alternative queries 612, query options 705 can be adjusted to: (a) return fewer or different unverified and or verified identity content attributes 205, 303, 506 than originally requested or only the requested unverified and or verified attributes 205, 303, 506, (b) utilize replacement functions based upon the requested identity content attributes being returned, in lieu of the unverified and or verified identity attributes 205, 303, 506, (c) use identity attribute functions that are modified to generate categories in lieu of the identity attributes, and or (d) use query statement filters that exclude specific data segments from the dataset, in all cases to protect PII and prevent exploitation and misuse of otherwise anonymized identities 305, 507.

In yet another arrangement, process 612 and others may be configured to enable queries and alternative query generation that includes multiple attribute functions of unverified and or verified identity content attributes 205, 303, 506 as a group or set, to be specified in the query instead of a single attribute function, as follows:

SELECT Birthdate:Age, Salary:IncomeFunctionGroup

FROM Identities

WHERE Company="ACME"

DPT 6%

AFBV Birthdate:Age 2,

Salary:IncomeBracket1 2,

Salary:IncomeBracket2 1.5,

Company 4

In this example, attribute type "Salary" specifies or defines the attribute functions Salary:IncomeBracket1 and Salary:IncomeBracket2. This specification also defines an attribute function set or group "Salary:IncomeFunctionGroup" that includes the references to Salary:IncomeBracket1 and Salary:IncomeBracket2. As may be understood with reference to the prior schema examples, these attribute function options may be denoted by an additional suffix $a_{i,k}$ where k is a value from 1 up to the number of attribute functions in the attribute function group or set, as depicted is the following further examples:

$a_1$ is Birthdate: Age $a_{2,1}$ is Salary: SalaryIncomeBracket1

$a_{2,2}$ is Salary: SalaryIncomeBracket2

$a_3$ is Company="ACME"

The number of k-combination attribute functions, of the identity content attributes 205, 303, 506, may thus also include:

| j | $a_1$ | $a_{2,1}$ | $a_{2,2}$ | $a_3$ | $A_j$ | $Av_j$ | $Ac_j$ |
|---|---|---|---|---|---|---|---|
| 1 | 0 | 0 | 0 | 0 | { } | 0 | 0 |
| 2 | 0 | 0 | 0 | 1 | $\{a_3\}$ | $av_3$ | 1 |
| 3 | 0 | 1 | 0 | 0 | $\{a_{2,1}\}$ | $av_{2,1}$ | 1 |
| 4 | 0 | 0 | 1 | 0 | $\{a_{2,2}\}$ | $av_{2,2}$ | 1 |
| 5 | 0 | 1 | 0 | 1 | $\{a_{2,1}, a_3\}$ | $av_{2,1} + av_3$ | 2 |
| 6 | 0 | 0 | 1 | 1 | $\{a_{2,2}, a_3\}$ | $av_{2,2} + av_3$ | 2 |
| 7 | 1 | 0 | 0 | 0 | $\{a_1\}$ | $av_1$ | 1 |
| 8 | 1 | 0 | 0 | 1 | $\{a_1, a_3\}$ | $av_1 + av_3$ | 2 |
| 9 | 1 | 1 | 0 | 0 | $\{a_1, a_{2,1}\}$ | $av_1 + av_{2,1}$ | 2 |
| 10 | 1 | 0 | 1 | 0 | $[a_1, a_{2,2}]$ | $av_1 + av_{2,2}$ | 2 |
| 11 | 1 | 1 | 0 | 1 | $\{a_1, a_{2,1}, a_3\}$ | $av_1 + av_{2,1} + av_3$ | 3 |
| 12 | 1 | 0 | 1 | 1 | $\{a_1, a_{2,2}, a_3\}$ | $av_1 + av_{2,2} + av_3$ | 3 |

Those knowledgeable in the related fields of technology may be able to understand with reference to the preceding table, that the rows are attribute function sets $A_j$, which the services and or processes can utilize to generate with a recursive function, the contemplated alternative queries 612, to have the added constraint that only one attribute function from an attribute group may appear in an attribute function set $A_j$.

As with prior examples, the processes may generate, incorporate, and or order the contemplated attribute function combinations in various ways, including for example on:

$Av_j$ descending, then by $Ac_j$ descending, then by i ascending, then by k ascending In continued examples, attribute function business values associated and or assigned to identity content attributes 205, 303, 506 are considered as follows:

$av_1=2$
$av_{2,1}=2$
$av_{2,2}=1.5$
$av_3=4$

The services and or processes evaluate the attribute function combinations and eliminate those having Av=0, to generate another exemplary, sorted, alternative query attribute function table, as follows:

| j | $A_j$ | $Av_j$ | $Ac_j$ |
|---|---|---|---|
| 11 | $\{a_1, a_{2,1}, a_3\}$ | 8 | 3 |
| 12 | $\{a_1, a_{2,2}, a_3\}$ | 7.5 | 3 |
| 8 | $\{a_1, a_3\}$ | 6 | 2 |
| 5 | $\{a_{2,1}, a_3\}$ | 6 | 2 |
| 6 | $\{a_{2,2}, a_3\}$ | 5.5 | 2 |
| 10 | $\{a_1, a_{2,2}\}$ | 3.5 | 2 |
| 9 | $\{a_1, a_{2,1}\}$ | 4 | 2 |
| 2 | $\{a_3\}$ | 4 | 1 |
| 7 | $\{a_1\}$ | 2 | 1 |
| 3 | $\{a_{2,1}\}$ | 2 | 1 |
| 4 | $\{a_{2,2}\}$ | 1.5 | 1 |

In view of the preceding sorted query schema table, exemplary IDCOUNT alternative queries for each J increment are generated as follows:

| j | $A_j$ | $Av_j$ | Query |
|---|---|---|---|
| 11 | $\{a_1, a_{2,1}, a_3\}$ | 8 | SELECT IDCOUNT, Birthdate:Age, Salary:IncomeBracket1 WHERE Company = "ACME" |
| 12 | $\{a_1, a_{2,2}, a_3\}$ | 7.5 | SELECT IDCOUNT, Birthdate:Age, Salary:IncomeBracket2 WHERE Company = "ACME" |
| 8 | $\{a_1, a_3\}$ | 6 | SELECT IDCOUNT, Birthdate:Age WHERE Company = "ACME" |
| 5 | $\{a_{2,1}, a_3\}$ | 6 | SELECT IDCOUNT, Salary:IncomeBracket1 WHERE Company = "ACME" |
| 6 | $\{a_{2,2}, a_3\}$ | 5.5 | SELECT IDCOUNT, Salary:IncomeBracket2 WHERE Company = "ACME" |
| 10 | $[a_1, a_{2,2}]$ | 3.5 | SELECT IDCOUNT, Birthdate:Age, Salary:IncomeBracket2 |
| 9 | $\{a_1, a_{2,1}\}$ | 4 | SELECT IDCOUNT, Birthdate:Age, Salary:IncomeBracket1 |
| 2 | $\{a_3\}$ | 4 | SELECT IDCOUNT WHERE Company = "ACME" |
| 7 | $\{a_1\}$ | 2 | SELECT IDCOUNT, Birthdate:Age |
| 3 | $\{a_{2,1}]$ | 2 | SELECT IDCOUNT, Salary:IncomeBracket1 |
| 4 | $\{a_{2,2}\}$ | 1.5 | SELECT IDCOUNT, Salary:IncomeBracket2 |

The attribute function groups contemplated herein can be configured and specified in a variety of ways. A non-exhaustive list of example attribute function specifications includes:

---

ATTRIBUTE FUNCTION SPECIFICATION

<attribute_name>:<*> include any of the attribute functions defined for an attribute
{<attribute_name>::<attribute_function_name>, ..} a list of attribute functions.
Attribute functions associated with different attributes may be mixed in a list.
<attribute_name>:<regex> a list of attribute functions generated by applying a regex expression on the attribute_function_names belonging to the specified attribute
<attribute_name>::<attribute_group_name>:<attribute_group_specification>

---

Further, attribute group names may also be associated with a group specification, such as <group_name>::<attribute_group_specification>, and globally defined attribute groups may be referenced in queries with the following example syntax: SELECT::<group_name> . . . .

PM service 600 also contemplates variations that include models trained to predict consumer behaviour. In further examples, a trained, approved model 605, 610 includes identity content attribute functions, or identity content attributes 205, 303, 506 that enable protection of the choice of Nascar® branded product over other product brands. The model training process 604 is configured to select which of the AFBVs, functions, and or attributes 205, 303, 506, from all of the available and contemplated attributes, make the model 605, 610 most effective in generating queries 403, 503, 612, 703 that return ADSs 508, 613, 707 having DPs not exceeding the DPT.

Responsive ADSs 508, 613, 707 include those most likely to choose such Nascar® branded product over other product. Results from using different collections or variants of such function attributes are recorded and ranked from lowest to highest error rates for a family of ADSs of Nascar® fans, with variants of such function attribute groups or sets, as follows:

| Variant | Attributes | Error |
|---|---|---|
| 1021 | Birthdate:Age, Salary:IncomeBracket1, Company | 18.0% |
| 1583 | Birthdate:Age, Company | 18.5% |
| 200 | Birthdate:Age, Salary:IncomeBracket2 | 25.0% |
| 3292 | Salary:IncomeBracket2, Company | 40.0% |

The previously described, exemplary query language supports the specification of queries 403, 503, 612, 703, that are configured to utilize this previously trained predictive model 605, 610 using an example, SQL-like TARGET MODEL clause, as follows:

SELECT IDCOUNT
DPT 6%
TARGET MODEL nascar_fan

The various services and processes, such as for example, PM service 600, QA service 700, and others are configured to utilize this ranked list of function attribute collections in the alternative query generation process, such as process 612. If provided, the optional EXECUTE SQL-like directive causes the ADS query result to be passed to the PM service 600, as follows:

SELECT ID
DPT 6%
TARGET MODEL nascar_fan
EXECUTE

The services and processes are further configured in these examples to include a target result column to the output for such ADS collection, which may be identified by a PGUID identifier. For this example model 605, 610, the target result column has a value of 1 or 0 indicating a predicted preference, for example wherein "1" means "yes" or predictive, and "0" means "no" or not predictive.

| ID | Target |
|---|---|
| 5693c858-e791-4ee9-b4ff-c9fe7e2e62fb | 0 |
| 5ae1aeb3-675d-4440-97cc-21c24d0536c8 | 1 |
| ... | |

Another exemplary query includes the following:
SELECT IDCOUNT
DPT 6%
TARGET MODEL FAMILY branding This query includes additional information collected from testing by process 607 of predictive models 605. Such models 605, 608, 610 may also be configured to be grouped into model families. In this example nascar_fan model 605, 608, 610 is part of the "branding" model family. Models 605, 608, 610 associated with such a model family are configured to share and or include enough business value context that such models employ many of the same attribute functions of the identity content attributes 205, 303, 506.

Testing process 607 of PM service 600 may be further configured to instrument one or more of models 605, 608, 610 to enable test reporting and ruleset monitoring 614 on relative predictive value of each attribute function used in a model. This information is collected, and descriptive analytics may be utilized to generate an AFBV table for such family:branding models as follows:

| Attribute Function | Business Value |
|---|---|
| Company | 4.0 |
| Birthdate:Age | 2.0 |
| Salary:IncomeBracket1 | 2.0 |
| Salary:IncomeBracket2 | 1.5 |
| ... | |

Such accumulated AFBVs may be utilized to automatically select and or to manually enable selection of predictive or preferred AFBVs to be utilized during query and alternative query generation, according to exemplary queries such as that which follows:
SELECT IDCOUNT
DPT 6%
AFBV Salary:IncomeBracket2 2.5
TARGET MODEL FAMILY branding These contemplated models as utilized by PM service 600, QA service 700, and other services and processes, are configured to enable added features and capabilities in query analyses, messaging and event capture analyses, and other types of data analytics. Such added features and capabilities can also include maximizing certain preferred predictive modelling, PII protection, and identity anonymization objectives, which may further also include minimizing the DP(s) of data segments returned with ADSs 508, 613, 707, in response to queries 403, 503, 612, 703. In further examples, maximization of data segmentation can include sorting and grouping identities 305, 507 in such ADSs by like values of one or more verified identity content attributes 303—each of these groups is referred to here as the data segment(s) described elsewhere herein.

The first predictive modelling capability includes maximizing the variety of such identity content attributes 303, 506 and therefore the number of possible, responsive data segments, returned by queries 403, 503, 612, 703, without generating ADS(s) 508, 613, 707 that have DPs exceeding the DPT. Deanonymization may be possible when such data segment(s) contain too few identities 305, 507 in comparison to the general population of identities 305, 507 in a full database. In such undesirable circumstances, such anonymized identities can be exploited for possible misuse, in combination with other data from sources external to system 100, such that associations may be possible between an anonymized identity 305, 507 and a real identity.

Another added feature and capability of the models employed by PM service 600, QA service 700, and others, includes maximizing data granularity to improve usefulness of results from queries. Here, data granularity refers to the number and types of data and values returned from attribute functions of the identity content attributes 205, 303, 506, with one or more identity attributes that generate numeric or categorical indicators or data that can be used to classify responsive identities 305, 507 in returned ADSs 508,613, 707. In this way, users are able to utilize such ADSs to specifically target communications or messages to and with certain, desired populations of recipient individuals and participants P, which can then be sorted and or targeted by age, gender, geographic location, income, and other categories of non-PII data.

For example, an identity content attribute 303 can include birthdate and a function AgeGroup can be included that is applied to the birthdate, to enable generation of categorical values such as, for further example, baby, child, adolescent, young adult, adult, and or senior. Another attribute function can also be included termed "Age," that is configured to be applied to birthdate to return an integer value indicating the number of years since the birthdate. In this exemplary variation, for a database having a nominal distribution of identities 305, 507 having respective birthdates, the contemplated AgeGroup function would be less granular than the Age function, because AgeGroup will return more identities 305, 507 for each categorical value.

Another preferable arrangement of the disclosure includes PM service 600 and QA service 700, and other services, configured to generate such predictive models 605, 608, 610 to maximize granularity of identity content attributes 205, 303, 506, which are returned in response to queries, while also generating ADSs 508, 613, 707 with DPs that do not exceed the DPT(s). Here, deanonymization may be possible when such data segments include such increased granularity with identity attributes or functions, but also contain too few identities 305, 507 relative to the general population pf the larger database. Unless the ADSs are generated to have DPs that do not exceed the DPT, the anonymized identities 305, 507 may otherwise be used or combined with external data sources to associate an anonymized identity 305, 507 with a real identity.

As described elsewhere, such maximization of data granularity and or data segmentation is accomplished by adjusting queries 403, 503, 612, 703 to generate ADS(s) 508, 613, 707, to have new PGUIDs generated for each identity 305, 507 included in the ADS(s). Such PGUIDs are generated for each identity 305, 507, every time and for each ADS generated, to ensure different datasets or ADS(s) cannot be joined to increase the number of identity attributes associated with any particular identity 305, 507, which prevent misuse while enabling potentially higher levels of data segmentation and usefulness of the ADSs. Explained differently, such identity 305, 507 in each ADS 508, 613, 707 will have a unique PGUID, such that the same identity 305, 507 in each ADS will never have the same pseudoidentity or PGUID, which prevents deanonymization by joining multiple ADSs 508, 613, 707.

QA Service 700

The various services and processes, including for example QA service 700 of FIG. 12, are also configured to be instantiated in cooperation with other services to analyze query statements or queries 403, 503, 612, 703, as well as responsive ADSs 508, 613, 707, to generate or calculate DPs for each of the queries and ADSs, and to compare such DPs to the DPT as described elsewhere herein. QA service 700 utilizes database 701 to store recent queries and calculated DPs and to retrieve exemplary and historical queries and related AFBVs, historical DPs, and other data.

With this data, query analysis rules 803, and approved model(s) 702 (which are also referred to herein by reference numeral 610), QA service 700 enables analyses by process 704, of new queries 703, whereby performance may be improved when new queries 703 match and or are similar enough to retrieved historical queries and related data, and associated databases 180 have not changed substantially since the prior queries and DPs were generated. Here, previously generated ADSs may be re-utilized, eliminating the need for a new search or searches. In further variations, QA service 700 and its constituent processes are described in various operational application examples.

Query analysis process 704, for example, includes:
a. receiving a new query 703, created at processes 402, 502, 612, and other processes;
b. examining the new query 703 for compliance with prescribed query analysis rules and or ruleset 803;
c. if new query 703 is noncompliant, then query options 705 may be communicated to enable selection of new alternative query(ies), which query option(s) 705 may be generated by process 612 or retrieved from database 701; and
d. if new query 703 complies, query 703 is executed at process 706 or processes 404, 504, 612, and ADS 707 is returned.

In other arrangements, QA service 700 may be further configured wherein query analysis process 704 applies one or more of models 702 and or ruleset 803 to evaluate queries 403, 503, 612, 703 to calculate respective DP(s) of the returned dataset(s). If DP(s) of the dataset are less than or equal to or do not exceed the DPT, then the ADS(s) or dataset(s) 707 are returned. Otherwise, query options 705 are returned, which may include the alternative queries 612 and or queries retrieved from database 701.

RM Service 800

As illustrated in part throughout the disclosure, configurations of system 100 enable compliance with PII protection regulations and best-practices, among other features and capabilities, wherein the services and processes such as, for example, RM service 800 of FIG. 13 is further instantiated and configured to create and manage a plurality of exemplary rules and rulesets, which may include, among others:
a. Attributes rule(s) and or ruleset(s) 201, which are managed by attributes ruleset process 801, and which describes what types of content, attributes, AFBVs, and or attribute functions may exist and form part of and be associated with accounts 155, identities 305, 507, confabs 405, events 426, query(ies) 403, 503, 612, 703, and other data items;
b. Identity rule(s) and or ruleset(s) 301, which are managed by process 802, and which describe the types of identities 305, 507 that may be created;
c. Query analysis rule(s) and or ruleset(s) 803 (FIGS. 9 to 13), which are part of and managed by query analysis process 803 (FIG. 13), which identify how and what types of queries 403, 503, 612, 703 may be created, generated, stored, and executed to generate the contemplated ADSs and DPs;
d. Message addressing rule(s) and or ruleset(s) 409, which are managed by process 804, and which describe how messages 407 may be addressed to one or more participants P to become addressed message 411;
e. Message instrumentation rule(s) and or ruleset(s) 412, which are managed by process 805, and which describe how messages 411 may be instrumented to become messages 414, to include tracking parameters, links, uniform resource locators ("URLs"), and other types of automated and embedded data, executable code, and or other types of instrumentation and message management instructions;
f. Message personalization rule(s) and or ruleset(s) 415, which are managed by process 806, and which describe how messages 414 can be re-formed as personalized messages 417 and personalized with PII and or PII-facsimile or similar data for personalization of messages to recipient participants P and or audiences and groups of such recipients;
g. Message content and PII scrubbing rule(s) and or ruleset(s) 418, which are managed by process 807, and which describe how messages 414, 417, or other processed messages, are processed to form messages 420, which are cleaned of certain types of PII and other data to further enable protection of such PII and other data, to prevent disclosure, exploitation, and or misuse thereof by users, hosts, recipients, and other participants P;
h. Message delivery rule(s) and or ruleset(s) 421, which are managed by process 808, and which describe how messages 420 are to be communicated and delivered as messages 423 and reply messages 408, via message channels, formats, and services to recipients, hosts, and between participants P;
l. Message action rule(s) and or ruleset(s) 424, which are managed by process 809, and which describe how delivered messages 423 are to be acted upon by system 100, and or users and participants P upon receipt of delivery confirmation and or reply messages 408;
j. Event attribute rule(s) and or ruleset(s) 427, which are managed by process 810, and which describe what types of actions and event attributes 429, 505 are to be captured and associated with events 426 that arise from messages 423, replies 408, confabs 405, and other aspects of system 100; and
k. Confab report rule(s) and or ruleset(s) 430, which are managed by process 811, and which describe how confab reports 432 of interactions between participants P and other types of data analytics are to be created, generated, logged, communicated, and or reported in response to other actions and aspects of system 100, among many other contemplated rules and rulesets.

Such rules and or rulesets are configured to be dynamic and RM service 800 is configured to enable real-time updates, testing, selection, review, and approval, communication, and deployment to capture and enable changes to aspects of system 100 and to accommodate current, revised, and new regulations and best-practices, and or to enable and utilize new features made available in the system 100. Such rulesets are comprised of rules that define, for further example, users, accounts, content, identities, participants, attributes, messages, confabs, events, queries, ADSs, and other data and related actions contemplated by the methods and processes of system 100 and the disclosure.

Such rules may also be understood by persons skilled and knowledgeable in the technology to be statements in a computer and or machine language that is tailored to the methods and processes of system 100 and the disclosure, and, optionally, as logic, written or graphical code, and or diagrams depicting the contemplated functions, logic, and accompanying actions. Extensive use of rulesets is a flexible mechanism to enable, for example, the correct and protective handling of various types of identity content, such as PII, according to evolving government laws, regulations, and industry best-practices, and or as new features and capabilities are implemented in the systems and methods 100. RM service 800 is also configured in variations to:

a. create a rule or ruleset as code compiled into an executable image;
b. create a rule or ruleset as code interpreted at runtime by a rules interpreter;
c. create a rule or ruleset as code compiled just-in-time by a rules compiler of RM service 800 and then subsequently executed as a binary or intermediate representation at runtime;
d. name a rule or ruleset for reference by other rules;
e. group one or more rules to form a named ruleset;
f. reference a rule and or a ruleset from another ruleset;
g. read, update, delete, and list rules and rulesets;
h. discover and list rule dependencies;
i. perform search and replace operations for and in rules and rulesets;
j. copy and paste to duplicate rules among rulesets;
k. copy rules and or rulesets under new names;
l. manage versions and versioning of rules and or rulesets;
m. syntax check rules, rulesets, and statements therein;
n. enable code expansion and or completion of rule statement tokens;
o. test and debug rules and ruleset execution;
p. enable and perform rule and ruleset approval; and
q. enable ruleset deployment, management, and utilization by system 100 and the various services and processes of the disclosure.

The disclosure contemplates adaptations of system 100 that also enable generation of audit trails of actions in system 100 (see, e.g., FIGS. 3, 6, and 9). This audit trail of captured events 426, event attributes 429, and other captured audit trail data of other system data, enables review and analysis of the prior state of all content of system 100 and the ability to trace each transformation of related data, such as for example, for identities 305, 507, and for identity content attribute data 205, 303, 506 for specific identities 305, 507, and also for confabs 405, messages 407, 423, and other data. This includes the capability to search for, audit, analyze, and review what changes and transformations were applied by which users, and what rules and versions of rules/rulesets were created, changed, and or applied to enable or govern such changes and transformations.

With continuing reference to FIGS. 1 through 13, additional examples are described discussed in connection also with FIGS. 14, 15, and 16, which illustrate further specific and general capabilities of system 100 and constituent subsystems and components of the disclosure, and the many various methods of operation. For example, a business named "ACME" ("A Company that Manufactures Everything") is contemplated (see, e.g., FIGS. 2, 15, 16, Identity(ies) 1) wherein a user uploads a customer list (such as a dataset that includes PII) to system 100. A different entity or company, "BCME", which for purposes of example may be a marketing firm, (see, e.g., FIGS. 2, 15, 16, Identity(ies) 1) wants to send an email advertising campaign of messages 407 to an audience participants P (see, e.g., FIGS. 2, 15, 16, Identity(ies) 2) contained in ACME's uploaded customer list, without accessing the participant's respective PII contained in identities 305, 507. During operation, system 100 of the disclosure may be utilized as follows:

1. A business account 155 is created for ACME, utilizing UAM service 150 (see, e.g., FIGS. 1-6).
2. The ACME business account 155 is utilized to create a business identity for ACME (FIGS. 2, 3).
3. The ACME business account submits by process 202 shared PII identity content 203 (FIG. 7), to create content attributes 205, 506, which are used to assign the role of authorized user for these attributes.
4. Content attributes 205 are used to upload the customer list, which creates identities 305,507 (FIG. 8) for each customer:
    a. Identity record 305 is created by process 304 (FIG. 8);
    b. Attribute record(s) is/are created by processes 204, 302 (FIGS. 7, 8); and
    c. Content attribute record(s) 205, 303 is/are created by processes 204, 302 (FIGS. 7, 8).
5. A BCME employee creates a business account 155 for BCME.
6. The ACME business account 155 authorizes the BCME business account 155 to query verified content attributes 303.
7. The BCME business account 155 by process 404 creates a confab 405 (FIG. 9) by:
    a. creating at processes 402, 502, a query 403, 503, 612, 703, to search for audience participants P, against or on attributes 303, 506;
    b. executing by processes 504, 706, the query 403, 503, 612, 703, to receive ADSs 508, 613, 707, which contain a list of anonymized participants P to use in the Confab 405;
    c. Participants P are identified with PGUIDs (see, e.g., FIGS. 6, 14); and
    d. Participants P of ADSs are assigned participant role of audience (see also, e.g., FIGS. 14, 15, 16).
8. BCME business account 155 creates an ACME identity as a Participant P in confab 405, and identifies ACME as host P of confab 405:
    a. The BCME business account 155 sends by process 406, messages 407 to audience participants P from host participant P, with message processing as follows:
        i. Addressing is performed by process 410;
        ii. Instrumentation is performed by process 413;
        iii. Personalization is performed by process 416;
        iv. Scrubbing is performed by process 419;
        v. Delivery is performed by process 422; and
        vi. Tracking is performed by process 425, among other message processing capabilities.
9. Message recipient P receives message 423 and may communicate reply 408. Message replies 408 may also be processed by message processes 410, 413, 416, 419, 422, 425, among other processing features.
10. Message recipient P may take an action on message 423 that can be track message action process 425, perhaps by using a weblink or URL, which may have been embedded by instrumentation process 413, and event attribute process 428 utilizes event attribute rules 427, to create event attributes 429 that capture data related to such action.

11. Message recipient P may also take an action on delivered message 423 in a third-party system, perhaps an online shopping cart (see, e.g., FIGS. 15, 16), and the third-party system may report that action via message action process 425 and or create event attribute process 428, according to rules 427, and such that event attributes 429 are created to capture data related to such action.

The disclosure is further directed to arrangements that capture, use, and store PII associated with identities 305, 507, such that accounts 155 creating confabs 405 do not directly access PII. In the discussed operational example, BCME business account 155 did not capture, store, or use PII for any host or audience participant P that were anonymously identified in ADS(s) 508, 613, 707, in response to query(ies) 403, 503, 612, 703.

For further exemplary illustration purposes and continuing reference now specifically to FIG. 14, a production dataset or database 180 labelled "dataset with PII" contains an illustrative five identity attributes; Age, Income, Company, Email and Telephone. Data from one identity is shown for purposes of discussion, but is representative of many such identities. One example ADS 508, 613, 707 that may be generated from this PII dataset, in response to queries 403, 503, 612, 703, is labelled "ADS(0)—Anonymized Dataset 0, Full", and includes new PGUIDs, DP(0), AFBV(s), and three non-PII identity content attributes 303, 506: Age, Income, and Company.

Here, for purposes of illustration, it is contemplated that specific ages and incomes can be generated. But to protect PII, age and income groups or categories are instead generated, and are shown here in FIG. 14 as attribute functions of age range ("30-40") and income range ("60-70"). The returned identities 305, 507 in the ADS 508, 613, 707 can be thereby grouped and anonymized utilizing the noted attribute functions of Age and Income, and the specific attribute Company, to create targeted datasets or data segmentation or increased data granularity or combinations thereof, when generating ADSs 508, 613, 707.

Query analysis by process 704 performed on the query(ies) and or the generated ADS(0), will discover that DP(0) exceeds the applicable DPT, which indicates that ADS(0) has an unacceptably high probability (i.e., DP(0)>DPT, FIG. 14) of a real identity being associated to the anonymized identity 305, 507. This may be because too few identities were and or will be returned by ADS(0) in response to the queries. Consequently, the query(ies) will fail a query analysis or test by process 704, which instead may generate an error message and or alternative queries 612 that can be automatically or manually selected from options 705.

Query analysis process 704 utilizes other services and processes, such as alternative query(ies) process 612, and query options 705, and others to suggest new queries or options, which can enable generation of new or alternative ADS(s) 508, 613, 707, having DP(s) that do not exceed the applicable DPT. Examples of such alternative ADSs 508, 613, 707 are also shown in FIG. 14 as ADS(1)—Anonymized Dataset 1 and ADS(2)—Anonymized Dataset 2.

In this continuing example, ADS(1) includes identity attributes Age and Income, and related DPs and AFBVs. This dataset segment of Age and Income generates a number of identities for each unique combination of Age and Income, which results is the respective DP(s) not exceeding the applicable DPT (i.e., DP(1)<=DPT, FIG. 14). Similarly generated ADS(2) includes identity attributes Age and Company, which also generates a number of identities for each unique combination of Age and Company, which results in the respective DP(s) also not exceeding the DPT (i.e., DP(2)<DPT, FIG. 14). It should be understood that other possible datasets or ADSs may have been responsive to other exemplary queries, but were filtered or not returned, because QA service 700 ascertained either too few identities were returned or some unique combinations of included attributes resulted in respective DPs exceeding the DPT.

The above description and referenced drawings refer to systems, methods, components, elements, nodes, or features being "coupled" and or in "communication" together and with one another. As used herein, unless expressly stated otherwise, use of these terms and words must be understood to mean that one system/method/component/element/node/module/feature/application/service is directly or indirectly joined to, part of, in communication with, and or communicates with another, either electronically, mechanically, or in some similar way that enables cooperative operation and communication, as should be apparent to those having ordinary skill in the field of technology.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings are not intended to be construed to limit the description to a given example, time period, or to an exemplary item commercially available in the market as of a specific date and time period.

Instead, these descriptions are intended to be understood by those having ordinary knowledge, skill, and ability in the relevant fields of art and technology, and to include conventional, traditional, normal, and or standard technologies that may be available now and at any time in the future in some improved and modified form. Similarly, a group of words described and joined with the conjunction "and" or the disjunctive "or" should be understood only as exemplary and representative, but not as exclusive groups, and not as requiring that only or each and every one of those described items must be or must not be present in the group. Rather, use of such conjunctives and disjunctives must be understood to mean "and or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular and or the plural, both the singular and the plural are also intended and contemplated to be within the scope of such a description unless limitation to the singular or the plural is explicitly stated as being required for an exemplary arrangement. The presence or absence of broadening words and phrases such as "one or more," "at least one," "but not limited to," or other like phrases in some instances must not be understood to mean that narrower meanings are implied, intended, or required, as would otherwise be apparent to the person of ordinary skill and knowledge.

I claim:

1. A secure messaging system, comprising:
one or more processors coupled to a memory and network and configured to:
generate an anonymized dataset (ADS) containing pseudoidentities responsive to a query received from the network;
generate a deanonymization probability (DP) for the ADS;
generate, if the DP exceeds a DP threshold (DPT), one or more alternative queries, by adjusting the received query by at least one of removing, replacing, modifying, and filtering query options, that generate ADSs having DPs that do not exceed the DPT;
wherein the one or more alternative queries are generated by:
(i) parsing the received query into attribute functions having pre-determined business values (AFBVs) to identify combinations having maximized AFBVs,
(ii) retrieving from a database one or more of historical and predictively modeled one or more alternative queries and ranking according to predefined AFBVs,
(iii) iteratively analyzing and ranking the AFBVs to form ranked one or more alternative queries, and
(iv) executing the ranked one or more alternative queries to generate the ADS; and
exchange messages between a sender host and a recipient utilizing the pseudoidenties.

2. The secure messaging system according to claim 1, further comprising:
the one or more processors configured to:
generate, responsive to the DP not exceeding the DPT, a confab that includes recipients identified by the pseudoidentities.

3. The secure messaging system according to claim 2, further comprising:
exchange the messages within the confab between the sender host and recipients using the pseudoidentities according to messaging rules, while preventing communication of personally identifiable information (PII).

4. The secure messaging system according to claim 3, further comprising:
the one or more processors further configured to:
receive a reply message, and message content scrubbing ruleset configured to detect PII in reply messages; and
remove PII detected in the reply message, according to the message content scrubbing ruleset, before exchanging the reply message to the sender host.

5. The secure messaging system according to claim 3, further comprising:
the one or more processors further configured to:
receive a message content scrubbing ruleset configured to detect PII in the messages; and
remove PII detected in the messages, according to the message content scrubbing ruleset, before exchanging the messages.

6. The secure messaging system according to claim 5, further comprising:
the one or more processors further configured to:
receive a message personalization ruleset configured to detect replacement targets in each of the messages; and
personalize the messages by replacing the replacement targets with PII data for each message, according to the personalization ruleset, before exchanging the messages.

7. The secure messaging system according to claim 1, further comprising:
the one or more processors configured to generate the ADS to have one or more counts of data segments of the pseudoidentities, wherein each data segment is responsive to at least one portion of the query, and wherein the DP is generated for each of the one or more pseudoidentities.

8. The secure messaging system according to claim 1, further comprising:
the one or more processors configured to generate the one or more alternative queries to include attribute function business values having a priority ranging between 0% and 100% that prioritize one or more of attributes and attribute functions associated with each of the one or more alternative queries.

9. The secure messaging system according to claim 1, further comprising:
the one or more processors configured to generate an error message if the DP exceeds the DPT.

10. The secure messaging system according to claim 1, further comprising:
the one or more processors configured to generate, if the DP exceeds the DPT, one or more alternative queries, which generate ADS having DPs that do not exceed the DPT, and which each include one or more attribute function business values having a priority ranging between 0% and 100%.

11. The secure messaging system according to claim 1, further comprising:
the one or more processors configured to generate the ADS to include the pseudoidentities each identified by one or more pseudo globally unique identifiers (PGUIDs).

12. The secure messaging system according to claim 11, further comprising:
the one or more processors configured to generate the ADS to include anonymized identities each associated to the PGUIDs.

13. The secure messaging system according to claim 12, further comprising:
the one or more processors configured to generate the ADS to also include non-personally-identifiable identity content attributes each associated to respective PGUIDs.

14. A secure messaging system, comprising:
one or more processors coupled to a memory and network and configured to:
generate a deanonymization probability (DP) for an anonymized dataset (ADS)
generated responsive to a query received from the network;
generate, if the DP exceeds a DP threshold (DPT), one or more alternative queries, by adjusting the received query by at least one of removing, replacing, modifying, and filtering query options, that generate ADSs having DPs that do not exceed the DPT;
wherein the one or more alternative queries are generated by:
(i) parsing the received query into attribute functions having pre-determined business values (AFBVs) to identify combinations having maximized AFBVs, (ii) retrieving from a database one or more of historical and predictively modeled one or more alternative queries and ranking according to predefined AFBVs, (iii) iteratively analyzing and ranking the AFBVs to form ranked one or more alternative queries, and (iv) executing the ranked one or more alternative queries that generate the ADS;

respond to the query by generating the ADS containing pseudoidentities;

generate a confab that includes a sender, and recipients identified by the pseudoidentities; and exchange messages in the confab between a sender host and a recipient utilizing the pseudoidenties.

15. The secure messaging system according to claim 14, further comprising:

the one or more processors further configured to:

receive a reply message, and message content scrubbing ruleset configured to detect PII in reply messages; and remove PII detected in the reply message, according to the message content scrubbing ruleset, before exchanging the reply message with the sender.

16. The secure messaging system according to claim 14, further comprising:

the one or more processors further configured to:

receive a message content scrubbing ruleset configured to detect PII in the messages; and remove PII detected in the messages, according to the message content scrubbing ruleset, before exchanging the messages.

17. The secure messaging system according to claim 16, further comprising:

the one or more processors further configured to:

receive a message personalization ruleset configured to detect replacement targets in each of the messages; and personalize the messages by replacing the replacement targets with PII data for each message, according to the personalization ruleset, before exchanging the messages.

18. A secure messaging system, comprising:

one or more processors coupled to a memory and network and configured to:

generate a deanonymization probability (DP) for an anonymized dataset (ADS) responsive to a query received from the network;

generate, if the DP exceeds a DP threshold (DPT), one or more alternative queries, by adjusting the received query by at least one of removing, replacing, modifying, and filtering query options, that generate ADSs having DPs that do not exceed the DPT;

wherein the one or more alternative queries are generated by:

(i) parsing the received query into attribute functions having pre-determined business values (AFBVs) to identify combinations having maximized AFBVs, (ii) retrieving from a database one or more of historical and predictively modeled one or more alternative queries and ranking according to predefined AFBVs, (iii) iteratively analyzing and ranking the AFBVs to form ranked one or more alternative queries, and (iv) executing the ranked one or more alternative queries that generate the ADS;

respond to the query with the ADS containing pseudoidentities, when the DP does not exceed the DPT;

generate a confab that includes a host and recipients identified only by the pseudoidentities; and exchange messages using the pseudoidentities and according to messaging rules, without sharing personally identifiable information (PII).

19. The secure messaging system according to claim 18, further comprising:

the one or more processors further configured to:

receive a reply message and a message content scrubbing ruleset configured to detect PII in the reply message; and remove detected PII, according to the message content scrubbing ruleset, before exchanging the reply message.

20. The secure messaging system according to claim 18, further comprising:

wherein before the messages are exchanged, the one or more processors are further configured to:

receive a message content scrubbing ruleset configured to detect PII in the messages;

remove PII detected in the messages, according to the message content scrubbing ruleset;

receive a message personalization ruleset configured to detect replacement targets in each of the messages; and personalize the messages by replacing the replacement targets with personally PII data for each message, according to the personalization ruleset.

\* \* \* \* \*